(12) United States Patent
Iwamoto et al.

(10) Patent No.: US 11,968,970 B2
(45) Date of Patent: Apr. 30, 2024

(54) TRAPPING METHOD, LIGHT SOURCE DEVICE, AND TRAPPING DEVICE FOR ADULT MOTHS BELONGING TO INDOOR PHYCITINAE SUBFAMILY

(71) Applicant: JAPAN TOBACCO INC., Tokyo (JP)

(72) Inventors: Hirohide Iwamoto, Tokyo (JP);
 Toshihiro Imai, Tokyo (JP); Ryota Takahashi, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 307 days.

(21) Appl. No.: 16/911,188

(22) Filed: Jun. 24, 2020

(65) Prior Publication Data
US 2020/0323189 A1 Oct. 15, 2020

Related U.S. Application Data

(63) Continuation of application No. PCT/JP2018/035743, filed on Sep. 26, 2018.

(30) Foreign Application Priority Data

Dec. 26, 2017 (JP) .................................. 2017-249932

(51) Int. Cl.
 *A01M 1/04* (2006.01)
 *A01M 1/10* (2006.01)
(52) U.S. Cl.
 CPC .............. *A01M 1/04* (2013.01); *A01M 1/106* (2013.01)
(58) Field of Classification Search
 CPC .......... A01M 1/145; A01M 1/04; A01M 1/08; A01M 1/106
 See application file for complete search history.

(56) References Cited

U.S. PATENT DOCUMENTS 5,251,397 A * 10/1993 Exum .................. A01M 1/145
 43/115
5,607,711 A *  3/1997 Lagunas-Solar ...... A01M 1/226
 426/248
(Continued)

FOREIGN PATENT DOCUMENTS

| CN | 101815434 A | 8/2010 |
|---|---|---|
| JP | 2004-93 A | 1/2004 |

(Continued)

OTHER PUBLICATIONS

WO2008111232A1 Translation provided (Year: 2008).*
(Continued)

*Primary Examiner* — Peter M Poon
*Assistant Examiner* — Shada Mohamed Alghailani
(74) *Attorney, Agent, or Firm* — Birch, Stewart, Kolasch & Birch, LLP

(57) ABSTRACT

According to an aspect of the invention, a method for trapping indoor adult Phycitinae, which is an adult moth belonging to Phycitinae subfamily includes: emitting attracting light at a predetermined photon flux density for a predetermined period of time or longer; forming a guide path to guide the adult Phycitinae to a vicinity of an emission end of the attracting light in a region having a photon flux density lower than the predetermined photon flux density on a side lower than a height of the emission end; and trapping the adult Phycitinae attracted by the attracting light in the guide path.

17 Claims, 22 Drawing Sheets

(56) References Cited

U.S. PATENT DOCUMENTS

| | | | | |
|---|---|---|---|---|
| 8,978,290 | B2* | 3/2015 | Wright | A01M 1/145 43/113 |
| 2008/0134568 | A1 | 6/2008 | Cowan et al. | |
| 2016/0345569 | A1 | 12/2016 | Freudenberg et al. | |
| 2017/0156304 | A1* | 6/2017 | Hori | A01M 1/226 |
| 2017/0290326 | A1* | 10/2017 | Yanagawa | E02B 1/00 |
| 2017/0290327 | A1* | 10/2017 | Yanagawa | E02B 1/00 |
| 2019/0000061 | A1* | 1/2019 | Shimoda | A01M 17/008 |

FOREIGN PATENT DOCUMENTS

| | | |
|---|---|---|
| JP | 2012-152125 A | 8/2012 |
| JP | 2012-239443 A | 12/2012 |
| JP | 3204262 U | 5/2016 |
| WO | WO 2008/067678 A1 | 6/2008 |
| WO | WO 2008/111232 A1 | 9/2008 |
| WO | WO 2009/040528 A1 | 4/2009 |

OTHER PUBLICATIONS

Japanese Office Action, dated May 11, 2021, for Japanese Application No. 2019-562760, with an English machine translation.

Cowan et al., "Ultraviolet and violet light: attractive orientation cues for the Indian meal moth, *Plodia interpunctella*", Jan. 26, 2009, Entomologia Experimentalis et Applicata, The Netherlands Entomological Society, 131(2), pp. 148-158.

Hirao et al., "Comparison of responses to various traps for stored product insects", Journal of the Japan Society of Pestology, 11(1), 1996, pp. 24-28.

International Search Report for PCT/JP2018/035743 (PCT/ISA/210) dated Dec. 25, 2018.

Chinese Office Action and Search Report for Chinese Application No. 201880083953.5, dated Aug. 4, 2021, with English translation.

Extended European Search Report for European Application No. 18894360.9, dated Aug. 17, 2021.

Sambaraju et al., "Responses of Adult plodia interpunctella (Hübner) (Lepidoptera: Pyralidae) to Light and Combinations of Attractants and Light," J Insect Behav, vol. 21, 2008 (published online Jul. 22, 2008), pp. 422-439.

International Preliminary Report on Patentability and English translation of the Written Opinion of the International Searching Authority for International Application No. PCT/JP2018/035743, dated Jul. 9, 2020.

* cited by examiner

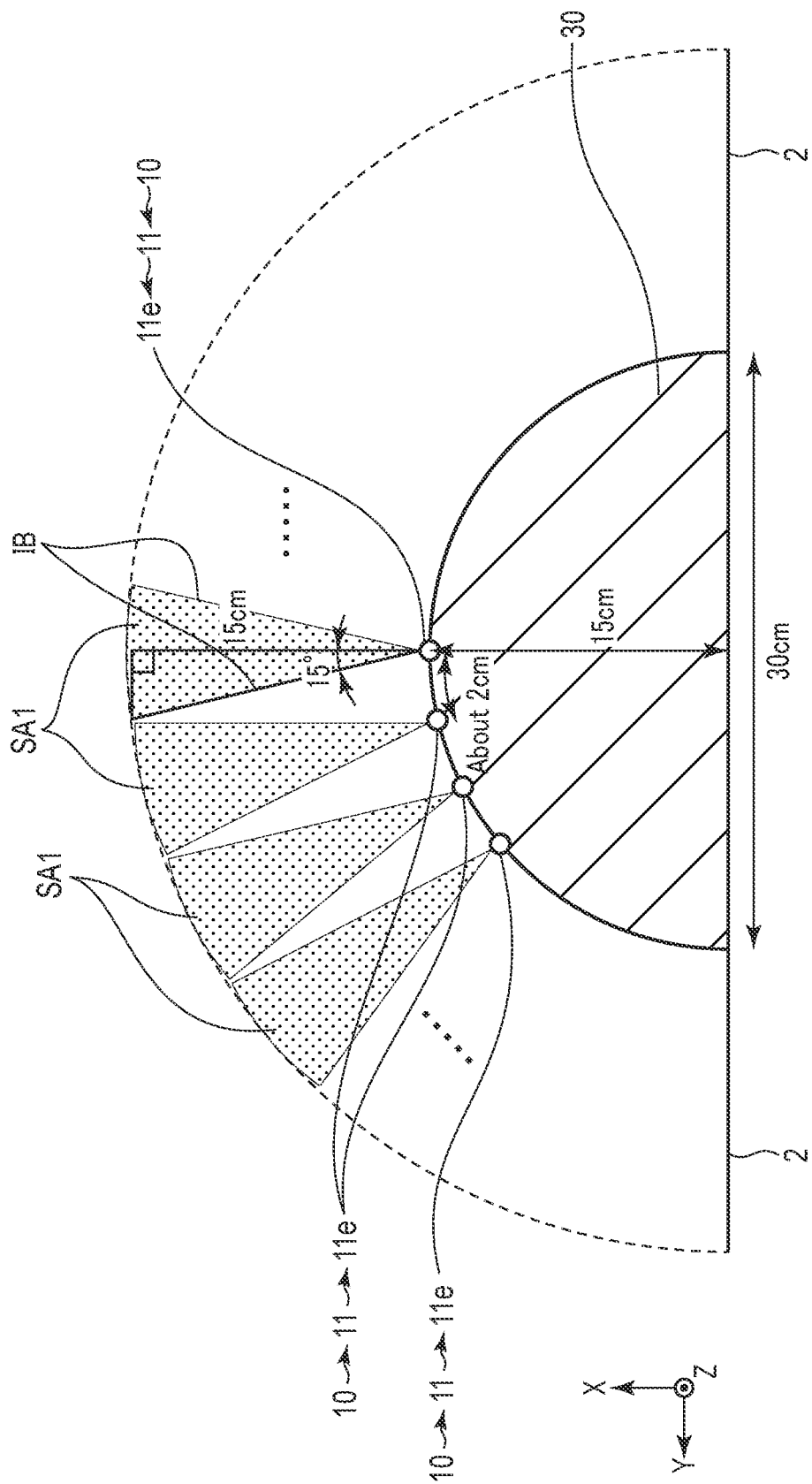
F I G. 4

TRAPPING METHOD, LIGHT SOURCE DEVICE, AND TRAPPING DEVICE FOR ADULT MOTHS BELONGING TO INDOOR PHYCITINAE SUBFAMILY

CROSS REFERENCE TO RELATED APPLICATIONS

The present invention contains subject matter related to PCT Application No. PCT/JP2018/035743, filed Sep. 26, 2018 and based upon and Japanese Patent Application No. 2017-249932, filed Dec. 26, 2017, the entire contents of all of which are incorporated herein by reference.

FIELD

The present invention relates to a trapping method, a light source device, and a trapping device for adult moths belonging to the indoor Phycitinae subfamily.

BACKGROUND

Insects (moths) belonging to the indoor Phycitinae subfamily are collectively referred to as the Phycitinae. The Phycitinae include tobacco moths, Indian meal moths, dried currant moths and Mediterranean flour moths. The Phycitinae are widely distributed worldwide and known as a grain-storage insect pest of foods, cereals, and the like. The indoor adult Phycitinae emerge in a food factory, a warehouse, or a home. For this reason, in the control of indoor adult Phycitinae, the use of insecticides is limited, and solutions by non-chemical control means are desired. As a non-chemical control means, a trapping device (light trap) provided with a light source is widely used for many insect pests.

Under these circumstances, the attraction of the adult Phycitinae to attracting light has been elucidated in laboratories (for example, L1 (WO 2008/067678 A1) and L2 (Thomas Cowan and Gerhard Gries, Ultraviolet and violet light: attractive orientation cues for the Indian meal moth, *Plodia interpunctella*, Entomologia Experimentalis et Applicata, 131(2):148-158 (2009)), and there is a strong demand for its application to light traps. On the other hand, for example, L3 (Motokazu Hirao, Habara Masaaki, Hitoshi Sakurai, Comparison of Stored Food Insect Pest Trapping Reactions by Various Traps, Journal of the Japan Society of Pestology, 11 (1): 24-28 (1996)) discloses that the insect trapping effect of light traps is extremely low in practical spaces such as warehouses, and the light trap cannot in practice catch the insects.

BRIEF SUMMARY OF THE INVENTION

According to an aspect of the invention, a method for trapping indoor adult Phycitinae, which is an adult moth belonging to Phycitinae subfamily includes: emitting attracting light at a predetermined photon flux density for a predetermined period of time or longer; forming a guide path to guide the adult Phycitinae to a vicinity of an emission end of the attracting light in a region having a photon flux density lower than the predetermined photon flux density on a side lower than a height of the emission end; and trapping the adult Phycitinae attracted by the attracting light in the guide path.

According to an aspect of the invention, a method for trapping adult tobacco moths, includes: emitting attracting light at a predetermined photon flux density for a predetermined period of time or longer; forming a guide path to guide the adult tobacco moths to a vicinity of an emission end of the attracting light in a region having a photon flux density lower than the predetermined photon flux density on a side lower than a height of the emission end; and trapping the adult tobacco moths attracted by the attracting light in the guide path.

According to an aspect of the invention, a light source device for trapping indoor adult Phycitinae, which is an adult moth belonging to subfamily Phycitinae, the device being configured to: emit an attracting light at a predetermined photon flux density; and form a guide path to guide the adult Phycitinae to a vicinity of an emission end of the attracting light in a region having a photon flux density lower than the predetermined photon flux density on a side lower than a height of the emission end of the attracting light.

According to an aspect of the invention, a trapping device for adult Phycitinae, the device includes: the light source device; and a trapping portion disposed in the guide path and configured to trap the adult Phycitinae attracted by the attracting light.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a schematic diagram showing an outline of a configuration example of a light source portion according to a first modification.

DETAILED DESCRIPTION

Figure 1:
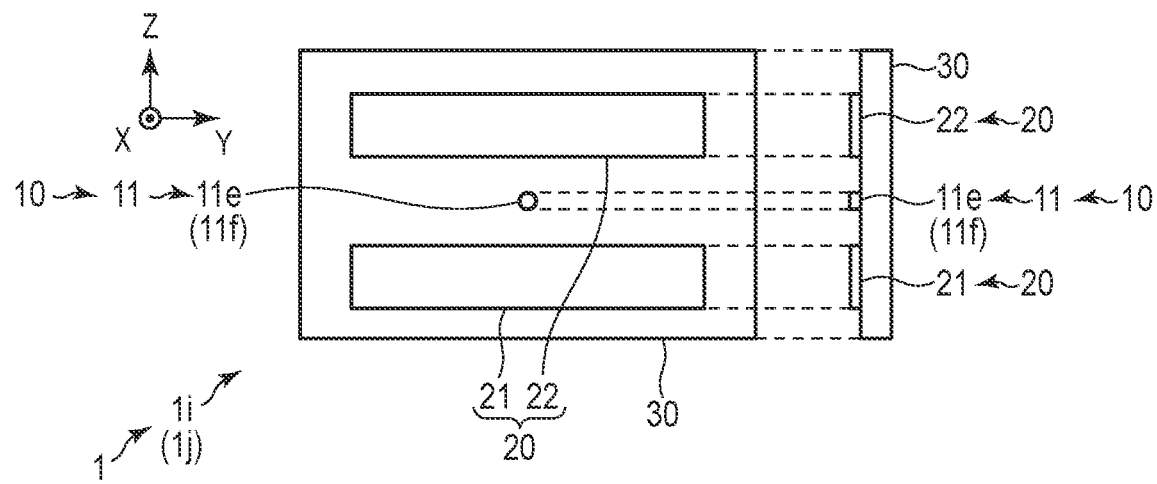
FIG. 1 is a schematic diagram showing side by side a front view (left) and a side view (right) of an outline of a configuration example of a trapping device according to a first embodiment.

Embodiments of the present invention will be explained with reference to the drawings. Note that the drawings are schematic, and the length, the size ratio, and the like are not limited to those illustrated in the drawings. In the following description, the terms "horizontal", "perpendicular", "vertical", "orthogonal", and the like do not strictly mean "horizontal", "perpendicular", "vertical", "orthogonal", and the like. The terms "horizontal", "perpendicular", "vertical", "orthogonal", and the like may mean "substantially horizontal", "substantially perpendicular", "substantially vertical", "substantially orthogonal", and the like, respectively.

In the following description, the term "Pyralidae" refers to insects (moths) that belong to Insecta, Lepidoptera, Pyralidae, the Phycitinae subfamily. The indoor Phycitinae includes at least tobacco moths (scientific name: *Ephestia elutella*), Indian meal moths (scientific name: *Plodia interpunctella*), dried currant moths (scientific name: *Cadra cautella*), and Mediterranean flour moths (scientific name: *Ephestia kuehniella*).

With regard to Phycitinae, research on sex pheromones has advanced. Trapping devices (pheromone-baited traps) for adult Phycitinae using sex pheromones have been used to monitor emergence of adult Phycitinae. However, sex pheromones are effective for male adults, but not for female adults; therefore, even when pheromone-baited traps are used, control effects due to trapping and killing cannot be expected.

Indoor adult Phycitinae emerge in food factories, warehouses, or homes. For this reason, in the control of indoor adult Phycitinae, the use of insecticides is limited, and solutions by non-chemical control means are desired. It is generally known that many insects are attracted to light regardless of sex. Therefore, as one non-chemical control means, a trapping device (light trap) provided with a light source is widely used to trap many insect pests. On the other hand, while it has been observed that adult Phycitinae are attracted to attracting light in laboratories, it is known that the property of being trapped by a conventional light trap is remarkably low in large spaces (real environment) such as warehouses.

The behavior of adult Phycitinae toward light was analyzed in detail to determine a cause of the phenomenon in which light sources having attractiveness in laboratories do not have attractiveness in real environments. As a result of this analysis, it was found that light has a property of inducing conflicting actions of attraction of adult Phycitinae and behavioral suppression due to a difference in photon flux density (irradiance). According to this analysis, a light source with a low photon flux density has attractiveness to adult Phycitinae. On the other hand, a light source with a high photon flux density exhibits an effect of suppressing the behavior of the adult Phycitinae. That is, it was found that in conventional light traps, the adult Phycitinae attracted by light cannot be trapped because the behavior is suppressed in the vicinity of the trap.

Further, the approach path (movement path, movement region) of the adult Phycitinae to the light source was observed. As a result of this observation, it was found that the adult Phycitinae approached the light source by flying near or walking on the floor surface.

These results show that the adult Phycitinae can be efficiently trapped by limiting the amount of light irradiating downward from the light source to an amount less than the amount of light that causes behavior suppression of the adult Phycitinae. Hereinafter, an attracting method and a light source device for attracting adult Phycitinae and a trapping method and a trapping device for attracting and trapping adult Phycitinae based on these findings will be described in detail.

In the following description, the light amount of the attracting light that suppresses the behavior of the adult Phycitinae, that is, the value of the photon flux density that suppresses the behavior of the adult Phycitinae, is referred to as a behavior suppression light amount. A region in which the value of the photon flux density of the attracting light is equal to or greater than the behavior suppression light amount is referred to as a behavior suppression region. A region in which the value of the photon flux density of the attracting light is less than the behavior suppression light amount is referred to as a non-behavior suppression region. The boundary between the behavior suppression region and the non-behavior suppression region (threshold of the behavior suppression light amount) is referred to as a behavior suppression boundary. The behavior suppression boundary can also be expressed as a set of points (surface) indicating positions where the value of the photon flux density is equal to the behavior suppression light amount. Further, a path along which the adult Phycitinae attracted by the attracting light move to the vicinity of an emission end that emits the attracting light is referred to as a movement path (approach path), and a region that can be the movement path is referred to as a movement region. A boundary between the movement region and the outside of the movement region is referred to as a movement boundary.

In the following description, a region through which the adult Phycitinae are guided to the vicinity of the emission end of the attracting light is referred to as a guide path. Here, the guide path is a region "within the movement region" and "within the non-behavior suppression region" of the Phycitinae in the region between the height of the light source (emission end) and the floor surface. The guide path may be "the non-behavior suppression region within the movement region" or "the movement region within the non-behavior suppression region". Further, a boundary between the guide path and the outside of the guide path is referred to as a reference plane. When the guide path is in "the non-behavior suppression region within the movement region", the reference plane is the behavior suppression boundary. When the guide path is in "the movement region within the non-behavior suppression region", the reference plane is the movement boundary.

First Embodiment

<Configuration>

Figure 2:
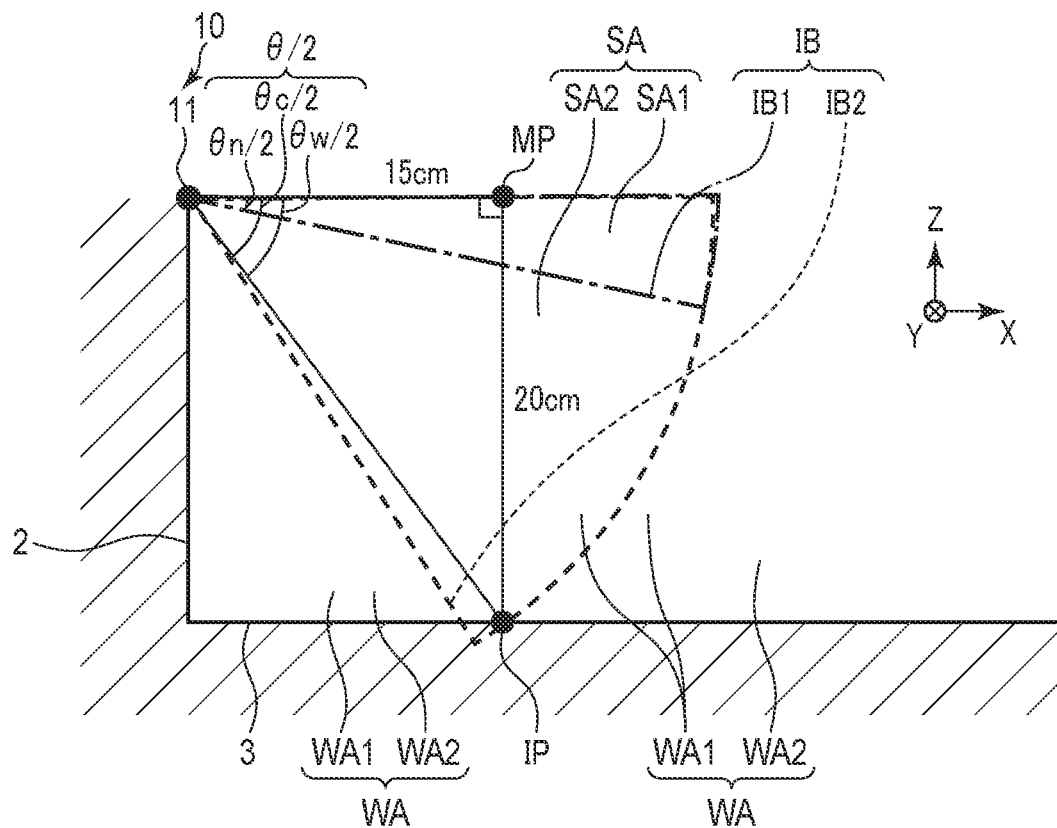
FIG. 2 is a diagram for explaining emission characteristics of attracting light according to the first embodiment.

An outline of a configuration example of a trapping device 1 according to the present embodiment is shown in FIG. 1 as a schematic diagram in which a front view (left) and a side view (right) are arranged side by side. Further, FIG. 2 is a diagram for explaining attracting light emitted from the trapping device 1.

As shown in FIG. 1, the trapping device 1 according to the present embodiment includes a light source portion 10, a trapping portion 20, and a support member 30. The light source portion 10 and the trapping portion 20 are disposed on the support member 30. The trapping device 1 is disposed such that, for example, a lower end of the support member 30 (a lower end of the trapping device 1) is in contact with a floor surface. The trapping device 1 is disposed such that, for example, a back surface (X− side surface) of the support member 30 is in contact with a wall surface.

Hereinafter, for simplicity of explanation, a direction of gravitational force is defined as a Z− direction, a direction which is perpendicular to a Z direction and in which the attracting light is emitted toward the trapping device 1 is defined as an X+ direction, and a direction perpendicular to the Z direction and the X direction is defined as a Y direction.

The light source portion 10 is configured to emit the attracting light with predetermined emission characteristics. The emission characteristics include various characteristics such as a radiation intensity, a radiation angle, and a wavelength of the attracting light. FIG. 2 is a diagram for explaining the emission characteristics of the attracting light according to the present embodiment. FIG. 2 shows an example in which attracting light having directivity is emitted from the emission end of the light source portion 10 in the horizontal direction (X+ direction). In FIG. 2, for simplicity, only a portion of the attracting light below the emission end, lower than the height of the emission end (the optical axis of the attracting light), is shown. The light source portion 10 according to the present embodiment continuously emits the attracting light at a predetermined radiation intensity (photon flux density) for a predetermined period of time. In the present embodiment and the following embodiments and modifications, the attracting light may be a continuous light or a blinking light of any frequency, and any method may be used to adjust the predetermined radiation intensity. The predetermined period of time may be any time interval from a few minutes to a few hours, from a few hours to a few days, or from a few days to a few months, and a certain insect trapping effect may be observed at any time interval.

In the case illustrated in FIG. 2, the behavior suppression boundary IB is located on the lower side in the vertical direction below the optical axis of the light source portion 10 from which the attracting light is emitted (Z− side, hereinafter simply referred to as the lower side), and is a boundary between the behavior suppression region SA and the non-behavior suppression region WA. At this time, the behavior suppression boundary IB is formed by the attracting light which is deviated from the optical axis by a predetermined angle or more and in which the photon flux density is reduced to the behavior suppression light amount. Therefore, for example, as shown in FIG. 2, when the attracting light having directivity is emitted in a conical shape, the behavior suppression boundary IB is a part of the outer periphery of the cone. The angle, the position, the area, the shape, and the like of the behavior suppression boundary IB can be appropriately determined according to the shapes and the like of the behavior suppression region SA and the non-behavior suppression region WA. The light source portion 10 can also be expressed as continuously emitting the attracting light at a predetermined radiation intensity (photon flux density) for a predetermined period of time to the upper side in the vertical direction above the behavior suppression boundary IB (Z+ side, hereinafter simply referred to as the upper side).

The attracting light emitted from the light source portion 10 is light having a property capable of attracting adults of the Phycitinae (adult Phycitinae). Whether or not the attracting light can attract the Phycitinae depends on, for example, the intensity, the wavelength, and the like of the light (attracting light). The attracting light according to the present embodiment is ultraviolet light having a central wavelength of 375 to 380 nm, but is not limited thereto. The attracting light may be any light having a wavelength capable of attracting adult Phycitinae. The attracting light may contain a wavelength component other than the ultraviolet region.

The radiation intensity of the attracting light of the light source portion 10 is preferably a radiation intensity at which the irradiance [$\mu W/cm^2$] of the attracting light in the vicinity of the trapping portion 20 (measurement position MP shown in FIG. 2) is 0.1 to 5. The photon flux density [photons/$m^2$/s] of the attracting light at the same position is preferably $0.1 \times 10^{14}$ to $10 \times 10^{14}$.

As shown in FIG. 1, the light source portion 10 includes a light source 11. An angle formed by the optical axis of the light source 11 and the behavior suppression boundary IB, as shown in FIG. 2, is defined as a light distribution angle ($\theta/2$) of the light source 11. The light source 11 is configured to emit a light beam (attracting light) having a narrow-angle light distribution angle ($\theta n/2$). For example, the narrow-angle light distribution angle $\theta n/2$ of the emitted attracting light is an angle in a range that satisfies a relationship of $L \times \tan(\theta n/2) < H$. Here, L is a distance at which the value of the photon flux density of the attracting light emitted at a predetermined photon flux density attenuates to a value less than the behavior suppression light amount in the atmosphere, and H is a height of the emission end of the light source 11. When the height H of the light source 11 is 30 cm, the narrow-angle light distribution angle ($\theta n/2$) of the light source 11 is preferably, for example, from 0° to 53° (limit light distribution angle $\theta c/2$). The narrow-angle light distribution angle ($\theta n/2$) of the light source 11 according to the present embodiment is 15°. The light source 11 according to the present embodiment is a light emitting diode (LED) or an LED array capable of emitting ultraviolet light (attracting light), but is not limited thereto. The light source 11 may be, for example, a fluorescent lamp, an incandescent lamp, a neon lamp, a mercury lamp, a halogen lamp, or the like.

The trapping portion 20 is configured to trap the Phycitinae attracted by the attracting light. The trapping portion 20 is disposed, for example, in the vicinity of the light source portion 10. For example, the trapping portion 20 is disposed in a region (guide path) where the photon flux density of the attracting light is less than a predetermined value. The trapping portion 20 includes a trapping member on the surface on the X+ side. The trapping member may be any member as long as it can trap the Phycitinae that are in contact with the trapping member. The trapping member may be, for example, an adhesive member such as an adhesive sheet (trapping paper sheet), a member that traps the Phycitinae by applying a voltage to the contacting Phycitinae, such as an electric shock insecticidal device, a member having an upper surface (inlet) formed in a funnel shape and containing water or an insecticide therein, a suction-type trapping member, a basin, or any combination of these members. The trapping portion 20 may include a plurality of trapping members in the guide path or may include a trapping member disposed in a region outside the guide path.

As shown in FIG. 1, the trapping portion 20 according to the present embodiment includes a lower trapping portion 21 and an upper trapping portion 22. The lower trapping portion 21 is disposed in the vicinity of and below (on the Z− side of) the light source 11. The upper trapping portion 22 is disposed in the vicinity of and above (on the Z+ side of) the light source 11. The trapping members of the lower trapping portion 21 and the upper trapping portion 22 are, for example, replaceable adhesive sheets.

The support member 30 supports the light source portion 10 and the trapping portion 20. The support member 30 according to the present embodiment has a rectangular plate shape, but is not limited thereto. The support member 30 may be of any shape and material as long as it can support the light source portion 10 and the trapping portion 20 at a predetermined position and angle. The light source portion 10 and the trapping portion 20 may not be integrally formed.

<Operation>

As shown in FIG. 2, the light source portion 10 forms a behavior suppression region SA1 on the upper side (Z+ side) of the behavior suppression boundary IB1 by emission of the attracting light. That is, the emission characteristics of the light source portion 10, such as the radiation intensity and the radiation angle of the attracting light, are set so that the emitted attracting light can form the behavior suppression region. In addition, as shown in FIG. 2, the light source portion 10 forms a non-behavior suppression region WA1 on the lower side (Z− side) of the behavior suppression boundary IB1 by emission of the attracting light. That is, the emission characteristics of the light source portion 10, such as the radiation intensity and the radiation angle of the attracting light, are set so that the emitted attracting light can further form the guide path.

The behavior suppression region SA1 is a region in which the value of the irradiance (photon flux density) of the attracting light is equal to or greater than the value (behavior suppression light amount) at a time when the rate (behavior suppression rate) which causes behavior suppression in the adult Phycitinae is high. The value of the irradiance (photon flux density) of the attracting light varies depending on the emission characteristics of the light source portion 10 and the relative position with respect to the emission end of the light source portion 10. For example, when the behavior suppression rate of the active adult Phycitinae is 80% or more, the behavior suppression rate can be expressed as high.

The non-behavior suppression region WA1 is a region in which the value of the irradiance (photon flux density) of the attracting light is smaller than the value (behavior suppression light amount) at a time when the behavior suppression rate is low. Therefore, the non-behavior suppression region WA1 can be expressed as a region to guide the Phycitinae attracted by the attracting light to the trapping portion 20. For example, when the behavior suppression rate of the active adult Phycitinae is less than 80%, the behavior suppression rate can be expressed as low.

The behavior suppression boundary IB1 is located on the lower side (Z− side) of the optical axis of the light source portion 10 through which the attracting light is emitted, and corresponds to a boundary between the behavior suppression region SA1 and the non-behavior suppression region WA1.

The guide path is formed at least on the lower side (Z− side) of the behavior suppression boundary IB. This is based on the fact that the movement path (movement region) through which the adult Phycitinae attracted by the attracting light move to the trapping portion 20 disposed in the vicinity of the light source portion 10 tends to be a path from the lower side (Z− side) relative to the optical axis of the attracting light toward the emission end of the attracting light. Therefore, the guide path is formed at least between the behavior suppression region SA and a floor surface 3.

As described above, the trapping method and the trapping device 1 according to the present embodiment form the guide path by emission of the attracting light, guide the adult Phycitinae attracted by the attracting light to the vicinity of the light source 11 (the emission end of the attracting light) through the guide path, and trap the adult Phycitinae. That is, the light source portion 10 according to the present embodiment can also be expressed as a light source device that attracts the adult Phycitinae. Similarly, the technique according to the present embodiment includes an attracting method for attracting the adult Phycitinae.

<Effect>

According to the attracting method, the trapping method, the light source portion 10 (light source device), and the trapping device 1 of the present embodiment, the following can be said.

The method for attracting adult Phycitinae according to the present embodiment is a method for attracting indoor adult Phycitinae, which are adults of moths that belong to the Phycitinae subfamily, the method including: emitting attracting light at a predetermined photon flux density for a predetermined period of time or longer, and forming a guide path for guiding the adult Phycitinae to the vicinity of an emission end (light source 11) of the attracting light in a region having a photon flux density lower than the predetermined photon flux density on a side lower than a height of the emission end. The light source device (light source portion 10) for attracting adult Phycitinae according to the present embodiment emits attracting light at a predetermined photon flux density, and through the emission of the attracting light, forms a guide path to guide indoor adult Phycitinae which are adults of moths that belong to the Phycitinae subfamily to the vicinity of an emission end (light source 11) of the attracting light in a region having a photon flux density lower than the predetermined photon flux density on the side lower than the height of the emission end.

According to this method and configuration, the guide path is formed in the region below the emission end of the attracting light by the emission of the attracting light, and the adult Phycitinae can be attracted to the vicinity of the emission end of the attracting light. On the other hand, the predetermined photon flux density may be maintained in a region outside the guide path. That is, as long as the guide path is formed, the photon flux density of the attracting light irradiated to the region outside the guide path is not limited. Therefore, according to this method and configuration, the adult Phycitinae can be attracted through the guide path while a wide attraction range for the adult Phycitinae is being maintained.

In addition to the attracting method described above, the trapping method for the adult Phycitinae according to the present embodiment traps the adult Phycitinae attracted by the attracting light in the guide path. Furthermore, the trapping device 1 of the adult Phycitinae according to the present embodiment includes the light source portion 10 described above, and the trapping portion 20 that is disposed in the guide path and configured to trap the adult Phycitinae attracted by the attracting light.

According to this method and configuration, it is possible to attract and trap the adult Phycitinae to the vicinity of the emission end of the attracting light through the guide path formed by the emission of the attracting light. The trapping may be performed in the guide path, and the trapping portion 20 may be disposed at least in the guide path.

In the attracting method, the trapping method, the light source device, and the trapping device 1 described above, the guide path is located in a non-behavior suppression region of the region between the height of the emission end and the floor, where the value of the photon flux density of the attracting light is less than the value of the photon flux density (behavior suppression light amount) that causes behavior suppression in the adult Phycitinae. According to the method and configuration, the guide path can be a region in which the behavior suppression in the adult Phycitinae does not occur or occurs at a low rate. Therefore, it is possible to attract or trap the adult Phycitinae from a wide range of space while causing no behavior suppression or reducing the rate of behavior suppression in the adult Phycitinae.

In the attracting method, the trapping method, the light source device and the trapping device 1 described above, the guide path is located in a non-behavior suppression region of the region between the height of the emission end and the floor, where the value of the photon flux density of the attracting light is less than the value of the photon flux density (behavior suppression light amount) that causes behavior suppression in the adult Phycitinae, and in a movement region through which the adult Phycitinae attracted by the attracting light move toward the vicinity of the emission end. Here, the non-behavior suppression region may be within the movement region of the adult Phycitinae attracted by the attracting light, or the movement region may be within the non-behavior suppression region. According to this method and configuration, since the guide path is a movement region of the adult Phycitinae attracted by the attracting light and is a region (non-behavior suppression region) in which behavior suppression does not occur or occurs at a low rate in the adult Phycitinae, it is possible to improve the attraction rate and the trapping rate of the adult Phycitinae.

In the attracting method and the trapping method described above, the emission of the attracting light is emission of the attracting light having directivity. In the light source device and the trapping device 1 described above, the attracting light has directivity. According to this method and configuration, the guide path described above can be easily formed. For example, the light distribution angle $\theta/2$ satisfies a relationship of $0° \leq \theta/2 \leq 53°$.

In the attracting method, the trapping method, the light source device, and the trapping device 1 described above, the guide path is a region within 15 cm or less from the surface on which the emission end is disposed, along a line substantially parallel to the floor surface, and a region within 30 cm or less in height from the floor surface. The method and configuration can attract or trap the adult Phycitinae from a wide range of space without causing or reducing the rate of occurrence of the behavior suppression in the adult Phycitinae. That is, it is possible to appropriately attract or trap the adult Phycitinae moving from the lower side of the optical path of the attracting light toward the emission end of the attracting light.

In the attracting method, the trapping method, the light source device, and the trapping device 1 described above, the attracting light is emitted in the horizontal direction, and the photon flux density d [photons/m²/s] of the attracting light in the guide path is a value that satisfies a relationship of $0<d<2\times10^{14}$ or $0<d\leq0.1\times10^{14}$. With this method and configuration, the adult Phycitinae can be attracted or trapped without causing or reducing the rate of occurrence of the behavior suppression in the adult Phycitinae.

In the attracting method and the trapping method described above, the attracting light is emitted by at least one light emitting diode (LED). The light source device and the trapping device 1 described above include at least one LED configured to emit the attracting light. With this method and configuration, power consumption for attraction or trapping can be reduced. In addition, the structure of the light source device and the trapping device 1 can be simplified, downsized, reduced in cost, and extended in life. Some LEDs are configured to have directional characteristics of emitting a light beam in a narrow-angle light distribution due to a cover (optical system) made of resin, glass, or the like in which the LED is sealed. The LEDs of this type easily realize attracting light of a narrow-angle light distribution with strong directivity.

In the trapping method described above, trapping is performed by placing the trapping member in the vicinity of the emission end in the guide path. In the trapping device 1 described above, the trapping portion 20 is placed in the vicinity of the emission end in the guide path. With this method and configuration, it is possible to appropriately trap the adult Phycitinae attracted by the attracting light.

In the trapping method described above, trapping is performed by disposing the trapping member on the floor surface in the guide path. In the trapping device 1 described above, the trapping portion 20 is disposed on the floor surface in the guide path. With this method and configuration, the adult Phycitinae attracted by the attracting light can be appropriately trapped even while they are in the middle of moving toward the vicinity of the light source 11.

Second Embodiment

A trapping device 1 according to the present embodiment will be described below with reference to the drawings. In the following, differences from the first embodiment will be explained. Identical symbols will be used for identical parts, and detailed explanations thereof will be omitted.

<Configuration>

Figure 3:
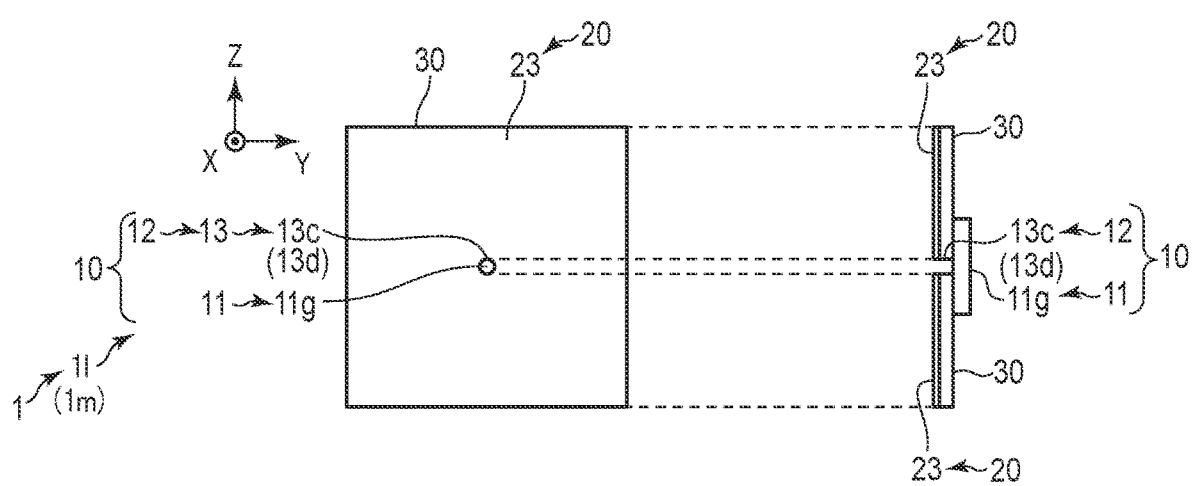
FIG. 3 is a schematic diagram showing side by side a front view (left) and a side view (right) of an outline of a configuration example of a trapping device according to a second embodiment.

An outline of a configuration of the trapping device 1 according to the present embodiment is shown in FIG. 3 as a schematic diagram in which a front view (left) and a side view (right) are arranged side by side. Regarding the first embodiment, explanations have been given for the trapping device 1 configured to form the non-behavior suppression region WA1 (WA) and the guide path below the height of the light source 11, using the light source 11 capable of emitting the attracting light having the directivity. On the other hand, the attracting light may be adjusted to a narrow angle due to factors other than the characteristics of the light source 11. Therefore, regarding the present embodiment, explanations will be given for the trapping device 1 including an optical element 12 that adjusts a light beam (attracting light) emitted from the light source 11 to a narrow-angle attracting light.

As shown in FIG. 3, the light source portion 10 of the trapping device 1 according to this embodiment further includes an optical element 12 in addition to the light source 11. The optical element 12 is disposed on the X+ side of the light source 11.

The light source 11 according to the present embodiment is, for example, a fluorescent tube configured to emit ultraviolet light, but is not limited thereto. The light source 11 may be any light source configured to emit the attracting light at a wavelength and intensity that can attract the adult Phycitinae. It may be a light emitting diode (LED), an incandescent lamp, a neon lamp, a mercury lamp, a halogen lamp, or the like.

The optical element 12 adjusts the intensity, directional characteristics, wavelength, and the like of the attracting light, so that the light beam (attracting light) emitted from the light source 11 is emitted from the emission end of the light source portion 10 with predetermined emission characteristics. As shown in FIG. 3, the light source portion 10 according to the present embodiment includes a diaphragm portion 13 as the optical element 12. The diaphragm portion 13 covers a part of the light source 11 and limits an area (radiation area) from which the light source 11 radiates the attracting light. The shape of the opening of the diaphragm portion 13 may be a circle, a triangle, a rectangle, or a polygon having more angles. That is, the diaphragm portion 13 may be, for example, a portion that defines the periphery of a hole such as a pinhole, a portion that defines the periphery of a slit, or a cover that covers the light source 11. As the diaphragm portion 13, a member configured to attenuate the attracting light (light attenuating member) such as a light attenuating filter (Neutral-Density (ND) filter) may be used. Alternatively, a light attenuating member configured to attenuate the attracting light by 100%, that is, a member configured to block the attracting light (light blocking member) may be used. The shape, area, and material of the opening of the diaphragm portion 13 can be designed as appropriate.

The trapping portion 20 included in the trapping device 1 according to the present embodiment includes a central trapping portion 23. The central trapping portion 23 is disposed in the vicinity of the X+ side of the light source 11. The trapping member of the central trapping portion 23 is disposed on the X+ side of the central trapping portion 23. The configuration of the trapping member is the same as that of the first embodiment. The diaphragm portion 13 is provided at the center of the central trapping portion 23. The shape of the trapping member of the central trapping portion 23 according to the present embodiment is rectangular, but is not limited thereto. The shape of the trapping member may be any shape as long as it can trap the adult Phycitinae.

<Operation and Effect>

In the trapping device 1 according to the present embodiment, the radiation area of the light source 11 is limited by the diaphragm portion 13, thereby adjusting the radiation angle (directional characteristics) of the attracting light to a narrow angle. Accordingly, the trapping device 1 of the present embodiment can emit the attracting light of the narrow-angle light distribution (attracting light having directivity) in the same manner as in the trapping device 1 of the first embodiment. That is, the trapping device 1 of the present embodiment is configured to form the guide path by forming the non-behavior suppression region WA below the height of the light source 11, in the same manner as in the trapping device 1 of the first embodiment.

According to the trapping device 1 of the present embodiment, the following can be said.

In the attraction method and the trapping method described above, emission of the attracting light having directivity (attracting light of narrow-angle light distribution) is performed by the optical element 12 that emits the light beam incident from the light source 11 as the attracting light having directivity. Further, the light source device and the trapping device 1 described above include the light source 11 and the optical element 12 that emit the light beam incident from the light source 11 as the attracting light having directivity. According to this method and configuration, the same effects as those of the attracting method, the trapping method, the light source device, and the trapping device 1 of the first embodiment can be obtained. In addition to the effect of the trapping device 1 of the first embodiment, the present embodiment has an effect wherein less restriction is required for the light source selectable as the light source 11. For example, the light source 11 according to the present embodiment does not have to be configured to provide narrow-angle light distribution.

In the attraction method and the trapping method described above, the emission of the attracting light having directivity (attracting light of narrow-angle light distribution) is performed by disposing a diaphragm (diaphragm portion 13) including a hole portion or a slit at a position facing the light source 11. In the light source device and the trapping device 1 described above, the optical element 12 is the diaphragm portion 13 including the hole portion or the slit disposed at the position facing the light source 11. According to this method and configuration, it is possible to emit the attracting light having directivity (attracting light of narrow-angle light distribution) by a simple method or structure without preparing an optical system such as a condensing lens.

The optical element 12 may be constituted by an optical member such as a condenser lens or a collimator. When the light beam (attracting light) emitted from the light source 11 includes a wavelength component other than the ultraviolet region, the optical element 12 may include a wavelength selection plate configured to transmit only a light beam in a specific wavelength range or reflect only a light beam in a specific wavelength range. In this case, the selectivity of the light source is further improved. The optical element 12 may not be provided in the trapping portion 20.

The central trapping portion 23 according to this embodiment is applicable to the trapping device 1 according to the first embodiment. That is, the trapping device 1 according to the first embodiment may include at least one of the lower trapping portion 21 or the central trapping portion 23. Further, the trapping device 1 according to the present embodiment may include at least one of the lower trapping portion 21 or the upper trapping portion 22 according to the first embodiment, or may further include the trapping member disposed on the floor surface. The trapping portion 20 of the trapping device 1 according to the present embodiment may be only the trapping member disposed on the floor surface. In any case, at least one trapping member may be disposed in the guide path, so that trapping can be performed in the guide path.

[First Modification]

Hereinafter, the light source portion 10 (light source device) constituting the trapping device 1 according to the present modification will be described with reference to the drawings. In the following, differences from the first embodiment or the second embodiment will be explained. Identical symbols will be used for identical parts, and detailed explanations thereof will be omitted.

In the first embodiment and the second embodiment, the attracting method, the trapping method, the light source device, and the trapping device 1 described above form the non-behavior suppression region and the guide path below (on the Z– side of) the behavior suppression boundary IB by emitting the attracting light having directivity (attracting light of narrow-angle light distribution). The attracting light of the narrow-angle light distribution described above is attainable while gradually attenuating, as long as it travels in the optical axis direction of the attracting light. On the other hand, the attracting light of the narrow-angle light distribution described above has a narrow angle also in the horizontal direction (X direction or Y direction). For this reason, there is a problem of low attractiveness and low trapping rate for the Phycitinae released from a release point located in a direction horizontally deviated from the emission direction (optical axis) of the attracting light. Therefore, in the technique according to the present embodiment, the non-behavior suppression region and the guide path are formed by emitting the attracting light having the directivity of the wide-angle light distribution in the horizontal direction and the narrow-angle light distribution in the direction of gravitational force (Z direction).

<Configuration>

FIG. 4 is a schematic view showing the configuration of the light source portion 10 according to the present modification. As shown in FIG. 4, the light source portion 10 according to the present embodiment includes a plurality of light sources 11 of the first embodiment. The plurality of light sources 11 are radially disposed on the support member 30 as shown in FIG. 4, so that the attracting light is radially emitted. That is, the plurality of light sources 11 are disposed at predetermined intervals (for example, at equal intervals) on an arc defined by the outer peripheral surface of the support member 30 having a semi-cylindrical shape. The shape of the support member 30 is not limited to the semi-cylindrical shape, and may be, for example, a hemispherical shape.

<Effect>

According to the trapping device 1 of the present modification, the following can be said.

In the attraction method, the trapping method, the light source device, and the trapping device 1 described above, the emission of the attracting light having directivity (attracting light of narrow-angle light distribution) is performed radially in the horizontal direction. According to this method and configuration, in addition to the effects obtained by the attraction method, the trapping method, the light source device, and the trapping device 1 according to the first embodiment or the second embodiment, it is possible to form the behavior suppression region SA having a wide angle in the horizontal direction, thereby attracting the Phycitinae in a wider range. Furthermore, since the guide path can be formed within a wide range in the horizontal direction, there is an effect wherein the adult Phycitinae can be trapped from a wider range of space.

Although the case where the plurality of light sources 11 according to the first embodiment are radially arranged has been described as an example, the present invention is not limited thereto. For example, a plurality of light source portions 10 according to the second embodiment may be provided. Even with this method and configuration, the same effects as described above can be obtained.

The light source device and the trapping device 1 according to the present modification may include, for example, at least one wide-angle light distribution light source 11 and a plurality of optical elements 12 arranged radially. According to the method and the configuration using these components, it is possible to produce an effect wherein the configuration of the trapping device 1 can be simplified and the energy consumption can be reduced, since the number of light sources 11 can be reduced.

The light source device and the trapping device 1 according to the present modification may include, for example, at least one wide-angle light distribution light source 11 and an optical element 12 provided with a plurality of diaphragm portions 13 or slits arranged radially. According to the method and the configuration using these components, it is possible to produce an effect wherein the energy consumption can be reduced and the manufacturing cost can be also reduced, since the number of light sources 11 and the number of optical elements 12 can be reduced.

Although the case in which the light sources 11 are radially arranged has been described as an example, the present modification is not limited thereto. For example, the plurality of light sources 11 may be arranged substantially linearly on the same plane so that the directions of emission of the attracting light are different from one another. Further, the optical element 12 may include a slit opened in the horizontal direction. Even with the method and configuration using these components, the same effects as described above can be obtained.

Third Embodiment

A trapping device 1 according to the present embodiment will be described below with reference to the drawings. In the following, differences from the first embodiment, the second embodiment, or the first modification will be explained. Identical symbols will be used for identical parts, and detailed explanations thereof will be omitted.

<Configuration>

Figure 5:
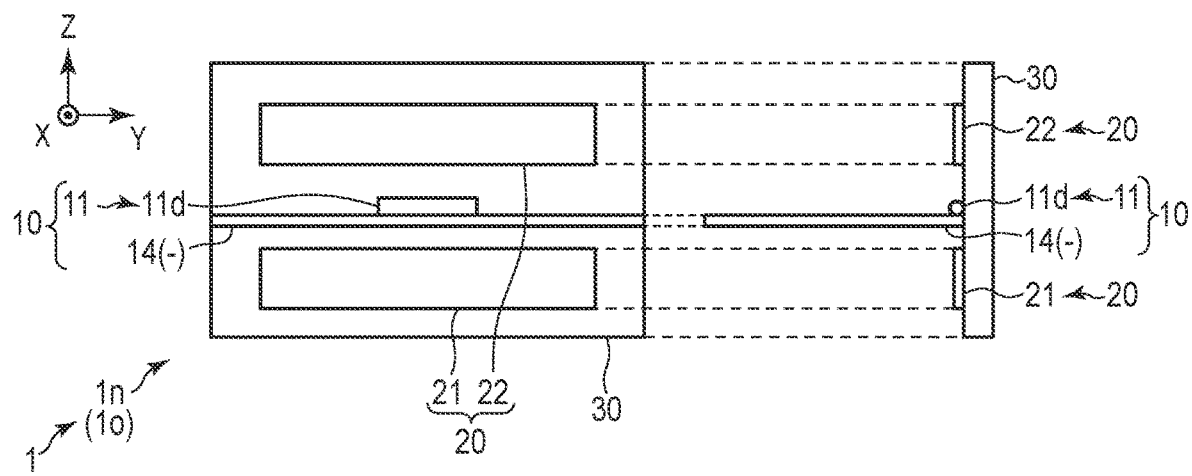
FIG. 5 is a schematic diagram showing side by side a front view (left) and a side view (right) of an outline of a configuration example of a trapping device according to a third embodiment.

An outline of a configuration of the trapping device 1 according to the present embodiment is shown in FIG. 5 as a schematic diagram in which a front view (left) and a side view (right) are arranged side by side. In the first embodiment, the second embodiment, and the first modification, the technique has been described in which the non-behavior suppression region WA and the guide path can be formed by emitting the attracting light of the narrow-angle light distribution (attracting light having directivity) in at least one direction. However, the attracting light is not limited to the attracting light of the narrow-angle light distribution. For example, the non-behavior suppression region WA and the guide path can be formed in the same manner even with attracting light having directivity as described below.

As shown in FIG. 5, the light source portion 10 according to the present embodiment includes a light source 11 and an optical element 12. The optical element 12 is disposed on the X+ side of the light source 11.

The light source 11 according to the present embodiment is, for example, a fluorescent tube configured to emit ultraviolet light, but is not limited thereto. The light source 11 may be any light source configured to emit attracting light at a wavelength and intensity that can attract the adult Phycitinae. It may be a light emitting diode (LED), an incandescent lamp, a neon lamp, a mercury lamp, a halogen lamp, or the like.

As shown in FIG. 5, the light source portion 10 according to the present embodiment includes a light attenuating member 14 as the optical element 12. The light attenuating member 14 is a member configured to attenuate the attracting light so that the value of the irradiance (photon flux density) of the attracting light that has passed through the light attenuating member 14 is less than the behavior suppression light amount in the non-behavior suppression region. As the light attenuating member 14, a member capable of attenuating the attracting light, such as a light attenuating filter (ND filter), is used. A member capable of attenuating the attracting light by 100%, that is, a member configured to block the attracting light (light blocking member) may be used as the light attenuating member 14. Even when the light is blocked, the light goes slightly around to the back (lower side) of the light blocking member due to diffraction, so that the guide path (non-behavior suppression region) is formed. The light attenuating member 14 is disposed at a position that is below (on the Z− side of) the light source 11 and above (on the Z+ side of) the lower trapping portion 21. For example, when the photon flux density of the attracting light is changed from a value equal to or more than the behavior suppression light amount to a value less than the behavior suppression light amount via the light attenuating member 14, the surface on which the light attenuating member 14 is disposed is the behavior suppression boundary according to the present embodiment. On the other hand, there may be a case where the photon flux density of the attracting light is further attenuated and becomes less than the behavior suppression light amount after being attenuated by the light attenuating member 14. At this time, the behavior suppression boundary is a position where the photon flux density of the attracting light is attenuated to be less than the behavior suppression light amount.

<Operation and Effect>

The light attenuating member 14 according to the present embodiment attenuates the intensity of the attracting light directed downward below the light attenuating member 14 of the attracting light emitted from the light source 11, and forms a region having an intensity lower than the intensity of the attracting light having a low behavior suppression rate (non-behavior suppression light amount). On the other hand, the intensity of the attracting light emitted upward above the light attenuating member 14 is not attenuated. In this manner, the light source device and the trapping device 1 according to the present embodiment emit attracting light with a high radiation intensity above the light attenuating member 14 and emit the attracting light with an attenuated, low radiation intensity below the light attenuating member 14. Even with the attracting light having such directivity, as in the first embodiment, the second embodiment, and the first modification, the non-behavior suppression region WA and the guide path can be formed while attracting a wide range of the Phycitinae.

According to the trapping device 1 of the present embodiment, the following can be said.

In the attraction method and the trapping method described above, the emission of the attracting light is performed with the light attenuating member 14 configured to reduce the photon flux density of the attracting light being arranged below the emission end. The light attenuating member 14 makes the predetermined photon flux density less than the value of the photon flux density (behavior suppression light amount) that causes the behavior suppression in the adult Phycitinae in the guide path. The light source device and the trapping device 1 described above include the light attenuating member 14 that is arranged below the emission end and makes the predetermined photon flux density less than the value (behavior suppression light amount) of the photon flux density that causes the behavior suppression in the adult Phycitinae in the guide path. In the adult Phycitinae attraction method, the trapping method, the light source device and the trapping device 1 described above, the light attenuating member 14 extends horizontally. That is, the light attenuating member 14 is disposed in parallel with the floor surface, and extends in the emission direction of the attracting light from the surface on which the emission end is arranged. The light attenuating member 14 may be a light blocking member that reduces the attracting light by 100%.

According to the method and configuration, on the upper side of the behavior suppression boundary IB, the attracting light of the behavior suppression light amount or more that can attract the Phycitinae in a wider range is emitted. On the lower side of the behavior suppression boundary IB, the attracting light radiated from the light source 11 is attenuated by the light attenuating member 14 and thereafter emitted. Therefore, according to the method and configuration of the present embodiment, as in the above-described embodiments and modification, since the non-behavior suppression region and the guide path can be formed on the lower side of the light attenuating member 14 while a wide attraction range is formed, the adult Phycitinae can be attracted or trapped regardless of the emission characteristics of the light source 11. In addition, the light source device and the trapping device 1 according to the present embodiment produce an effect wherein the behavior suppression region effective for attracting the Phycitinae can be easily enlarged as compared with the trapping device 1 according to the first embodiment and the second embodiment. Further, even when the flying route of a moth is curved, the moth can be physically prevented from moving to the behavior suppression region SA. As a result, it is possible to prevent the occurrence of a problem wherein the number of trapped moths is reduced due to the behavior suppression of the moths that have moved to the behavior suppression region SA.

[Second Modification]

A trapping device 1 according to the present modification will be described below. In the following, differences from the above-described embodiments and modification will be explained. Identical symbols will be used for identical parts, and detailed explanations thereof will be omitted.

In the embodiments and the modification described above, attracting light is emitted and the trapping device 1 attracts the adult Phycitinae by the attracting light, but the present invention is not limited thereto. In addition to the attracting light, the trapping device 1 may further include attraction means other than the attracting light.

The attracting method and the trapping method described above further include attracting the adult Phycitinae with an attractant for the adult Phycitinae (sex pheromone for the adult Phycitinae). The light source device and the trapping device 1 described above further include a medicament-containing portion configured to diffuse the attractant for the adult Phycitinae to the surroundings. The medicament-containing portion is disposed, for example, in the vicinity of the trapping portion 20. However, the medicament-containing portion may be disposed in the behavior suppression region SA as long as it is configured to allow a chemical substance such as a sex pheromone to diffuse into the guide path. According to the method and configuration, in addition to the attracting light that forms the behavior suppression region SA, the chemical substance that attracts the adult Phycitinae, such as sex pheromones, produces the effect of further improving the attractiveness of the trapping device 1 for the adult Phycitinae.

The adult Phycitinae attracted by the sex pheromone or the like can also be guided to the trapping portion 20 through the guide path. That is, there is an effect wherein a combination of a light trap and a pheromone-baited trap can be realized, which has been difficult in the conventional art. The technique according to the present modification can be applied to the trapping device 1 according to any of the above-described embodiments and modification.

The non-behavior suppression region and the guide path may be formed by determining the emission angle of the attracting light in accordance with the light distribution angle ($\theta/2$) of the light source 11. In this case, the emission angle may be adjusted upward so that the behavior suppression boundary is not brought into contact with the floor surface. Even with such a method and configuration, the same effects as those of the above-described embodiments and modification can be obtained.

EXAMPLES

Test Example 1

First, the Phycitinae were attracted by attracting light, and the emission characteristics of the attracting light required for trapping the attracted Phycitinae in the vicinity of the emission end of the attracting light were examined. In this test example, the relationship between the irradiance (photon flux density) of the attracting light and the effect of attracting (trapping) the Phycitinae was examined.

Figure 6:
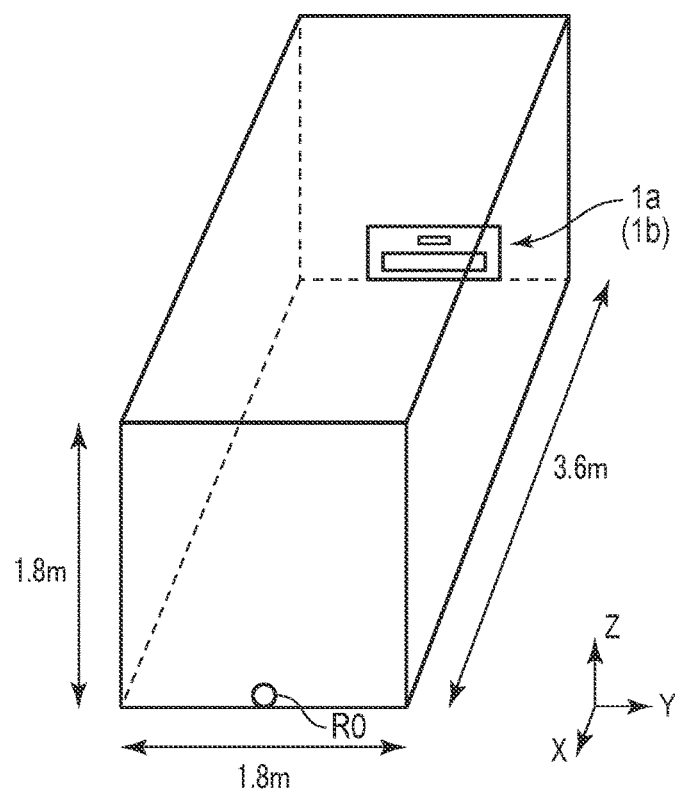
FIG. 6 is a schematic diagram showing an outline of a configuration of a test region according to Test Example 1.

FIG. 6 shows a configuration example of a test region according to this test example as a schematic view. As shown in FIG. 6, the test region according to this test example has a depth (X direction) of 3.6 m, a width (Y direction) of 1.8 m, and a height (Z direction) of 1.8 m. On a wall surface on the X− side of the test region, a first test trapping device 1a according to the present test example is disposed so as to be capable of emitting attracting light in the X+ direction. As shown in FIG. 6, the first test trapping device 1a is disposed such that the lower end of the trapping device is in contact with the floor surface. An experimental insect release point R0 in this test region is the center of the wall surface on the X+ side and on the floor surface. The test region is configured so as to not allow light to enter from outside the test region.

Figure 7:
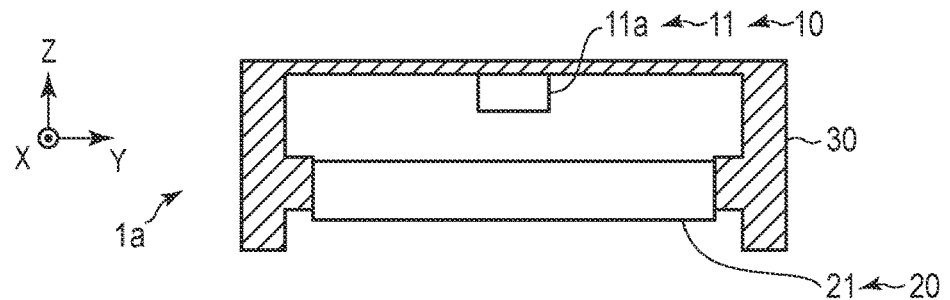
FIG. 7 is a schematic diagram showing an outline of a configuration of a trapping device according to Test Example 1.

FIG. 7 shows an outline of a configuration of the first test trapping device 1a used in this test as a schematic view. The first test trapping device 1a includes a light source portion 10 including a light source 11, a trapping portion 20 including a lower trapping portion 21, and a support member 30. As shown in FIG. 7, the first test trapping device 1a has a configuration in which the lower trapping portion 21 is disposed in the vicinity of and below (on the Z-side of) the light source 11. The light source 11 (first light source 11a) of the first test trapping device 1a is a light emitting diode array (48 elements, NS375L-3RLQ, manufactured by Nitride Semiconductor Co., Ltd.) capable of emitting ultraviolet light. The first test trapping device 1a is configured to adjust the light intensity of an emitted light by adjusting an input voltage. The central wavelength of the light beam (attracting light) emitted from the first light source 11a is 375 to 380 nm. The trapping member of the lower trapping portion 21 is disposed on the X+ side of the lower trapping portion 21. The trapping member is a replaceable adhesive paper sheet.

Prior to this test, the irradiance of the light beam (attracting light) emitted from the first light source 11a was measured. The irradiance of the attracting light by the first light source 11a was measured for each of a plurality of radiation intensities of the first light source 11a. The irradiance was measured at a position (measurement position MP shown in FIG. 2) 15 cm away from and directly opposite to the emission end of the attracting light. To measure the irradiance, HSU-100S manufactured by Asahi Spectra Co., Ltd. was used. Here, the magnitude of the irradiance [W/m$^2$] indicates the amount of radiant flux (luminous flux of the attracting light) incident per unit area, and has a correlation with the magnitude of the radiation intensity of the attracting light when emitted from the light source portion 10. The irradiance can be expressed as a photon flux density [photons/m$^2$/s] using the wavelength [m] of the light beam. The photon flux density is a value indicating the number of photons per unit time and unit area.

The test subjects (experimental insects) used in this test were tobacco moths and Indian meal moths. In this test, 25 males and 25 females of the tobacco moths and 25 males and 25 females of the Indian meal moths two days after emergence were used as experimental insects.

The procedure of this test is described below. First, the adhesive paper sheet was attached to the trapping portion 20. Thereafter, the 100 experimental insects were simultaneously released into the test region from the above-mentioned release point. After the release, the light source portion 10 was caused to emit the attracting light at a predetermined radiation intensity. After the elapse of 23 hours, the adhesive paper sheet was retrieved, and the number of experimental insects trapped by the adhesive paper sheet was counted.

In this test, the above-described procedure was performed for each of the plurality of radiation intensities. The plurality of radiation intensities are those in which the values of the photon flux densities calculated as described above are 0, $0.1 \times 10^{14}$, $2 \times 10^{14}$, $10 \times 10^{14}$, $20 \times 10^{14}$, $40 \times 10^{14}$, $60 \times 10^{14}$, $75 \times 10^{14}$, and $100 \times 10^{14}$, respectively. The adhesive paper sheet was replaced by a new one for each test.

Figure 9:
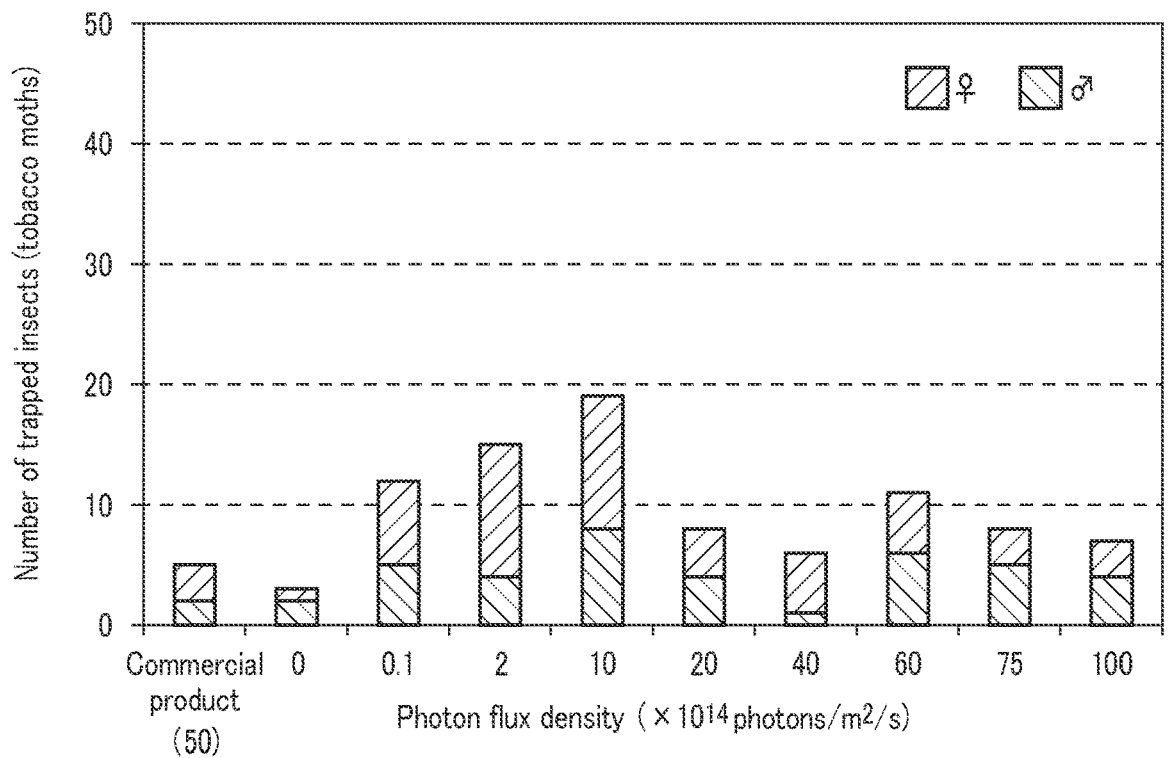
FIG. 9 is a graph showing the relationship between the photon flux density of the attracting light and the number of trapped tobacco moths.
Figure 10:
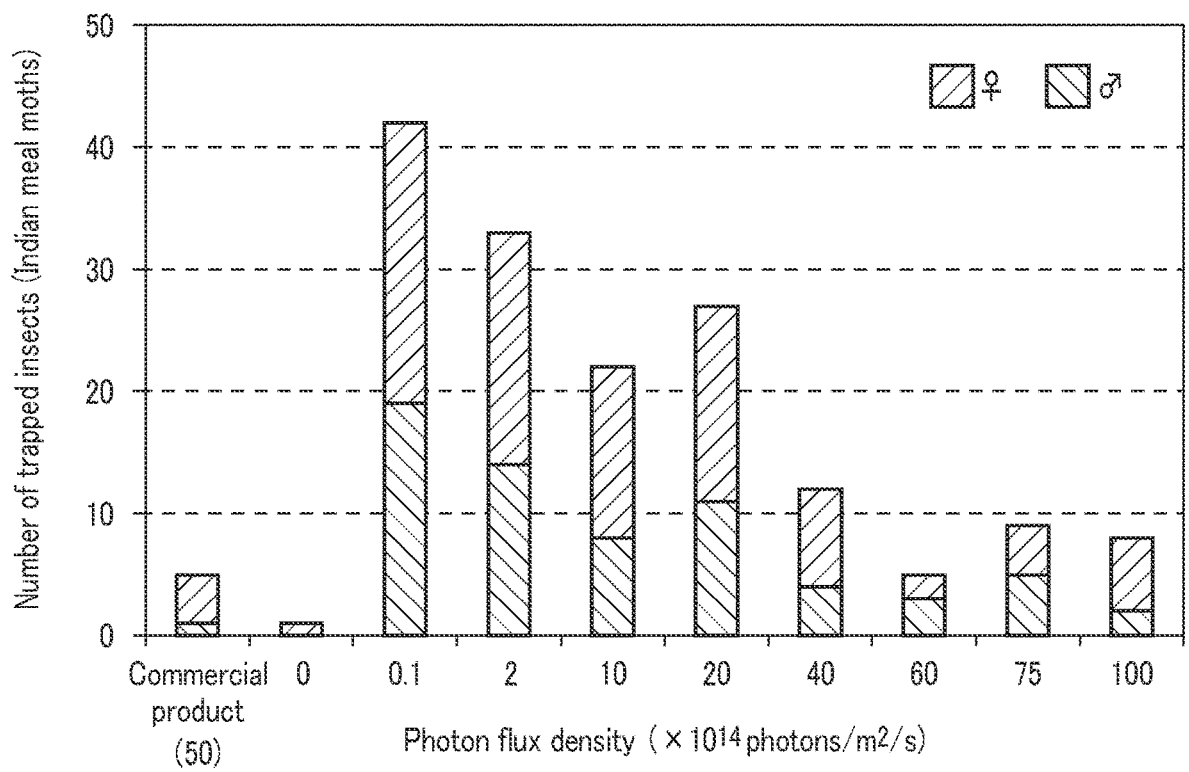
FIG. 10 is a graph showing the relationship between the photon flux density of the attracting light and the number of trapped Indian meal moths.

FIG. 9 and FIG. 10 show the results of this test. FIG. 9 and FIG. 10 show the number of trapped tobacco moths and the number of trapped Indian meal moths, respectively. In FIGS. 9 and 10, the horizontal axis represents photon flux density [photons/m$^2$/s], and the vertical axis represents the number of trapped insects.

As shown in FIG. 9, for example, it was found that when the value of the photon flux density was in a range of greater than 0 and smaller than $20 \times 10^{14}$, the number of trapped tobacco moths was large. The range of photon flux density that caused a large number of tobacco moths to be trapped is not limited to a range of greater than 0 and smaller than $20 \times 10^{14}$, but includes a range of greater than 0 and smaller than $10 \times 10^{14}$, greater than 0 and smaller than $2 \times 10^4$, greater than 0 and smaller than $0.1 \times 10^4$, $0.1 \times 10^{14}$ or greater and smaller than $20 \times 10^{14}$, $0.1 \times 10^{14}$ or greater and smaller than $10 \times 10^{14}$, $0.1 \times 10^{14}$ or greater and smaller than $2 \times 10^{14}$, $2 \times 10^{14}$ or greater and smaller than $20 \times 10^{14}$, $2 \times 10^{14}$ or greater and smaller than $10 \times 10^{14}$, or $10 \times 10^{14}$ or greater and smaller than $20 \times 10^{14}$. Further, the values of photon flux density that caused a large number of tobacco moths to be trapped include the values $0.1 \times 10^{14}$, $2 \times 10^{14}$, and $10 \times 10^{14}$. On the other hand, for example, when the photon flux density is $20 \times 10^{14}$ or more, it was found that the number of trapped tobacco moths was small.

As shown in FIG. 10, for example, it was found that when the value of the photon flux density was in the range of greater than 0 and smaller than $40 \times 10^{14}$, the number of trapped Indian meal moths was large. The range of photon flux density that caused a large number of Indian meal moths to be trapped is not limited to the range of greater than 0 and smaller than $40 \times 10^{14}$, but includes a range of greater than 0 and smaller than $20 \times 10^{14}$, greater than 0 and smaller than $10 \times 10^{14}$, greater than 0 and smaller than $2 \times 10^{14}$, greater than 0 and smaller than $0.1 \times 10^{14}$, $0.1 \times 10^{14}$ or greater and smaller than $40 \times 10^{14}$, $0.1 \times 10^{14}$ or greater and smaller than $20 \times 10^{14}$, $0.1 \times 10^{14}$ or greater and smaller than $10 \times 10^{14}$, $0.1 \times 10^{14}$ or greater and smaller than $2 \times 10^{14}$, $2 \times 10^{14}$ or greater and smaller than $40 \times 10^{14}$, $2 \times 10^{14}$ or greater and smaller than $20 \times 10^{14}$, $2 \times 10^{14}$ or greater and smaller than $10 \times 10^{14}$, $10 \times 10^{14}$ or greater and smaller than $40 \times 10^4$, $10 \times 10^4$ or greater and smaller than $20 \times 10^{14}$, or $20 \times 10^{14}$ or greater and smaller than $40 \times 10^{14}$. Further, the values of photon flux density that caused a large number of Indian meal moths to be trapped include the values $0.1 \times 10^{14}$, $2 \times 10^{14}$, $10 \times 10^{14}$, and $20 \times 10^{14}$. On the other hand, for example, when the photon flux density is $40 \times 10^{14}$ or more, it was found that the number of trapped Indian meal moths was small.

Figure 8:
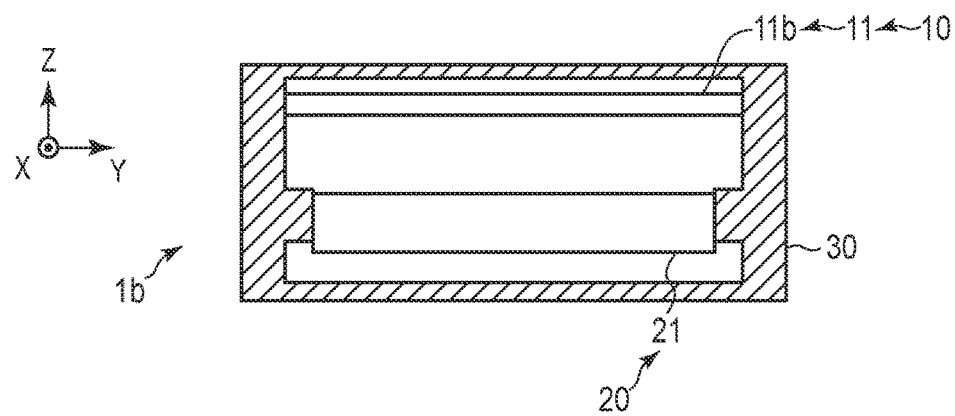
FIG. 8 is a schematic diagram showing an outline of a configuration of a trapping device according to a comparative example of Test Example 1.

Furthermore, in this test, a comparative test was performed using a commercially available insect trap (Mushipon: a registered trademark, MP-301, manufactured by Ben-Har Scale Co., Ltd., a second test trapping device 1b). FIG. 8 shows an outline of a configuration of the second test trapping device 1b used in this test as a schematic view. The second test trapping device 1b is the same as the first test trapping device 1a except that the light source 11 and the support member 30 are different in shape from those of the first test trapping device 1a. The light source 11 (second light source 1b) of the second test trapping device 1b is a fluorescent tube for an insect trap (insect trapping fluorescent lamp, FL30SBL, manufactured by Toshiba Lighting & Technology Corporation) having a rated power consumption of 30 W and capable of emitting ultraviolet light. The radiation intensity of the second test trapping device 1b was a radiation intensity at which the value of the photon flux density calculated as described above was $50 \times 10^{14}$. FIG. 9 and FIG. 10 show the results of this test together with the test results in the first test example. As shown in FIG. 9 and FIG. 10, it was confirmed that the number of trapped tobacco moths and the number of trapped Indian meal moths were small at the radiation intensity at which the value of the photon flux density was $50 \times 10^{14}$ in the commercially available product.

The matter described above showed that the Phycitinae were easily trapped when the value of the irradiance (photon flux density) was low, but the Phycitinae were not easily trapped when the value of the irradiance (photon flux density) was high. In the first test trapping device 1a and the second test trapping device 1b, the trapping portion 20 is disposed in the vicinity of the light source portion 10. Therefore, the results of this test can also be evaluated so that the number of trapped Phycitinae is decreased when the behavior suppression region, which is a region of high irradiance (photon flux density), is located in the vicinity of the trapping portion 20. When the adult Phycitinae are attracted by the attracting light and trapped by the trapping member disposed in the vicinity of the emission end of the attracting light, the intensity of the attracting light applied to the adult Phycitinae is preferably set to any one of the ranges of greater than 0 and smaller than $40 \times 10^{14}$, greater than 0 and smaller than $20 \times 10^{14}$, greater than 0 and smaller than $10 \times 10^{14}$, greater than 0 and smaller than $2 \times 10^{14}$, greater than 0 and smaller than $0.1 \times 10^{14}$, $0.1 \times 10^{14}$ or greater and smaller than $40 \times 10^{14}$, $0.1 \times 10^{14}$ or greater and smaller than $20 \times 10^4$, $0.1 \times 10^{14}$ or greater and smaller than $10 \times 10^{14}$, $0.1 \times 10^{14}$ or greater and smaller than $2 \times 10^{14}$, $2 \times 10^{14}$ or greater and smaller than $40\times10^{14}$, $2\times10^{14}$ or greater and smaller than $20\times10^{14}$, $2\times10^{14}$ or greater and smaller than $10\times10^{14}$, $10\times10^{14}$ or greater and smaller than $40\times10^{14}$, $10\times10^{14}$ or greater and smaller than $20\times10^{14}$, or $20\times10^{14}$ or greater and smaller than $40\times10^{14}$. More preferably, it is set to any one of the ranges of greater than 0 and smaller than $20\times10^{14}$, greater than 0 and smaller than $10\times10^{14}$, greater than 0 and smaller than $2\times10^{14}$, greater than 0 and smaller than $0.1\times10^{14}$, $0.1\times10^{14}$ or greater and smaller than $20\times10^{14}$, $0.1\times10^{14}$ or greater and smaller than $10\times10^{14}$, $0.1\times10^{14}$ or greater and smaller than $2\times10^{14}$, $2\times10^{14}$ or greater and smaller than $20\times10^{14}$, $2\times10^{14}$ or greater and smaller than $10\times10^4$, or $10\times10^{14}$ or greater and smaller than $20\times10^{14}$. The value of the photon flux density in the vicinity of the trapping member includes any one of $0.1\times10^{14}$, $2\times10^{14}$, $10\times10^{14}$, and $20\times10^{14}$, and preferably includes any one of $0.1\times10^{14}$, $2\times10^{14}$, and $10\times10^{14}$.

Test Example 2

As shown by the results of the test according to Test Example 1, when the light source portion 10 emits the attracting light with a high radiation intensity, that is, when there is a region with a high irradiance (photon flux density), the number of trapped Phycitinae is small. Therefore, in this test, in order to clarify the relationship between the magnitude of the irradiance (photon flux density) and the activity of the Phycitinae, the behavior of the Phycitinae was observed under an environment of a plurality of illuminances (photon flux densities).

Figure 11:
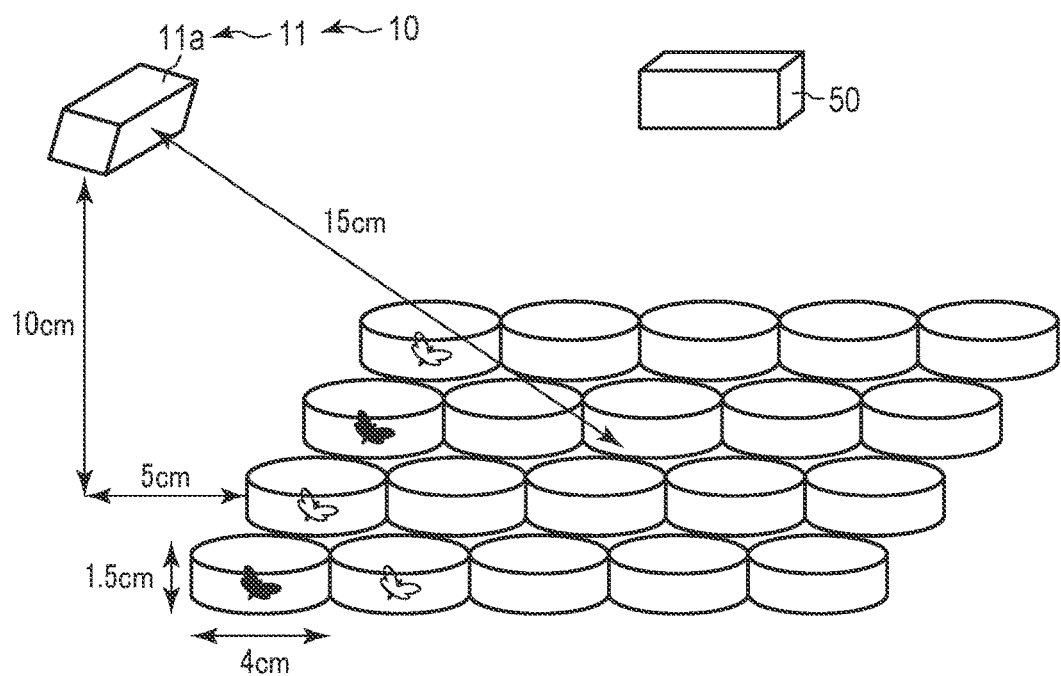
FIG. 11 is a schematic diagram showing an outline of a configuration of a test region according to Test Example 2.

FIG. 11 shows an outline of the test region according to this test. As shown in FIG. 11, the test region is provided with an observation region in which the experimental insects are put, a light source 11 that irradiates the observation region with attracting light (ultraviolet light), and an illumination device 50 that irradiates the observation region with illumination light. As the illumination device 50, a fluorescent tube (FL20WS, manufactured by Panasonic Corporation) equipped with a UV cut sleeve (IV7 Guard, manufactured by FUJIFILM Corporation) was used. The test region is configured so that light does not enter from outside the test region.

In the observation region, petri dishes are disposed in order to put the experimental insects in the observation region. Each petri dish has a circular shape with a height of 1.5 cm and a diameter of 4 cm, and a lid is provided on the upper portion. The petri dishes are arranged in the observation region so as to form five lines in a direction away from the light source 11 and four lines in a direction orthogonal to the direction away from the light source.

The light source 11 is disposed at a position 5 cm away from one end of the observation region and 10 cm higher than the bottom surface of the observation region. The distance between the emission end (emission surface) of the light source 11 and the center of the observation region is 15 cm. The first light source 11a in Test Example 1 described above was used as the light source 11.

The illumination device 50 is disposed above the observation region. The illumination light emitted from the illumination device 50 is white light which imitates natural light. The observation region can be set to a photophase or a scotophase by the illumination light emitted from the illumination device 50.

In this test, videography was conducted to observe the behavior of the Phycitinae placed in each petri dish. Since the activity of the tobacco moths becomes active in the scotophase, videography was conducted not only in the photophase but also in the scotophase. Videography in the scotophase was performed using a high-sensitivity camera (WAT-232, manufactured by Watec Co., Ltd.) and an infrared projector (SM-104-850, manufactured by HOGA).

The experimental insects used in this test are 10 males and 10 females of tobacco moths that emerged within 24 hours and already mated. The experimental insects are tobacco moths reared under rearing conditions of a photophase of 14 hours and a scotophase of 10 hours until they become adults. The experimental insects are placed one by one in the respective petri dishes.

The procedure of this test is described below. First, the petri dishes, each containing a tobacco moth, were placed in the test region. After the placement, the test was started just before the start of the scotophase and videography was started. The videography continued until the fourth day. The scotophase was set immediately after the start of the test. 10 hours after the start of the scotophase, the photophase was resumed. The photophase condition was realized by irradiating the entire observation region with illumination light. In the photophase, the value of the illuminance [lux] of the illumination light that the illumination device applied to the observation region was 200 to 250. After 14 hours from the start of the photophase, the irradiation of the observation region with the illumination light was stopped and the scotophase was resumed. The photophase and scotophase conditions were set according to the rearing conditions. Thus, the photophase and scotophase were repeated during the test. One hour after the start of the scotophase on the third day from the start of the test, the entire observation region was irradiated with ultraviolet light for 10 seconds. Thereafter, using the result of the video photographing, the number of individuals which stopped being active after the ultraviolet light irradiation from among the individuals which had been active until 10 seconds before the observation region was irradiated with the ultraviolet light was counted.

Figure 12:
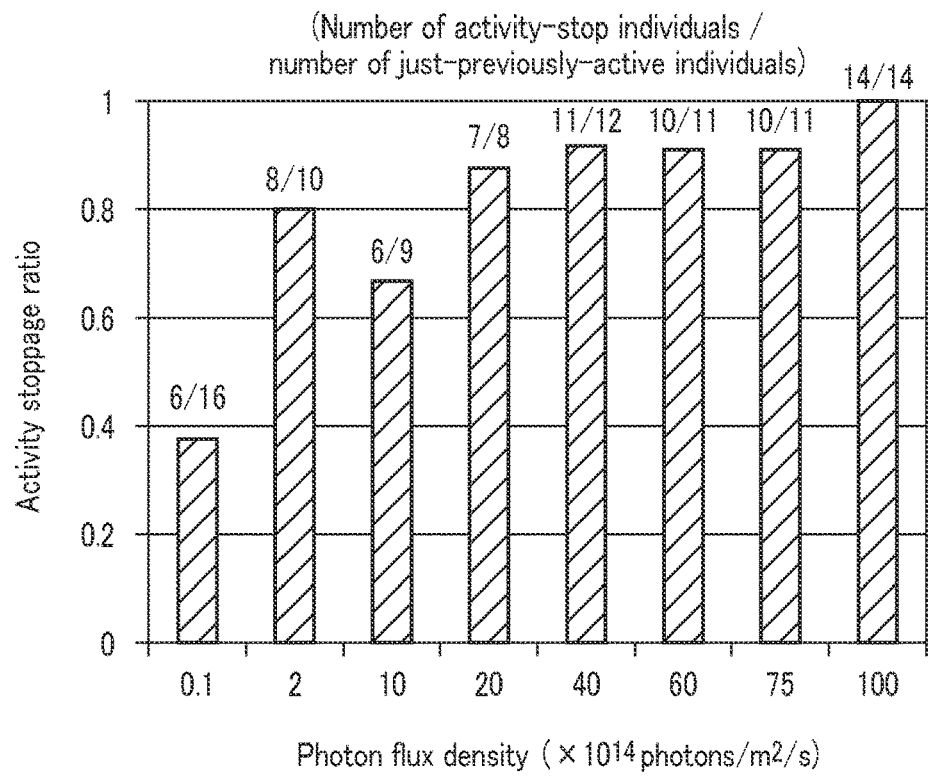
FIG. 12 is a graph showing the relationship between the photon flux density of the attracting light and the activity stoppage ratio of tobacco moths.

FIG. 12 shows the results of this test. FIG. 12 is a frequency distribution graph showing the relationship between the intensity of ultraviolet light (attracting light) and the activity stoppage ratio of the tobacco moths. In the graph shown in FIG. 12, the vertical axis represents the activity stoppage ratio and the horizontal axis represents the photon flux density. The activity stoppage ratio is a ratio of individuals that stopped being active after irradiation of ultraviolet light (activity-stop individuals) to individuals that had been active until 10 seconds before the irradiation of ultraviolet light to the observation region started (just-previously-active individuals).

As shown in FIG. 12, the activity stoppage ratio (the number of activity-stop individuals/the number of just-previously-active individuals) is (6/16) when the value of the photon flux density is $0.1\times10^{14}$, and (8/10), (6/9), (7/8), (11/12), (10/11), (10/11), and (14/14) when the value of the photon flux density is $2\times10^{14}$, $10\times10^{14}$, $20\times10^{14}$, $40\times10^{14}$, $60\times10^{14}$, $75\times10^{14}$, and $100\times10^{14}$, respectively. As described above, it is apparent that about 90% of the tobacco moth individuals cease their activity due to ultraviolet light (attracting light) when the photon flux density is $20\times10^{14}$ or greater.

Based on the above, it was shown that the behavior of the Phycitinae including the tobacco moths is suppressed in an environment (behavior suppression region) of an irradiance (photon flux density) equal to or greater than the predetermined value. As described above, it was shown that the Phycitinae has a property of being attracted by the attracting light and a property of causing behavior suppression in the behavior suppression region. The range of the value of the photon flux density in the behavior suppression region is, for example, $20 \times 10^{14}$ or greater.

On the other hand, it was shown that the Phycitinae including the tobacco moths is less likely to suppress the behavior in an environment (non-behavior suppression region) having an irradiance (photon flux density) less than the predetermined value. That is, it was suggested that the adult Phycitinae could be trapped if the region (movement region) on the movement path through which the adult Phycitinae attracted by the attracting light reached the trapping member was within the non-behavior suppression region, or if the non-behavior suppression region was within the movement region. When a region within the non-behavior suppression region and within the movement region of the entire region between the height of the emission end of the attracting light and the floor surface is determined as the guide path, the result of the present test can be expressed as suggesting a possibility that the adult Phycitinae can be trapped by using a light trap within the guide path. According to the test results, the range of the value of the photon flux density in the non-behavior suppression region is, for example, any one of the ranges of greater than 0 and smaller than $20 \times 10^{14}$, greater than 0 and smaller than $10 \times 10^{14}$, greater than 0 and smaller than $2 \times 10^{14}$, greater than 0 and smaller than $0.1 \times 10^{14}$, $0.1 \times 10^{14}$ or greater and smaller than $20 \times 10^{14}$, $0.1 \times 10^{14}$ or greater and smaller than $10 \times 10^{14}$, $0.1 \times 10^{14}$ or greater and smaller than $2 \times 10^{14}$, $2 \times 10^{14}$ or greater and smaller than $20 \times 10^{14}$, $2 \times 10^{14}$ or greater and smaller than $10 \times 10^{14}$, or $10 \times 10^{14}$ or greater and smaller than $20 \times 10^{14}$. The value of the photon flux density in the non-behavior suppression region includes any value of $0.1 \times 10^{14}$, $2 \times 10^{14}$, and $10 \times 10^{14}$.

Test Example 3

In general, a warehouse or the like in which damage by the Phycitinae is problematic is often a relatively large space. Therefore, to attract and trap the Phycitinae widely distributed in a warehouse or the like, it is necessary to emit the attracting light with a high radiation intensity so that the attracting light reaches a long distance. On the other hand, when the attracting light is emitted with a high radiation intensity, a behavior suppression region may occur on the movement path of the Phycitinae attracted by the attracting light. When the movement region is within the behavior suppression region, it is difficult to trap the Phycitinae. Therefore, in order to clarify the emission characteristics of the attracting light required for forming the guide path, the movement path (movement region) of the Phycitinae attracted by the attracting light was examined.

Figure 13:
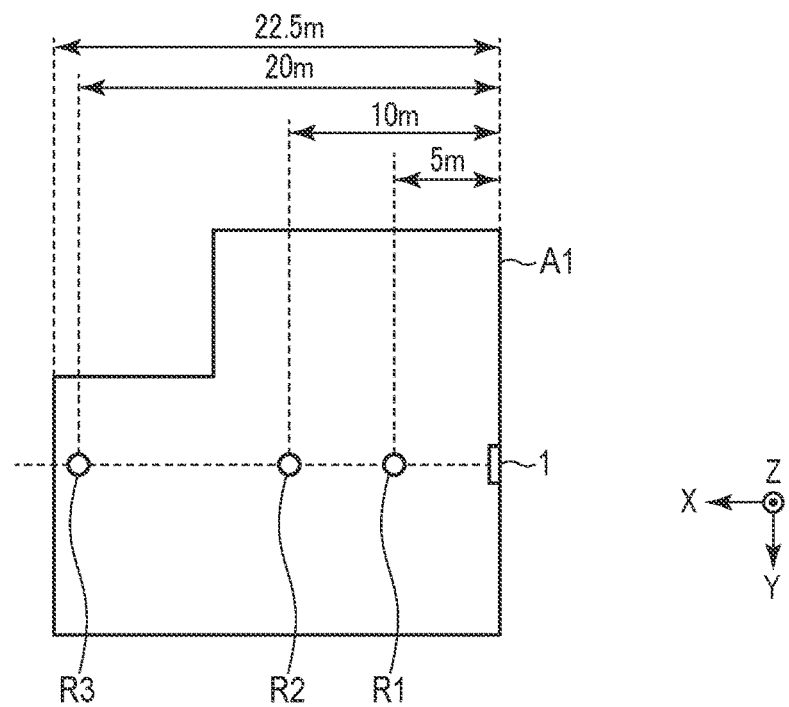
FIG. 13 is a plan view of the configuration of a test region (warehouse) according to Test Example 3 as viewed from above.

FIG. 13 is a plan view of the configuration of a first test region A1 (warehouse) used in the present test as viewed from above. As shown in FIG. 13, the depth (X direction) of the first test region A1 is 22.5 m, and the floor area is about 425 m². On the wall surface on the X− side of the first test region A1, a trapping device is disposed so as to be capable of emitting the attracting light in the X+ direction. The first test region A1 is an empty warehouse with no windows, and is configured so that light does not enter from outside the test region. A first release point R1 is provided at a position 5 m away from the position where the trapping device is disposed in the X+ direction (the emission direction of the attracting light). Similarly, a second release point R2 and a third release point R3 are provided respectively at positions 10 m and 20 m away from the trapping device 1 in the X+ direction.

In this test, a third test trapping device 1c was disposed in the first test region A1 described above. The third test trapping device 1c is arranged such that the lower end of the trapping device is in contact with the floor surface.

Figure 14:
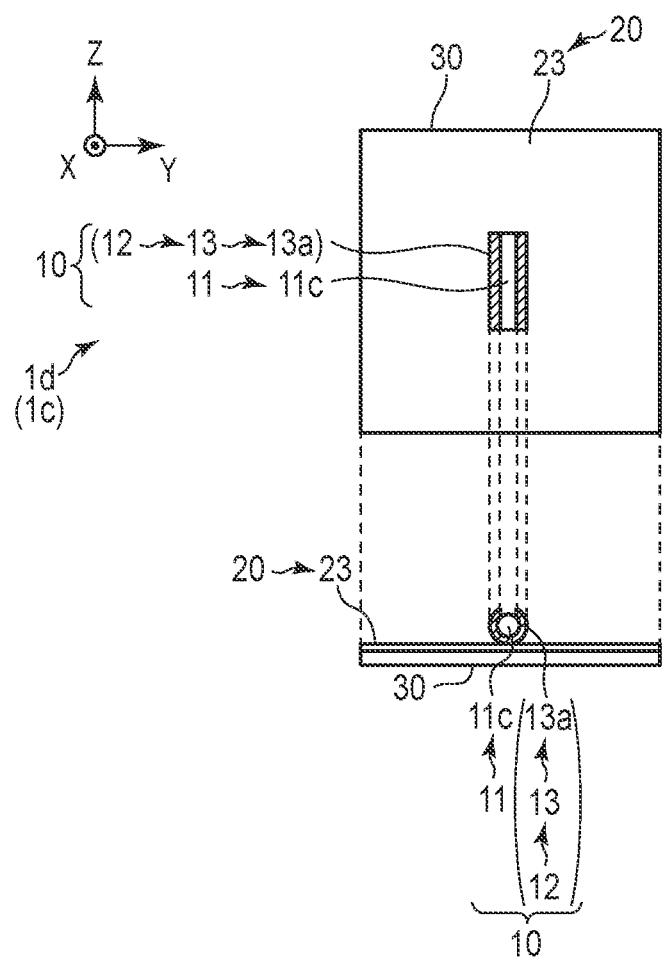
FIG. 14 is a schematic diagram showing an outline of a configuration of a trapping device according to Test Example 3, in which a front view (upper) and a side view (lower) are shown side by side.

An outline of a configuration of the third trapping device 1c according to the present embodiment is shown in FIG. 14 as a schematic diagram in which a front view (upper) and a side view (lower) are arranged side by side. The third test trapping device 1c includes a light source portion 10 including a light source 11 and a diaphragm portion 13 (optical element 12), a trapping portion 20 including a central trapping portion 23, and a support member 30. As shown in FIG. 14, the third test trapping device 1c has a configuration in which the central trapping portion 23 is disposed in the vicinity of and around the light source 11 (on Y-Z plane). The trapping member of the central trapping portion 23 is disposed on the X+ side of the central trapping portion 23. The trapping member is a replaceable adhesive paper sheet of one meter square. A third light source 11c (light source 11) included in the third test trapping device 1c is a fluorescent tube (20 W, FL20SBL, manufactured by Toshiba Lighting & Technology Corporation) capable of emitting ultraviolet light. The central wavelength of a light beam (attracting light) emitted from the third light source 11c is 375 to 380 nm. The diaphragm portion 13 (first diaphragm portion 13a) included in the third test trapping device 1c covers the light source 11 so that the emission surface of the attracting light emitted from the light source 11 is slit-shaped. Aluminum foil was used as the first diaphragm portion 13a. The slit (opening) of the first diaphragm portion 13a has a width of 1 cm and faces the X+ direction.

The test subjects (experimental insects) used in this test were 50 male and 50 female tobacco moths.

The procedure of this test is described below. First, the adhesive paper sheet was attached to the trapping portion 20. Thereafter, the 100 experimental insects were simultaneously released from the second release point R2 in the first test region A1. After the release, the light source portion 10 was caused to emit the attracting light at a predetermined radiation intensity. After the elapse of a predetermined time, the adhesive paper sheet was retrieved, and the number of experimental insects trapped by the adhesive paper sheet was counted. This test was conducted in the procedures wherein the retrieval was carried out on the second day and the third day after the release.

Furthermore, the test was also conducted using a fourth test trapping device 1d as a comparative example under the same conditions. The fourth test trapping device 1d is the same as the third test trapping device 1c except that it does not include the diaphragm portion 13 (first diaphragm portion 13a).

Figure 15:
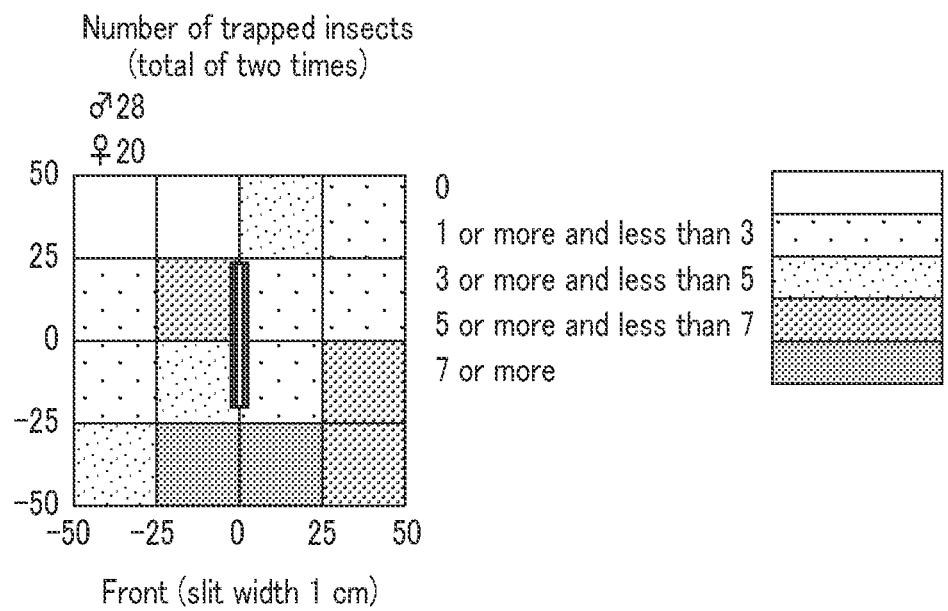
FIG. 15 is a diagram showing a trapped insect distribution according to Test Example 3.
Figure 16:
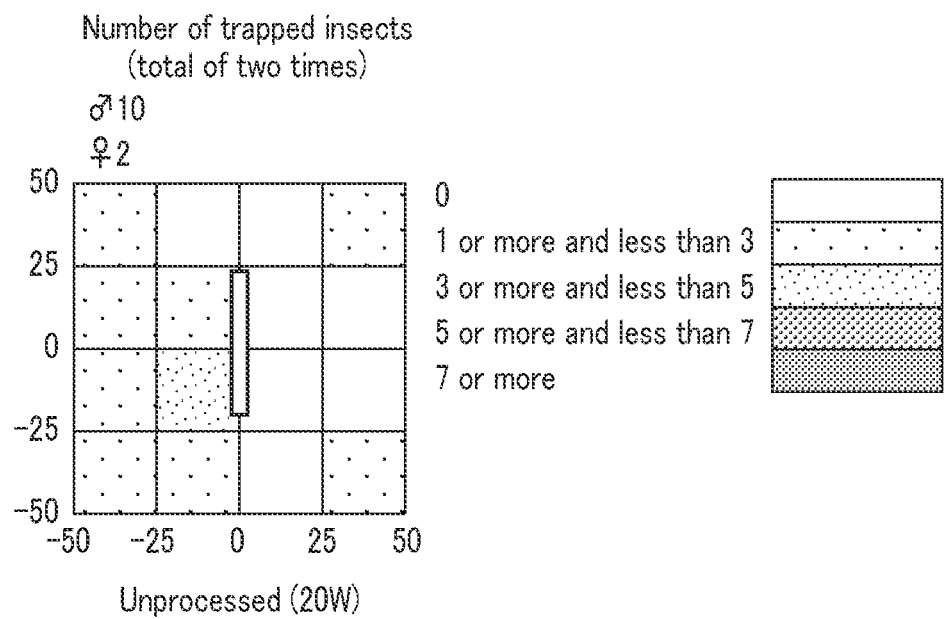
FIG. 16 is a diagram showing a trapped insect distribution according to a comparative example of Test Example 3.

FIG. 15 and FIG. 16 show the results of this test. FIG. 15 and FIG. 16 show the distributions of the number of trapped tobacco moths when the third test trapping device 1c was used and when the fourth test trapping device 1d was used, respectively.

As shown in FIG. 15, the trap distribution is biased below the emission end of the attracting light of the light source 11. On the other hand, as shown in FIG. 16, when there is no region in which the irradiance is suppressed, the number of trapped insects is less, and the trap distribution is not biased.

Based on the above, it was suggested that the movement path of the Phycitinae (tobacco moths) attracted by the attracting light may be a path through which the Phycitinae fly from the lower side (Z− side) of the emission end of the attracting light (light source 11) toward the emission end of the attracting light.

Test Example 4

Test Example 4-1

According to the test results of Test Example 3, it was suggested that the Phycitinae (tobacco moths) may ascend (fly) from below the emission end toward the emission end in the immediate vicinity of the light source (emission end). However, the movement path (movement region) to the immediate vicinity of the light source (emission end) has not yet been elucidated. Therefore, in order to clarify the emission characteristics of the attracting light required for forming the guide path, the movement path (movement region) of the Phycitinae attracted by the attracting light was further examined.

Figure 17:
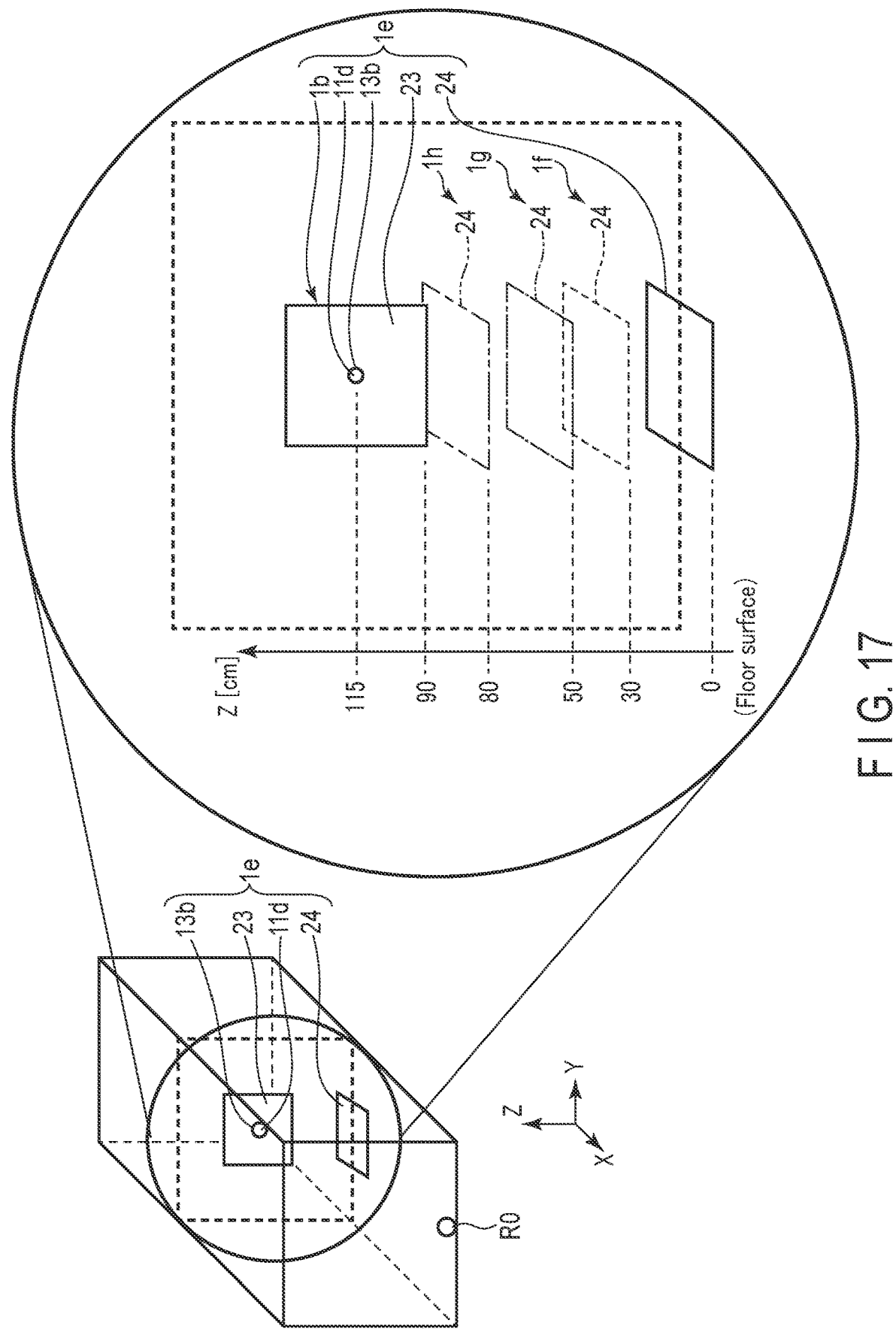
FIG. 17 is a diagram for explaining Test Example 4-1.

FIG. 17 is a diagram for explaining this test. As shown in FIG. 17, the test region according to this test example is the test region used in Test Example 1. A fifth test trapping device 1e according to the present test example includes a configuration similar to that of the trapping device 1 according to the second embodiment described above with reference to FIG. 3, and a horizontal trapping portion 24 including a trapping member. The fifth test trapping device 1e is different from the trapping device 1 according to the second embodiment also in the configuration of the optical element 12 (diaphragm portion 13) and the arrangement of the light source 11. The fifth test trapping device 1e is arranged in the center of the test region so that the height of the lower end is 90 cm from the floor.

Figure 18:
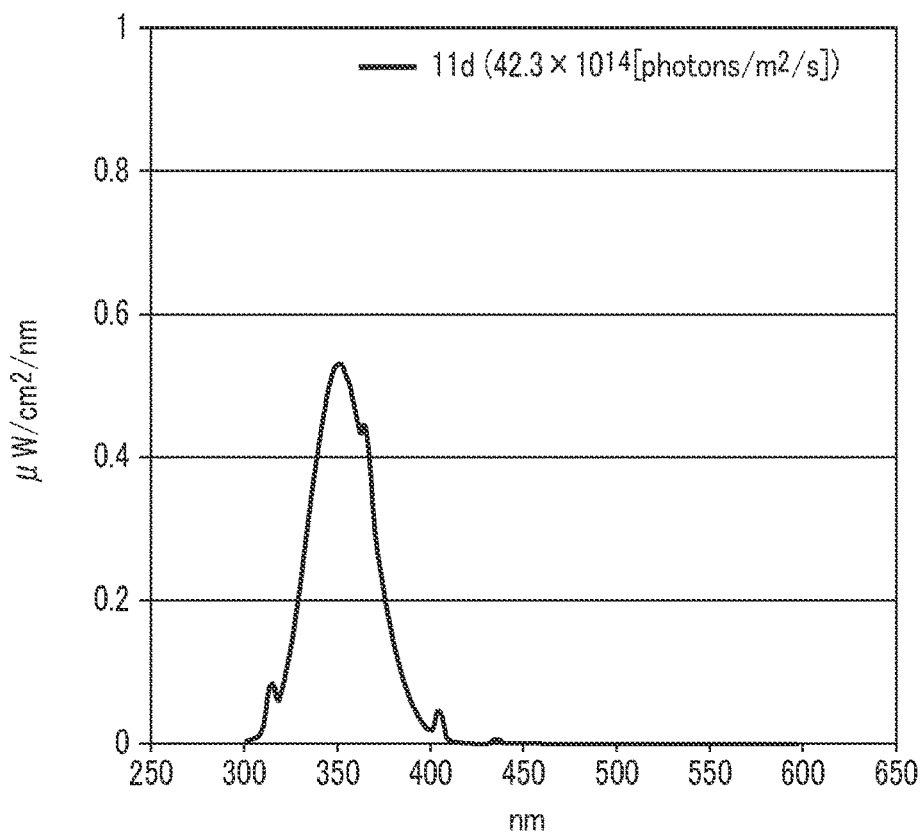
FIG. 18 is a graph showing a spectral power distribution of the attracting light emitted from a fourth light source included in the trapping device according to Test Example 4-1.

A fourth light source 11d (light source 11) included in the fifth test trapping device 11e is a fluorescent tube (FL4BLB, manufactured by Toshiba Lighting & Technology Corporation) of a rated power consumption of 4W and capable of emitting ultraviolet light. FIG. 18 shows the spectral power distribution of the fourth light source 11d. In the graph shown in FIG. 18, the vertical axis represents irradiance per wavelength [μW/cm$^2$/nm], and the horizontal axis represents a wavelength [nm]. The irradiance shown in FIG. 18 is a value measured at the measurement position MP shown in FIG. 2 in a state where the optical element 12 is not provided. As shown in FIG. 18, the central (peak) wavelength of the light beam (attracting light) emitted from the fourth light source 11d is about 350 nm. The photon flux density at the measurement position MP 15 cm away from and directly opposite to the emission end of the light beam (attracting light) emitted from the fourth light source 11d was 42.3×10$^{14}$ photons/m$^2$/s. Since the fourth light source 11d is a straight fluorescent tube, the directional characteristics of the light beam (attracting light) emitted from the fourth light source 11d are the same in the circumferential direction of the fourth light source 11d (non-directional in the Z direction). Unlike the trapping device 1 according to the second embodiment, the fourth light source 11d is disposed on the X+ side of the central trapping portion 23.

A second diaphragm portion 13b (pinhole, optical element 12) of the fifth test trapping device 1e is aluminum foil provided with an opening. The second diaphragm portion 13b is disposed so as to cover the fourth light source 11d. The shape of the opening of the second diaphragm portion 13b is substantially circular. The area of the opening of the second diaphragm portion 13b is 3 mm$^2$. The fourth light source 11d covered with the second diaphragm portion 13b is disposed on the X+ side surface of the central trapping portion 23 so that the opening is located at the center of the central trapping portion.

The trapping member of the central trapping portion 23 included in the fifth test trapping device 1e is disposed on the X+ side of the central trapping portion 23. The trapping member is a replaceable adhesive paper sheet of 50 cm square. The trapping member of the horizontal trapping portion 24 included in the fifth test trapping device 1e is disposed on the Z+ side of the horizontal trapping portion 24. The trapping member is a replaceable adhesive paper sheet of 50 cm square. The horizontal trapping portion 24 of the fifth test trapping device 1e is disposed below the central trapping portion 23 on the floor surface.

A sixth test trapping device 1f according to this test example is the same as the fifth test trapping device 1e except that the trapping member of the horizontal trapping portion 24 is disposed at a height of 30 cm from the floor surface.

A seventh test trapping device 1g according to this test example is the same as the fifth test trapping device 1e except that the trapping member of the horizontal trapping portion 24 is disposed at a height of 50 cm from the floor surface.

An eighth test trapping device 1h according to this test example is the same as the fifth test trapping device 1e except that the trapping member of the horizontal trapping portion 24 is disposed at a height of 80 cm from the floor surface.

The test subjects (experimental insects) used in this test were 50 male and 50 female tobacco moths.

The procedure of this test is described below. First, the adhesive paper sheet was attached to the trapping portion 20. Thereafter, 100 experimental insects were simultaneously released from the release point R0. After the release, the light source portion 10 was caused to emit the attracting light at a predetermined radiation intensity. After the elapse of 23 hours from the start of emission of the attracting light, the adhesive paper sheet was retrieved, and the number of experimental insects trapped by the adhesive paper sheet was counted. The test was conducted by the procedure described above in each of the fifth test trapping device 1e, the sixth test trapping device 1f, the seventh test trapping device 1g, and the eighth test trapping device 1h.

Figure 19:
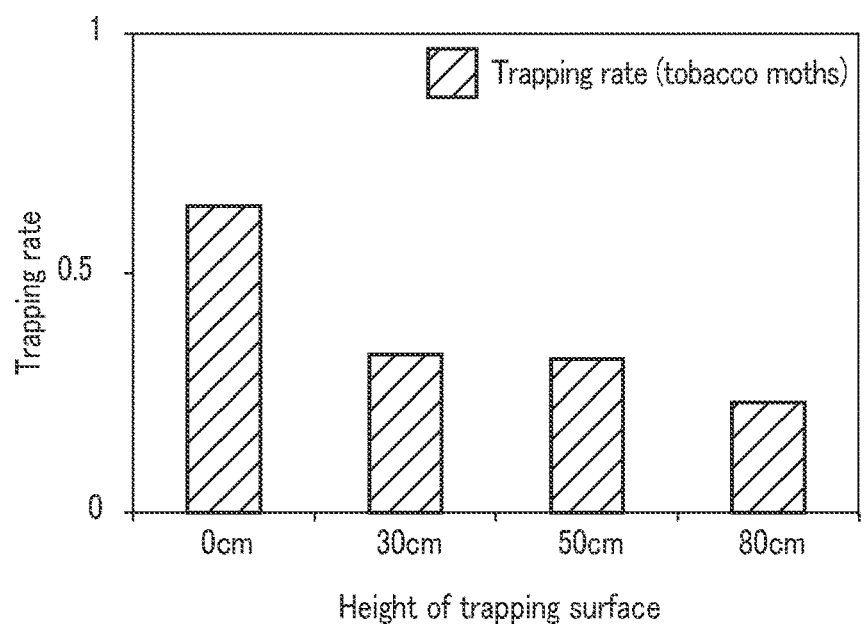
FIG. 19 is a graph showing a trapping rate of tobacco moths according to Test Example 4-1.

FIG. 19 shows the results of this test. FIG. 19 shows the relationship between the number of trapped tobacco moths and the height of the trapping member of the horizontal trapping portion 24. In FIG. 19, the horizontal axis represents the height of the trapping surface, and the vertical axis represents the trapping rate.

As shown in FIG. 19, the trapping rate when the height of the trapping member of the horizontal trapping portion 24 was 0 cm was about twice as high as the trapping rate when the height of the trapping member of the horizontal trapping portion 24 was 30 cm, 50 cm, and 80 cm. This suggests that the Phycitinae including the tobacco moths move (fly or walk) through a region between the floor surface and the height of 30 cm from the floor surface when they are attracted by the attracting light and move toward the emission end. In addition, it was suggested that after moving to the vicinity of the lower side of the emission end in a range from the floor surface to the height of 30 cm, the Phycitinae fly (move) toward the emission end. Since the X+ side end of the trapping member of the horizontal trapping portion 24 included in the fifth test trapping device 1e was located at a position of 25 cm on the X+ side from immediately below the emission end, it can be said that a portion in the vicinity below the emission end is within a range of 25 cm or less from the emission end along a line parallel to the floor surface. Based on the above, the movement region of the Phycitinae can be expressed as a region within 25 cm or less from the surface on which the emission end is disposed, along a line substantially parallel to the floor surface, and a region within 30 cm or less in height from the floor surface.

Test Example 4-2

In Test Example 4-1, the movement path (movement region) of the tobacco moth, as an example of the Phycitinae, was examined. The Phycitinae is not limited to the tobacco moth, and includes the Indian meal moth, the dried currant moth, and the Mediterranean flour moth. Therefore, in this test example, the movement paths (movement regions) of Indian meal moth, dried currant moth, and Mediterranean flour moth were further examined.

Various test conditions according to this test example are the same as those of Test Example 4-1 except that the type of experimental insect and the number of insects for the test vary. The test subjects (experimental insects) used in this test were 25 males and 25 females of each of the Indian meal moth, the dried currant moth, and the Mediterranean flour moth. This test was individually conducted for each of the Indian meal moth, the dried currant moth, and the Mediterranean flour moth.

Figure 20:
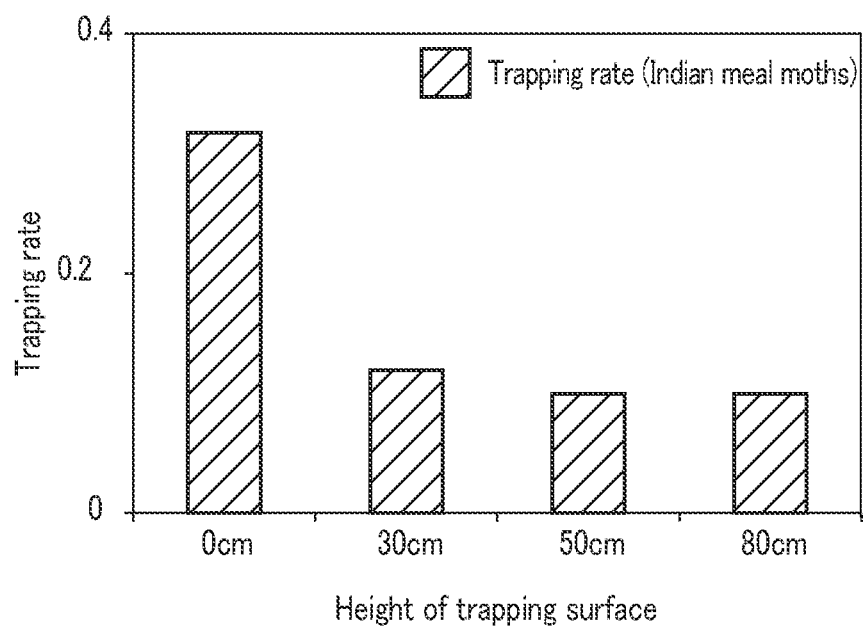
FIG. 20 is a graph showing a trapping rate of Indian meal moths according to Test Example 4-2.

FIG. 20 shows the results of this test for the Indian meal moths. FIG. 20 shows the relationship between the number of trapped Indian meal moths and the height of the trapping surface of the horizontal trapping portion 24. In FIG. 20, the horizontal axis represents the height of the trapping surface, and the vertical axis represents the trapping rate. As shown in FIG. 20, the trapping rate when the height of the trapping surface of the horizontal trapping portion 24 was 0 cm was about three times as high as the trapping rate when the height of the trapping surface of the horizontal trapping portion 24 was 30 cm, 50 cm, and 80 cm. This suggests that the Indian meal moths move (fly or walk) through a region between the floor surface and the height of 30 cm from the floor surface when they are attracted by the attracting light and move toward the emission end. In addition, it was suggested that after moving to the vicinity of the lower side of the emission end in a range from the floor surface to the height of 30 cm, the Indian meal moths fly (move) toward the emission end. Since the X+ side end of the trapping member of the horizontal trapping portion 24 included in the fifth test trapping device 1e was located at a position of 25 cm on the X+ side from immediately below the emission end, it can be said that a portion in the vicinity below the emission end is within a range of 25 cm or less from the emission end in parallel to the floor surface. Based on the above, the movement region of the Indian meal moths can be expressed as a region within 25 cm or less from the surface on which the emission end is disposed and along a line substantially parallel to the floor surface and a region within 30 cm or less in height from the floor surface.

Figure 21:
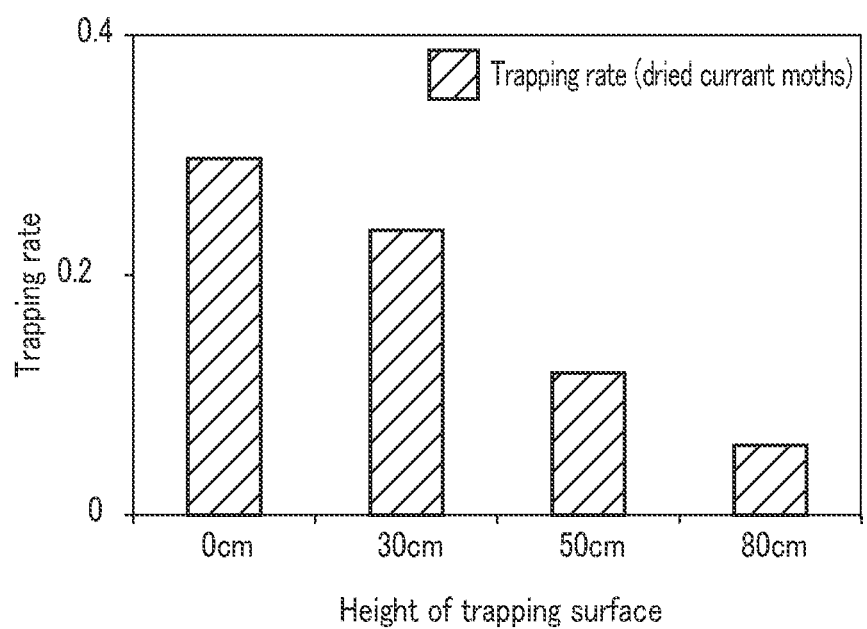
FIG. 21 is a graph showing a trapping rate of dried currant moths according to Test Example 4-2.

FIG. 21 shows the results of this test for the dried currant moths. FIG. 21 shows the relationship between the number of trapped dried currant moths and the height of the trapping surface of the horizontal trapping portion 24. In FIG. 21, the horizontal axis represents the height of the trapping surface, and the vertical axis represents the trapping rate. As shown in FIG. 21, the trapping rate when the height of the trapping surface of the horizontal trapping portion 24 was 0 cm was about 1.25 times, 2.5 times, and 5 times as high as the trapping rate when the height of the trapping surface of the horizontal trapping portion 24 was 30 cm, 50 cm, and 80 cm, respectively. In other words, the trapping rate when the height of the trapping surface was 0 cm or 30 cm was two or more times as high as the trapping rate when the height of the trapping surface was 50 cm and 80 cm. Furthermore, the trapping rate when the height of the trapping surface is 0 cm is higher than the trapping rate when the height of the trapping surface is 30 cm. From these results, it was shown that the movement region of the dried currant moths includes a region within 25 cm or less from the surface on which the emission end is disposed, along a line substantially parallel to the floor surface, and a region within 30 cm or less in height from the floor surface, similarly to the cases of the tobacco moths and the Indian meal moths.

As shown in FIG. 17, when the height of the trapping surface is 30 cm, a region within 25 cm or less from the surface on which the emission end is disposed, along a line substantially parallel to the floor surface, is a region between the trapping surface and the floor surface. Naturally, the Phycitinae including the dried currant moths cannot pass through the disposed trapping surface due to physical interference. That is, when the height of the trapping surface was 30 cm, a region satisfying at least one of a height of 30 cm or less from the floor surface and within 25 cm or less along a line substantially parallel to the floor surface from the surface on which the emission end was disposed was divided by the trapping surface. Under these circumstances, in this test for the dried currant moths, the trapping rate when the height of the trapping surface was 0 cm or 30 cm was two or more times as high as the trapping rate when the height of the trapping surface was 50 cm and 80 cm. That is, in this test for the dried currant moths, in addition to the time when the height of the trapping surface is 0 cm, the trapping rate is also high when the height of the trapping surface is 30 cm. From these results, it was shown that the horizontal trapping portion 24 provided at the height of 30 cm did not divide the movement region of the dried currant moths which were attracted by the attracting light and flew (moved) toward the emission end of the attracting light. As described above, according to the results of the present test on the dried currant moths, it was shown that the horizontal trapping portion 24 provided at the heights of 0 cm and 30 cm did not divide the movement region of the dried currant moths flying (moving) toward the emission end into the region on the floor surface side and the region on the emission end side. In other words, it was shown that the horizontal trapping portion 24 provided at the heights of 50 cm and 80 cm divided the movement region of the dried currant moths flying (moving) toward the emission end into the region on the floor surface side and the region on the emission end side.

As described above, the Phycitinae attracted by the attracting light fly (move) from below the height of the emission end toward the emission end. That is, as shown in the present test example, the following is suggested for the dried currant moths.

It has been suggested that the dried currant moths move (fly or walk) in a region between the floor surface and the height of 50 cm from the floor surface, for example when they are attracted by the attracting light and move toward the emission end. Alternatively, it has been suggested that, for example when the dried currant moths are attracted by the attracting light and move toward the emission end, they move (fly or walk) in a region between the floor surface and the height of 30 cm from the floor surface, or move (fly) in a region between the heights of 30 cm and 50 cm from the floor surface. That is, according to this review, it is suggested that after moving to the vicinity of the lower side of the emission end in a range from the floor surface to the height of 50 cm, the dried currant moths attracted by the attracting light fly (move) toward the emission end. At this time, the movement region of the dried currant moths can be expressed as a region within 25 cm or less from the surface on which the emission end is disposed along a line substantially parallel to the floor surface and a region within 50 cm or less in height from the floor surface. In other words, the movement region of the dried currant moths includes the movement regions of the tobacco moths and the Indian meal moths, and a region having a height of 30 cm to 50 cm from the floor surface.

In addition, for example, it was suggested that the dried currant moths attracted by the attracting light fly (move) toward the emission end from the nearer side (the release point R0 side) as compared to the tobacco moths and the Indian meal moths. Specifically, it is considered that the dried currant moths fly (move) toward the emission end from a position within 25 cm or less from the surface on which the emission end is disposed (the release point R0 side), along a line substantially parallel to the floor surface. For simplicity, it is assumed that the dried currant moths attracted by the attracting light and directed toward the emission end fly (move) substantially linearly toward the emission end. In addition, the ascending angle (ascending gradient) of the dried currant moths which are attracted by the attracting light and move toward the emission end is defined as an ascending angle CA1. In this case, the movement region of the dried currant moths can be expressed as further including a region defined by the X+ side of the trapping surface provided at the height of 50 cm and the ascending angle CA1 of the dried currant moths. Specifically, the movement region of the dried currant moths further includes a region below a plane passing through the X+ side of the trapping surface provided at the height of 50 cm and forming an angle with the trapping surface equal to the ascending angle CA1 (the plane corresponding to the ascending angle CA1). Note that, with respect to a discretionary point on the plane corresponding to the ascending angle CA1, the height from the floor surface increases toward the X− side. Based on the above, according to this review, the movement region of the dried currant moths can be expressed as a region including the region within 25 cm or less from the surface on which the emission end is disposed, along a line substantially parallel to the floor surface, a region within 30 cm or less in height from the floor surface, and a region defined by the ascending angle CA1. In other words, the movement region of the dried currant moths includes the movement regions of the tobacco moths and the Indian meal moths, and the region defined by the ascending angle CA1.

Figure 22:
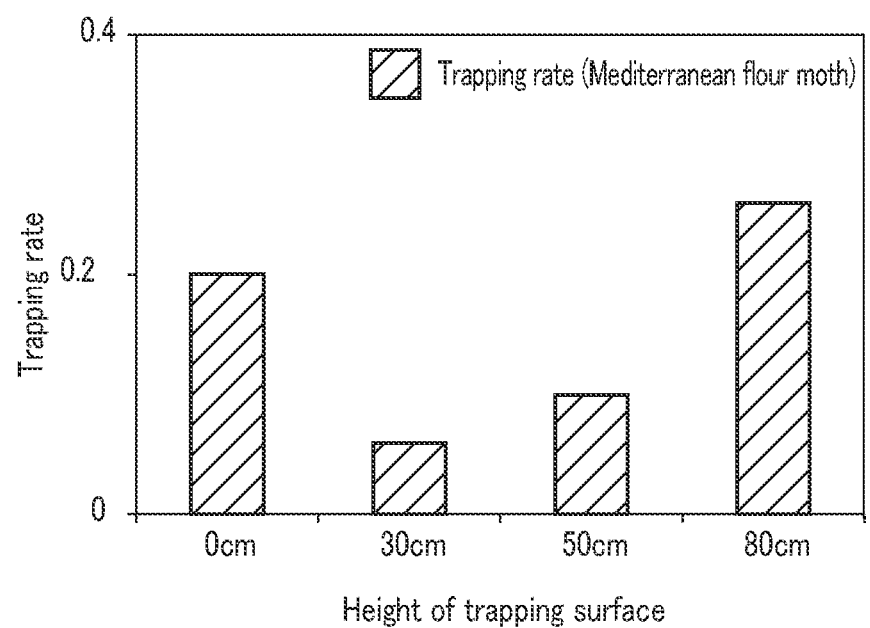
FIG. 22 is a graph showing a trapping rate of Mediterranean flour moths according to Test Example 4-2.

FIG. 22 shows the results of this test for Mediterranean flour moths. FIG. 22 shows the relationship between the number of trapped Mediterranean flour moths and the height of the trapping surface of the horizontal trapping portion 24. In FIG. 22, the horizontal axis represents the height of the trapping surface, and the vertical axis represents the trapping rate. As shown in FIG. 22, the trapping rate when the height of the trapping surface of the horizontal trapping portion 24 was 0 cm was about five times and twice as high as the trapping rate when the height of the trapping surface of the horizontal trapping portion 24 was 30 cm and 50 cm, respectively. From these results, it was shown that the movement region of the Mediterranean flour moths includes a region within 25 cm or less from the surface on which the emission end is disposed along a line substantially parallel to the floor surface and a region within 30 cm or less in height from the floor surface, similarly to the cases of the tobacco moths, the Indian meal moths, and the dried currant moths.

As shown in FIG. 17, when the height of the trapping surface is 80 cm, a region within 25 cm or less from the surface on which the emission end is disposed, along a line substantially parallel to the floor surface, is a region between the trapping surface and the floor surface. Naturally, the Phycitinae including the Mediterranean flour moths cannot pass through the disposed trapping surface due to physical interference. That is, when the height of the trapping surface was 80 cm, a region satisfying at least one of a height of 30 cm or less from the floor surface and within 25 cm or less along a line substantially parallel to the floor surface from the surface on which the emission end was disposed was divided by the trapping surface. Under these circumstances, in this test for the Mediterranean flour moths, the trapping rate when the height of the trapping surface was 80 cm was higher than the trapping rate when the height of the trapping surface is 0 cm. Specifically, the trapping rate when the height of the trapping surface was 80 cm was 1.3 times as high as the trapping rate when the height of the trapping surface was 0 cm. That is, in this test for the Mediterranean flour moths, in addition to the time when the height of the trapping surface is 0 cm, the trapping rate is also high when the height of the trapping surface is 80 cm. From these results, it was shown that the horizontal trapping portion 24 provided at the height of 80 cm did not divide the movement region of the Mediterranean flour moths which were attracted by the attracting light and flew (moved) toward the emission end of the attracting light. As described above, according to the results of the present test on the Mediterranean flour moths, it was shown that the horizontal trapping portion 24 provided at the height of 80 cm or lower did not divide the movement region of the Mediterranean flour moths flying (moving) toward the emission end into the region on the floor surface side and the region on the emission end side.

As described above, the Phycitinae attracted by the attracting light fly (move) from below the height of the emission end toward the emission end. That is, as shown in the present test example, the following is suggested for the Mediterranean flour moths.

It has been suggested that the Mediterranean flour moths move (fly or walk) in a region between the floor surface and the height of 80 cm from the floor surface, for example when they are attracted by the attracting light and move toward the emission end. That is, according to this review, it is suggested that after moving to the vicinity of the lower side of the emission end in a range from the floor surface to the height of 80 cm, the Mediterranean flour moths attracted by the attracting light fly (move) toward the emission end. At this time, the movement region of the Mediterranean flour moths can be expressed as a region within 25 cm or less from the surface on which the emission end is disposed along a line substantially parallel to the floor surface and a region within 80 cm or less in height from the floor surface. In other words, the movement region of the Mediterranean flour moths includes the movement regions of the tobacco moths and the Indian meal moths, and a region having a height of 30 cm to 80 cm from the floor surface.

When the height of the trapping surface was 80 cm, the highest trapping rate was achieved and the height of the emission end was 115 cm. Therefore, the movement region of the Mediterranean flour moths can be expressed as a region within 25 cm or less from the surface on which the emission end is disposed along a line substantially parallel to the floor surface and a region within 115 cm or less in height from the floor surface.

The trapping rate when the height of the trapping surface was 30 cm or 50 cm was 0.5 times or less of the trapping rate when the height of the trapping surface was 0 cm and 80 cm. It has been suggested that the Mediterranean flour moths attracted by the attracting light move (fly or walk) in a region between the floor surface and the height of 30 cm from the floor surface, or move (fly or walk) in a region between the floor surface and the height of 50 cm from the floor surface, for example when they are attracted by the attracting light and move toward the emission end. That is, the movement region of the Mediterranean flour moths can be expressed as a region within 25 cm or less from the surface on which the emission end is disposed along a line substantially parallel to the floor surface, a region within 30 cm or less in height from the floor surface, and a region within 50 cm or more and 80 cm or 115 cm or less in height from the floor surface.

In addition, for example, it was suggested that the Mediterranean flour moths attracted by the attracting light fly (move) toward the emission end from the nearer side (the release point R0 side) as compared to the tobacco moths and the Indian meal moths. Specifically, it is considered that the Mediterranean flour moths fly (move) toward the emission end from a position within 25 cm or less from the surface on which the emission end is disposed (the release point R0 side), along a line substantially parallel to the floor surface. For simplicity, it is assumed that the Mediterranean flour moths attracted by the attracting light and directed toward the emission end fly (move) substantially linearly toward the emission end. In addition, the ascending angle (ascending gradient) of the Mediterranean flour moths which are attracted by the attracting light and move toward the emission end is defined as an ascending angle CA2. In this case, the movement region of the Mediterranean flour moths can be expressed as further including a region defined by the ascending angle CA2 of the Mediterranean flour moths. Based on the above, according to this review, the movement region of the Mediterranean flour moths can be expressed as a region including the region within 25 cm or less from the surface on which the emission end is disposed, along a line substantially parallel to the floor surface, a region within 30 cm or less in height from the floor surface, and a region defined by the ascending angle CA2. In other words, the movement region of the Mediterranean flour moths includes the movement regions of the tobacco moths and the Indian meal moths, and a region defined by the ascending angle CA2. Here, for example, if the ascending angle CA1 of the dried currant moths and the ascending angle CA2 of the Mediterranean flour moths are substantially equal to each other, it is suggested that the Mediterranean flour moths attracted by the attracting light fly (move) toward the emission end from the nearer side (the release point R0 side) as compared to the dried currant moths.

As described above, according to the review of Test Example 4, the movement region of the Phycitinae includes at least a region within 25 cm or less from the surface on which the emission end is disposed, along a line substantially parallel to the floor surface, and a region within 30 cm or less in height from the floor surface. With respect to the Phycitinae, the trapping member may be disposed, for example, on the floor surface or at a height of 30 cm or less from the floor surface in the guide path.

In addition, according to the review of Test Example 4, if the trapping member is disposed so as not to divide the movement region of the Phycitinae, the trapping rate can be improved. In other words, the emission characteristics (required emission characteristics) of the attracting light required to attract or trap the adult Phycitinae include forming of the guide path so that the movement region of the Phycitinae is not divided by the trapping member.

In addition, according to the review of Test Example 4, it is considered that the dried currant moths and the Mediterranean flour moths fly (move) toward the emission end in a higher region (a region having a higher height from the floor surface) as compared to the tobacco moths and the Indian meal moths. In other words, the movement regions of the dried currant moths and the Mediterranean flour moths include a region having a higher height from the floor surface as compared to the movement regions of the tobacco moths and the Indian meal moths.

Specifically, the movement region of the dried currant moths further includes a region having a height of 30 cm to 50 cm from the floor surface, in addition to the movement regions of the tobacco moths and the Indian meal moths. That is, with respect to the dried currant moths, the trapping member may be disposed, for example, on the floor surface or at a height of 50 cm or less from the floor surface in the guide path. Preferably, the trapping member may be disposed on the floor and at a height of 30 cm from the floor surface. In addition, specifically, the movement region of Mediterranean flour moth further includes a region having a height of 30 cm to 115 cm from the floor surface in addition to the movement regions of the tobacco moths and the Indian meal moths. More preferably, the moving region of the Mediterranean flour moths further includes the region having a height of 30 cm to 80 cm from the floor surface or the region having a height of 50 cm to 115 cm from the floor surface, in addition to the movement regions of the tobacco moth and the Indian meal moth. More preferably, the movement region of the Mediterranean flour moths further includes a region having a height of 50 cm to 80 cm from the floor surface in addition to the movement regions of the tobacco moths and the Indian meal moths. That is, with respect to the Mediterranean flour moths, the trapping member may be disposed, for example, on the floor surface or at a height of 50 cm or more and 80 cm or less from the floor surface in the guide path. The height of the trapping members from the floor surface may be appropriately selected according to the height of the movement region of the Phycitinae.

In addition, according to the review of Test Example 4, it is considered that the dried currant moths and the Mediterranean flour moths fly (move) toward the emission end from the nearer side (the release point R0 side) as compared to the tobacco moths and the Indian meal moths.

Therefore, when the dried currant moths and the Mediterranean flour moths are trapped, it is considered to be effective to provide not only the trapping member disposed on the floor surface within 25 cm or less from the surface on which the emission end, along a line substantially in parallel to the floor surface, but also a trapping member on the floor surface further in front (nearer to the release point R0). In this case, the trapping member may have one large trapping surface or a plurality of trapping surfaces.

Test Example 5

Test Example 5-1

As shown by the test results of Test Example 1 to Test Example 4, the emission characteristics (required emission characteristics) of the attracting light required to attract or trap the adult Phycitinae include forming of the guide path below the height of the light source 11. More preferably, the required emission characteristics further include the ability to attract a wide range of the adult Phycitinae. Concerning this test example, a trapping test performed by using the trapping device 1 (ninth test trapping device 1i) according to the first embodiment, which emits the attracting light having directivity (attracting light of the narrow-angle light distribution), will be described.

The test region according to this test example is the first test region A1 described with reference to FIG. 13. The test according to this test example was performed by arranging the ninth test trapping device 1i (trapping device 1) on the wall surface on the X− side of the first test region A1 described above so as to be capable of emitting the attracting light in the X+ direction. The ninth test trapping device 1i is arranged such that the lower end of the trapping device is in contact with the floor surface.

The ninth test trapping device 1i has the configuration of the trapping device 1 according to the first embodiment described above with reference to FIG. 1. As shown in FIG. 1, the light source portion 10 includes a light source 11 (fifth light source 1e). The height of the fifth light source 1e from the lower end of the support member 30 (the lower end of the ninth test trapping device 1i) is 20 cm. The fifth light source 1e is a light emitting diode (NS375L-5RLO, manufactured by NITRIDE SEMICONDUCTORS Co., Ltd.) or an LED array which is capable of emitting ultraviolet light (attracting light).

Figure 23:
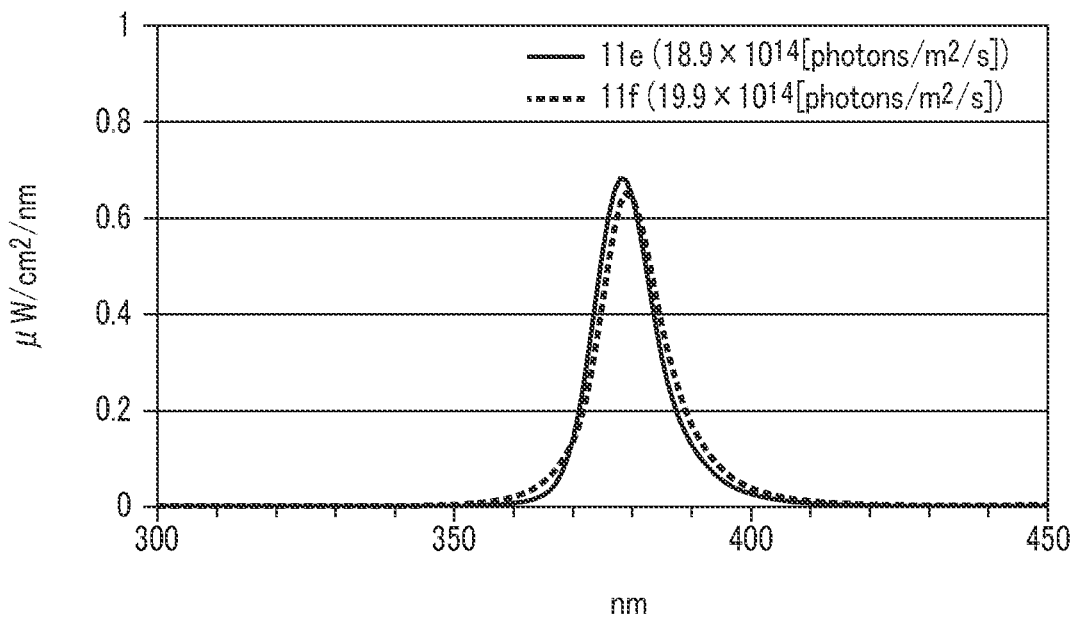
FIG. 23 is a graph showing a spectral power distribution of attracting light emitted from a trapping device according to Test Example 5-1 and a spectral power distribution of attracting light emitted from a trapping device according to a comparative example of Test Example 5-1.

FIG. 23 shows the spectral power distribution (wavelength dependence of radiation intensity) of the fifth light source 11e. In the graph shown in FIG. 23, the vertical axis represents irradiance per wavelength [μW/cm$^2$/nm], and the horizontal axis represents a wavelength [nm]. The irradiance shown in FIG. 23 is a value measured at a position (measurement position MP shown in FIG. 2) 15 cm away from and directly opposite to the emission end of the fifth light source 1e. As indicated by the solid line in FIG. 23, the central wavelength (peak wavelength) of the light beam (attracting light) emitted from the fifth light source 1e is about 375 to 380 nm. The value of the photon flux density [photons/m$^2$/s] at the measurement position MP measured by the fifth light source 1e was $18.9 \times 10^{14}$.

Figure 24:
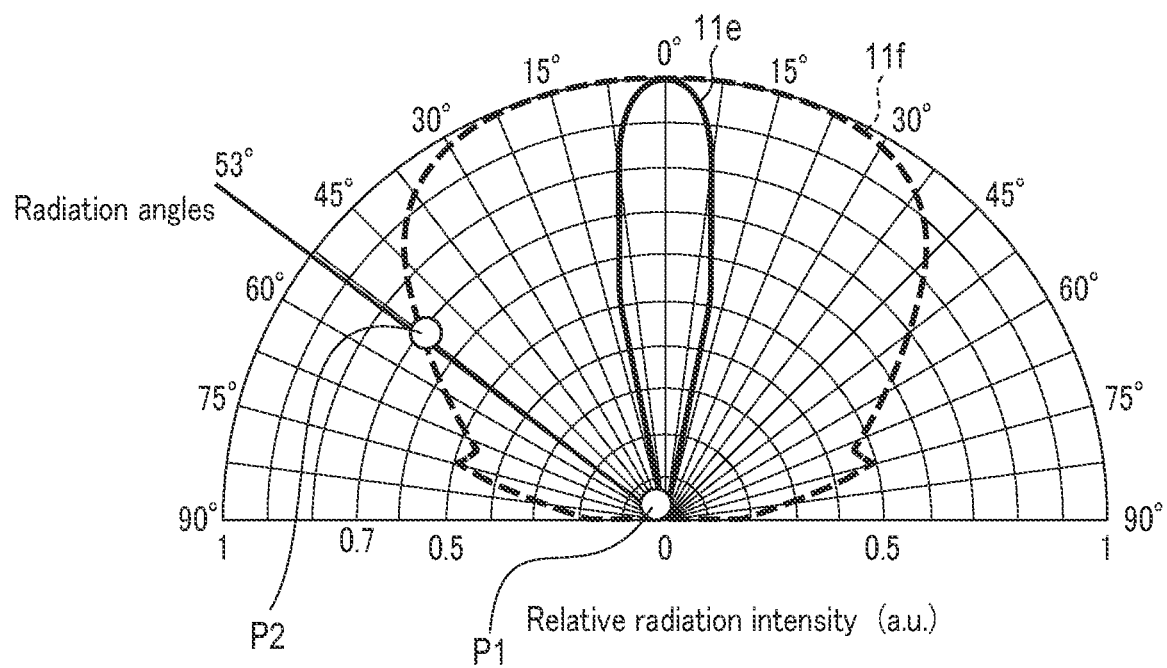
FIG. 24 is a diagram showing directional characteristics of the attracting light emitted from a trapping device according to Test Example 5-1 and the directional characteristics of the attracting light emitted from a trapping device according to a comparative example of Test Example 5-1.

FIG. 24 shows the directional characteristics of the fifth light source 1e. As indicated by the solid line in FIG. 24, the half-value angle of the light beam (attracting light) emitted from the fifth light source 1e is about 15° (narrow-angle light distribution). The half-value angle is an angle formed by the optical axis and a light beam direction in which the irradiance (photon flux density) is 50% of the irradiance (photon flux density) on the optical axis.

The trapping portion 20 is arranged near the light source portion 10 and traps the Phycitinae attracted by the attracting light. The trapping portion 20 is disposed in the guide path. As shown in FIG. 1, the trapping portion 20 according to this test example includes a lower trapping portion 21 and an upper trapping portion 22. The lower trapping portion 21 is disposed in the vicinity of and below (on the Z− side of) the fifth light source 1e (light source 11). The center of the lower trapping portion 21 is arranged at a height of 10 cm from the lower end of the ninth test trapping device 1i. The upper trapping portion 22 is disposed in the vicinity of and above (on the Z+ side of) the fifth light source 11e. The center of the upper trapping portion 22 is arranged at a height of 30 cm from the lower end of the ninth test trapping device 1i. On the X+ side surfaces of the lower trapping portion 21 and the upper trapping portion 22, replaceable adhesive sheets are disposed as trapping members.

Figure 25:
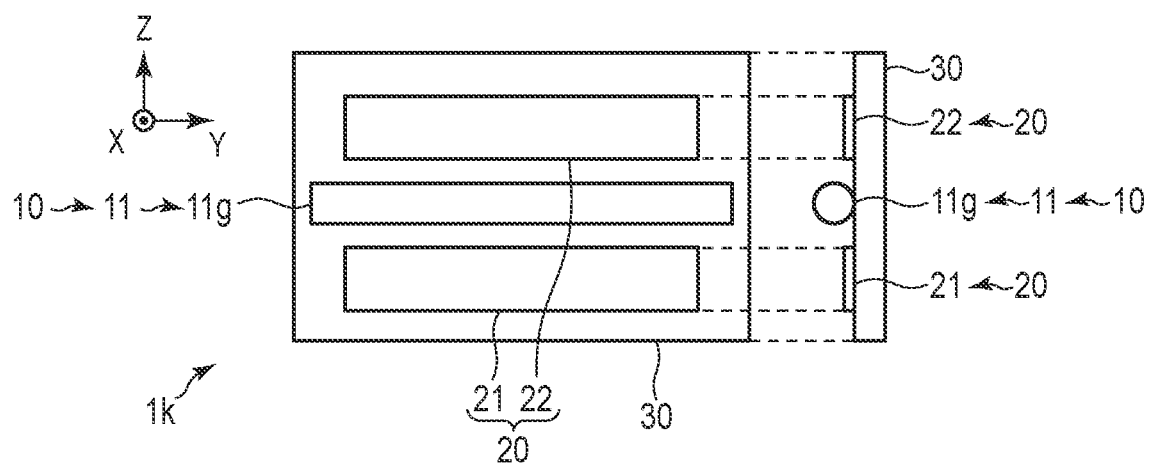
FIG. 25 is a schematic diagram showing side by side a front view (left) and a side view (right) of an outline of a configuration of a trapping device according to the comparative example of Test Example 5-1.

In this test example, as a comparative example, a test using a tenth test trapping device 1j and an eleventh test trapping device 1k that emit the attracting light of wide-angle light distribution was conducted. The tenth test trapping device 1j is the same as the ninth test trapping device 1i except that a sixth light source 11f is used as the light source 11. FIG. 25 is a schematic diagram in which a front view (left) and a side view (right) of an outline of a configuration of an eleventh test trapping device 1k are arranged side by side. As shown in FIG. 25, the eleventh test trapping device 1k is the same as the ninth test trapping device 1i except that a seventh light source 11g is used as the light source 11.

The sixth light source 11f is a light emitting diode (NS375L-5RFS, manufactured by NITRIDE SEMICONDUCTORS Co., Ltd.) configured to have a wide-angle light distribution and capable of emitting ultraviolet light (attracting light). As indicated by the broken line in FIG. 23, the central wavelength (peak wavelength) of the light beam (attracting light) emitted from the sixth light source 11f is about 375 to 380 nm. The photon flux density of the light beam (attracting light) measured at the measurement position MP of the sixth light source 11f was $19.9 \times 10^{14}$ photons/m$^2$/s. As indicated by the broken line in FIG. 24, the directional characteristic of the light beam (attracting light) emitted from the sixth light source 11f is a wide-angle light distribution having a half-value angle of about 65°.

Figure 26:
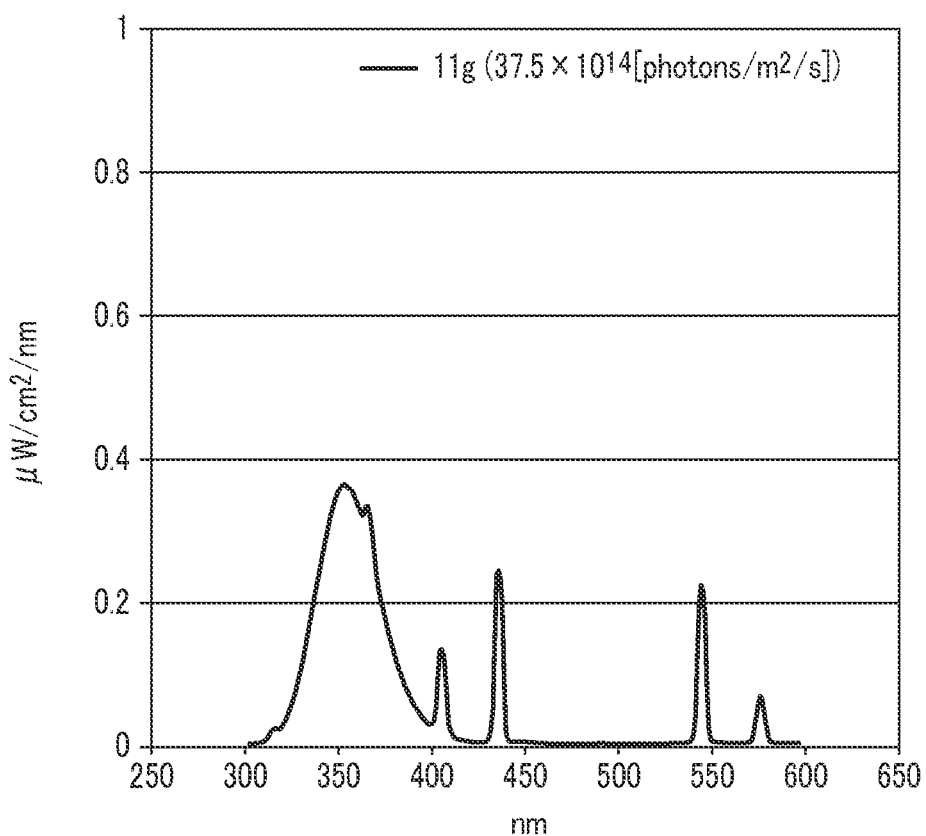
FIG. 26 is a graph showing a spectral power distribution of the attracting light emitted from the trapping device according to the comparative example of Test Example 5-1.

The seventh light source 11g is a fluorescent tube for an insect trap (fluorescent lamp for trapping insects, FL30SBL, manufactured by Toshiba Lighting & Technology Corporation) having a rated power consumption of 30 W and capable of emitting ultraviolet light (attracting light). The seventh light source 11g is formed of the same fluorescent tube as that of the second light source 11b. On the other hand, the values of the electric power applied for driving (emission of the attracting light) of the light sources are different. Therefore, the second light source 11b and the seventh light source 11g are described as different light sources 11. FIG. 26 shows the spectral power distribution of the seventh light source 11g. In the graph shown in FIG. 26, the vertical axis represents irradiance per wavelength [μW/cm$^2$/nm], and the horizontal axis represents wavelength [nm]. The irradiance shown in FIG. 26 is a value measured at the measurement position MP shown in FIG. 2. As shown in FIG. 26, the central (peak) wavelength of the light beam (attracting light) emitted from the seventh light source 11g is about 350 nm. The value of the photon flux density [photons/m$^2$/s] at the measurement position MP measured by the seventh light source 11g was $37.5 \times 10^{14}$. Since the seventh light source 11g is a straight fluorescent tube, the directional characteristics of the light beam (attracting light) emitted from the seventh light source 11g are the same in the circumferential direction of the seventh light source 11g (non-directional in the Z direction).

The experimental insects used in this test were 60 male and 60 female tobacco moths and 60 male and 60 female Indian meal moths. 20 males and 20 females of the experimental insects are released from each of the first release point R1, the second release point R2, and the third release point R3. Prior to the test, the experimental insects were marked with fluorescent pigments of different colors at the respective release points so that it is possible to distinguish from which release point they have been released.

The procedure of this test is described below. First, an adhesive paper sheet was attached to the trapping portion 20. Thereafter, the 120 experimental insects were simultaneously released from each releasing point. After the release, the light source portion 10 was caused to emit the attracting light for 10 hours at a predetermined radiation intensity.

After the elapse of 10 hours from the start of emission of the attracting light, the adhesive paper sheet was retrieved, and the number of experimental insects trapped by the adhesive paper sheet was counted. These procedures were performed for each of the ninth test trapping device $1i$, the tenth test trapping device $1j$, and the eleventh test trapping device $1k$.

Figure 27:
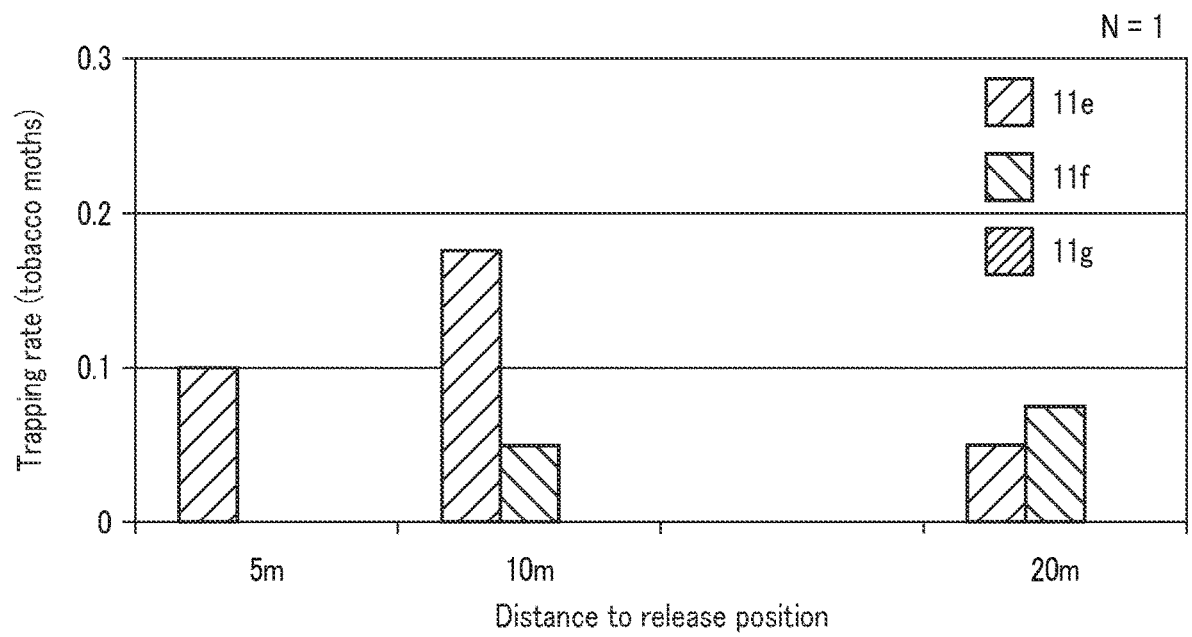
FIG. 27 is a graph showing trapping rates of tobacco moths trapped by the trapping device according to Test Example 5-1 and the trapping device according to the comparative example of Test Example 5-1.
Figure 28:
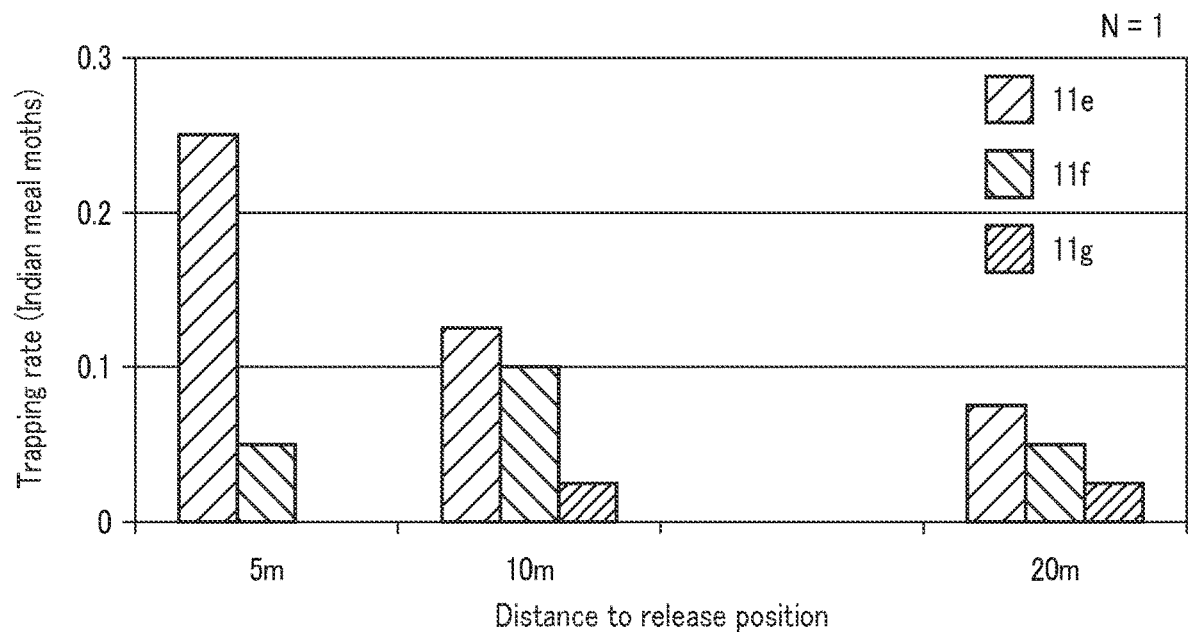
FIG. 28 is a graph showing trapping rates of Indian meal moths trapped by the trapping device according to Test Example 5-1 and the trapping device according to the comparative example of Test Example 5-1.

FIG. 27 and FIG. 28 show the results of this test. FIG. 27 and FIG. 28 show the trapping rate of the tobacco moths by release point and the trapping rate of the Indian meal moths by release point, respectively. In FIG. 27 and FIG. 28, the horizontal axis represents the distance from the emission end (trapping device 1) of the attracting light at the release position, and the vertical axis represents the trapping rate.

As shown in FIG. 27 and FIG. 28, the trapping rates of the tenth test trapping device $1j$ and the eleventh test trapping device $1k$ had a tendency to be low regardless of the release position or the species of the Phycitinae. On the other hand, the trapping rate of the ninth test trapping device $1i$ is higher than those of the other trapping devices. The trapping rate of the ninth test trapping device $1i$ is particularly high for the Phycitinae released at the first release point R1 close to the trapping device.

The behavior suppression region, the non-behavior suppression region, and the guide path formed by the attracting light emitted from the ninth test trapping device $1i$ will be described in more detail with reference to FIG. 2. In FIG. 2, the light distribution angles $\theta/2$ of the fifth light source $11e$ and the sixth light source $11f$ are indicated as a narrow-angle light distribution angle $\theta n/2$ and a wide-angle light distribution angle $\theta w/2$, respectively. Here, the light distribution angle is an angle formed by the optical axis and a light beam direction in which the irradiance (photon flux density) of the attracting light corresponds to the behavior suppression light amount.

As shown in FIG. 2, the emission end (light source 11) of the light source portion 10 is disposed on the wall surface 2 at a height of 20 cm from the floor surface 3. FIG. 2 shows a measurement position MP of the irradiance that is 15 cm away from and directly opposite to the emission end of the light source portion 10 and a projection position IP of the measurement position MP on the floor surface 3. The projection position IP can also be expressed as a point on the floor surface 3 in a direction deviated by 53° in the Z-direction from the optical axis of the attracting light (light source portion 10) with reference to the emission end of the attracting light.

As indicated by the solid line in FIG. 24, the radiation angle (half-value angle) at which the irradiance (photon flux density) of the light beam (attracting light) emitted from the fifth light source $11e$ is less than 0.5 (less than 50) is 15° or more. The irradiance (photon flux density) at the projection position IP is about 0.05 times the irradiance (photon flux density) measured at the measurement position MP. On the other hand, as indicated by the broken line in FIG. 24, the radiation angle (half-value angle) at which the irradiance (photon flux density) of the light beam (attracting light) emitted from the sixth light source $11f$ is less than 0.5 (less than 50%) is 60° (the wide-angle light distribution angle $\theta w/2$) or more. The irradiance at the projection position IP is about 0.7 times the irradiance measured at the measurement position MP.

The photon flux densities of the fifth light source $11e$ and the sixth light source $1f$ measured at the measurement position MP were both about $20 \times 10^{14}$ photons/m²/s. Furthermore, the photon flux density at which the behavior suppression occurs in the adult Phycitinae at a low rate is less than $20 \times 10^{14}$ photons/m²/s, for example, $10 \times 10^{14}$ photons/m²/s or less. As described above with reference to FIG. 26, the light beam emitted from the seventh light source $11g$ has a photon flux density of about $40 \times 10^{14}$ photons/m²/s measured at the measurement position MP and has no directivity.

Therefore, in a region within 15° (narrow-angle light distribution angle $\theta n/2$) or less from the optical axis of the fifth light source $1e$ as in the behavior suppression region SA1 in FIG. 4, the value of the photon flux density of the behavior suppression region SA is $10 \times 10^{14}$ photons/m²/s or more. On the other hand, as in the non-behavior suppression region WA1 in FIG. 2, the value of the photon flux density at the projection position IP deviated from the optical axis of the fifth light source $11e$ by 15° (narrow-angle light distribution angle $\theta n/2$) or more, with reference to the emission end of the attracting light, is less than $10 \times 10^{14}$ photons/m²/s. Similarly, in a region on a straight line passing through the measurement position MP and the projection position IP and deviated from the optical axis of the sixth light source $11f$ by 60° or more, the value of the photon flux density is $10 \times 10^{14}$ photons/m²/s or less. It should be noted that the behavior suppression region formed by the attracting light comes into contact with the floor surface 3, when the light is deviated from the optical axis of the sixth light source $11f$ by 53° (limit light distribution angle $\theta c/2$) or more.

That is, the projection position IP is outside the behavior suppression region SA1 formed by the ninth test trapping device $1i$ and inside the behavior suppression region SA2 formed by the tenth test trapping device $1j$ and the behavior suppression region formed by the eleventh test trapping device $1k$. Similarly, the projection position IP is inside the non-behavior suppression region WA1 formed by the ninth test trapping device $1i$ and outside the non-behavior suppression region WA2 formed by the tenth test trapping device $1j$ and the non-behavior suppression region formed by the eleventh test trapping device $1k$. That is, the ninth test trapping device $1i$ satisfies the required emission characteristics described above, and can form the behavior suppression region above the behavior suppression boundary IB and form the non-behavior suppression region below the behavior suppression boundary IB. On the other hand, the tenth test trapping device $1j$ and the eleventh test trapping device $1k$ do not satisfy the required emission characteristics described above, and cannot form a guide path below the behavior suppression boundary IB.

From the above, it was shown that the trapping device 1 configured to satisfy the required emission characteristics described above and to form the guide path below the height of the light source is effective for attracting and trapping the adult Phycitinae. In addition, the first trapping device forms a behavior suppression region above the behavior suppression boundary, and can attract a wide range of the adult.

Test Example 5-2

In Test Example 5-1, concerning the tobacco moths and the Indian meal moths as examples of Phycitinae, the trapping test performed by using the attracting light having directivity was described. The Phycitinae are not limited to the tobacco moth and the Indian meal moth, and include the dried currant moth and the Mediterranean flour moth. Therefore, in this test example, a trapping test performed by using the trapping device 1 (the ninth test trapping device $1i$) according to the first embodiment that emits the attracting light having directivity (the attracting light of the narrow-angle light distribution) with respect to the dried currant moth and the Mediterranean flour moth will be described.

Various test conditions according to this test example are the same as those of Test Example 5-1 except that the test region, the type and number of experimental insects, and the irradiation time of the attracting light after release are different.

Figure 29:
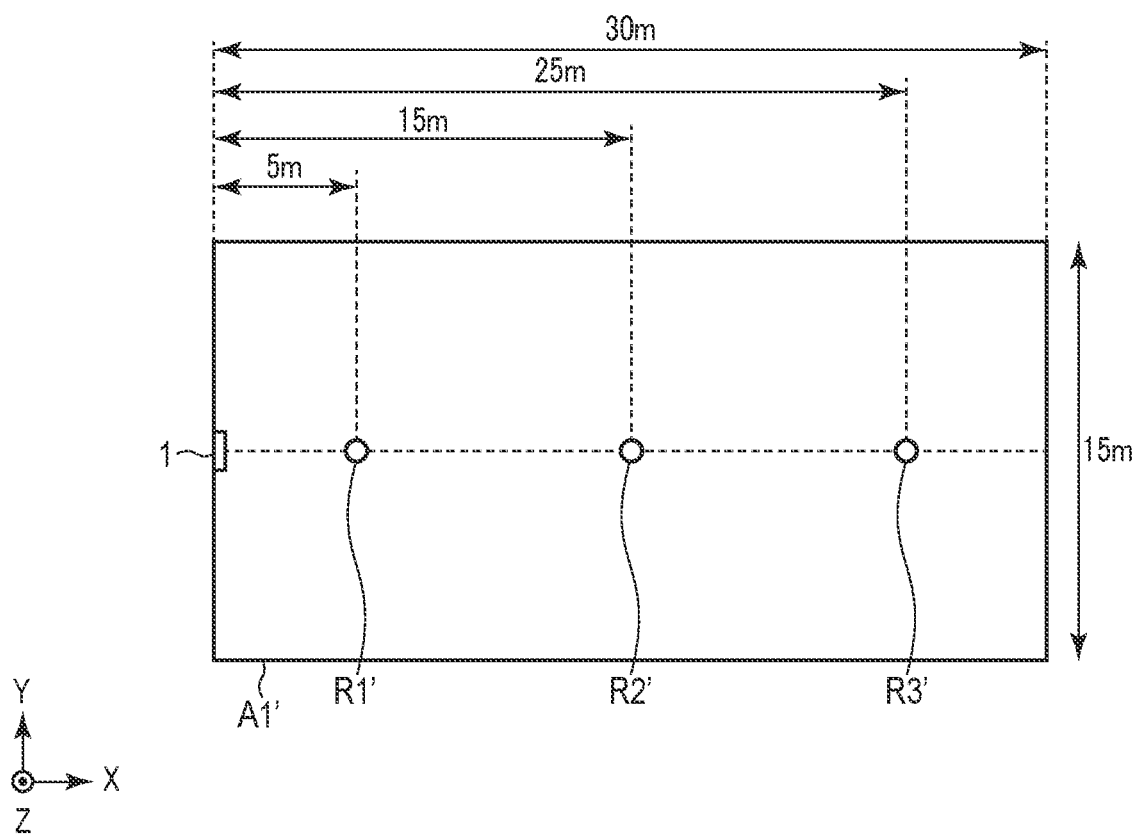
FIG. 29 is a plan view of the configuration of a test region (warehouse) according to Test Example 5-2 as viewed from above.

FIG. 29 is a plan view of the configuration of a test region A1', as viewed from above, according to Test Example 5-2 in which the trapping test was conducted in this test example. As shown in FIG. 29, the depth (X direction) of the test region A1' according to Test Example 5-2 is 30 m, and the floor area is 450 m². A first release point R1' according to Test Example 5-2 is provided at a position that is 5 m away from the trapping device 1 in the X+ direction (the emission direction of the attracting light). Similarly, a second release point R2' according to Test Example 5-2 and a third release point R3' according to Test Example 5-2 are provided at positions that are respectively 15 m and 25 m away from the trapping device 1 in the X+ direction. On the wall surface on the X− side of the test region A1' according to Test Example 5-2, the ninth test trapping device 1i (trapping device 1) is disposed so as to be capable of emitting the attracting light in the X+ direction. The ninth test trapping device 1i is arranged such that the lower end of the trapping device is in contact with the floor surface. In addition, in this test example, as a comparative example, a test using the tenth test trapping device 1j and the eleventh test trapping device 1k that emit the attracting light of the wide-angle light distribution was also conducted.

The experimental insects used in this test were 75 male and 75 female dried currant moths and 75 male and 75 female Mediterranean flour moths. This test was conducted simultaneously for the dried currant moths and the Mediterranean flour moths. 25 males and 25 females of the experimental insects are released from each of the first release point R1' of Test Example 5-2, the second release point R2' of Test Example 5-2, and the third release point R3' of Test Example 5-2. Prior to the test, the experimental insects were marked with fluorescent pigments of different colors at the respective release points so that it is possible to distinguish from which release point they have been released. Whether the trapped experimental insect is a dried currant moth or a Mediterranean flour moth can be easily distinguished visually.

The procedure of this test is described below. First, an adhesive paper sheet was attached to the trapping portion 20. Thereafter, 300 experimental insects were simultaneously released from the respective releasing points. After the release, the light source portion 10 was caused to emit attracting light at a predetermined radiation intensity for 24 hours. After the elapse of 24 hours from the start of emission of the attracting light, the adhesive paper sheet was retrieved, and the number of experimental insects of each species trapped by the adhesive paper sheet was counted. These procedures were performed for each of the ninth test trapping device 1i, the tenth test trapping device 1j, and the eleventh test trapping device 1k.

Figure 30:
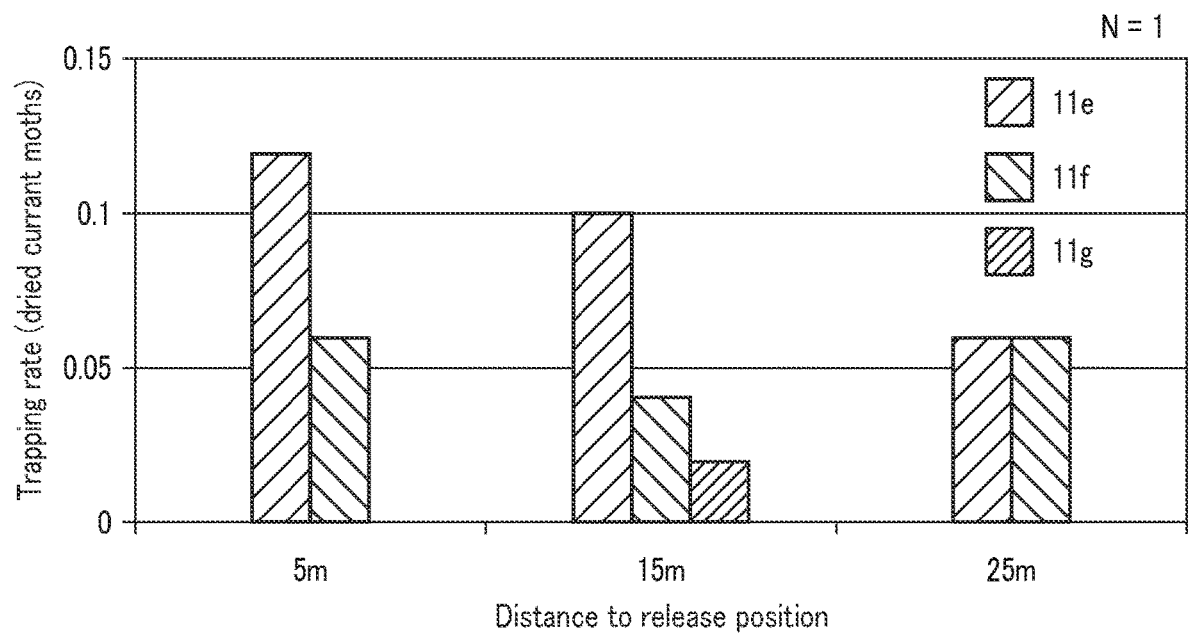
FIG. 30 is a graph showing trapping rates of dried currant moths trapped by a trapping device according to Test Example 5-2 and a trapping device according to a comparative example of Test Example 5-2.
Figure 31:
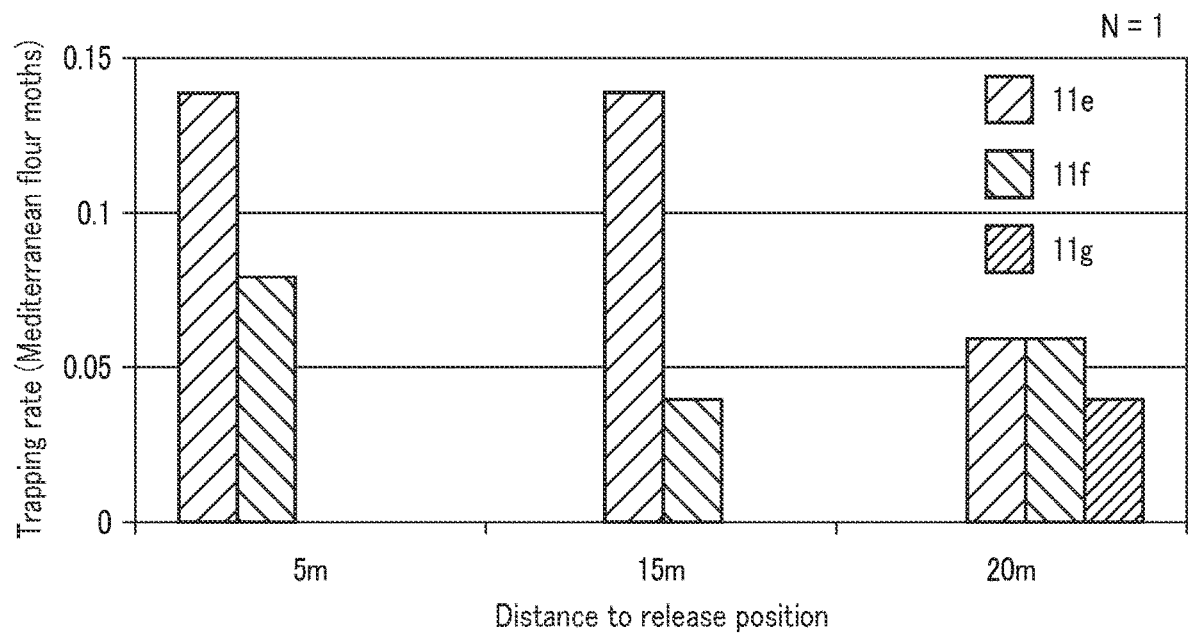
FIG. 31 is a graph showing trapping rates of Mediterranean flour moths trapped by the trapping device according to Test Example 5-2 and the trapping device according to the comparative example of Test Example 5-2.

FIG. 30 and FIG. 31 show the results of this test. FIGS. 30 and 31 show the trapping rate of the dried currant moths by release point and the trapping rate of the Mediterranean flour moths, respectively. In FIG. 30 and FIG. 31, the horizontal axis represents the distance from the emission end (trapping device 1) of the attracting light at the release position, and the vertical axis represents the trapping rate.

As shown in FIGS. 30 and 31, the trapping rates of the tenth test trapping device 1j and the eleventh test trapping device 1k had a tendency to be low regardless of the release position or the species of Phycitinae (the dried currant moth or the Mediterranean flour moth) as in Test Example 5-1. On the other hand, the trapping rate of the ninth test trapping device 1i is higher than those of the other trapping devices, as in Test Example 5-1. Furthermore, as in Test Example 5-1, the trapping rate of the ninth test trapping device 1i is particularly high for the Phycitinae (the dried currant moths or the Mediterranean flour moths) released at the first release point R1' according to Test Example 5-2, which is close to the trapping device.

As described above, according to the review of Test Example 5, it was shown that the trapping device 1 configured to satisfy the required emission characteristics described above and to form the guide path below the height of the light source is effective for attracting and trapping the adult Phycitinae. In addition, the first trapping device forms a behavior suppression region above the behavior suppression boundary, and can attract a wide range of the adult Phycitinae. Here, the Phycitinae include at least the tobacco moth, the Indian meal moth, the dried currant moth, and the Mediterranean flour moth.

Test Example 6

In this test example, a trapping test performed using the trapping device 1 according to the second embodiment (a twelfth test trapping device 1i and a thirteenth test trapping device 1m) capable of emitting the attracting light from the light source 11 as the attracting light of the narrow-angle light distribution through the diaphragm portion 13 will be described.

Figure 32:
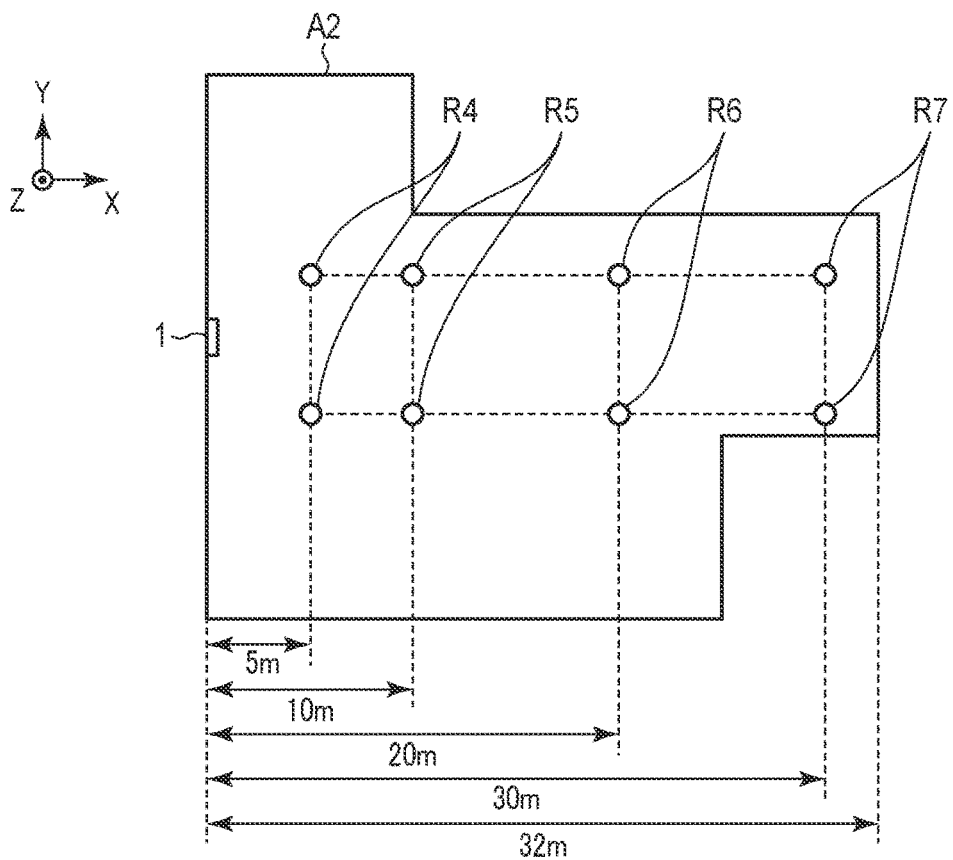
FIG. 32 is a plan view of a configuration of a test region (warehouse) according to Test Example 6 as viewed from above.

FIG. 32 is a plan view of the configuration of a second test region A2 (warehouse), as viewed from above, in which the trapping test was conducted in this test example. As shown in FIG. 32, the depth (X direction) of the second test region A2 is 32 m, and the floor area is about 748 m². Fourth release points R4 are provided at a position 5 m away from the trapping device 1 in the X+ direction (the emission direction of the attracting light). Similarly, fifth release points R5, sixth release points R6, and seventh release points R7 are provided at positions 10 m, 20 m, and 30 m away from the trapping device 1 in the X+ direction, respectively. The respective release points of the fourth release points R4 to the seventh release points R7 are separately arranged at 2 positions on the Y+ side and the Y− side of the trapping device 1. On the wall surface on the X− side of the second test region A2, the trapping device 1 is disposed so as to be capable of emitting the attracting light in the X+ direction. The twelfth test trapping device 1i and the thirteenth test trapping device 1m are arranged such that the lower end of each trapping device 1 is in contact with the floor surface. The second test region A2 is an empty warehouse where no light is incident from outside into the test region.

The twelfth test trapping device 1i has the configuration of the trapping device 1 according to the second embodiment described above with reference to FIG. 3. The twelfth test trapping device 1i includes a light source portion 10 including a fourth light source 11d (light source 11) and a third diaphragm portion 13c (diaphragm portion 13, optical element 12), a trapping portion 20 including a central trapping portion 23, and a support member 30.

The fourth light source 11d of the twelfth test trapping device 1i is disposed near the center of the X− side of the central trapping portion 23.

The opening of the third diaphragm portion 13c (diaphragm portion 13) is arranged at the center of the central trapping portion 23. The shape of the opening of the third diaphragm portion 13c is substantially circular. The area of the opening of the third diaphragm portion 13c is 3 mm$^2$.

The trapping member of the central trapping portion 23 is disposed on the X+ side of the central trapping portion 23. The trapping member is a replaceable adhesive paper sheet of 50 cm square with an opening in the center.

The thirteenth test trapping device 1m is the same as the twelfth test trapping device 1i except for differences in the shape and size of the diaphragm portion 13 (optical element 12). The shape of the opening of the fourth diaphragm portion 13d (diaphragm portion 13) of the thirteenth test trapping device 1m is a substantially rectangular shape of 10 mm square. The area of the opening of the fourth diaphragm portion 13d is 100 mm$^2$.

The experimental insects used in this test were 200 male and 200 female tobacco moths. 100 males and 100 females of the experimental insects are released from the two fourth release points R4, the two fifth release points R5, the two sixth release points R6, and the two seventh release points R7.

The procedure of this test is described below. First, an adhesive paper sheet was attached to the trapping portion 20. Thereafter, the 200 experimental insects were simultaneously released from the release points, 100 each from the respective release points. After the release, the light source portion 10 was caused to emit the attracting light at a predetermined radiation intensity. After the elapse of three days (four days) from the start of emission of the attracting light, the adhesive paper sheet was retrieved, and the number of experimental insects trapped by the adhesive paper sheet was counted. In this test, the number of trapped insects was counted three days after the start of emission of the attracting light, and the number of trapped insects was counted four days after the start of emission of the attracting light. These procedures were performed for each of the twelfth test trapping device 1l and the thirteenth test trapping device 1m at each of the fourth to seventh release points R4 to R7.

Figure 33:
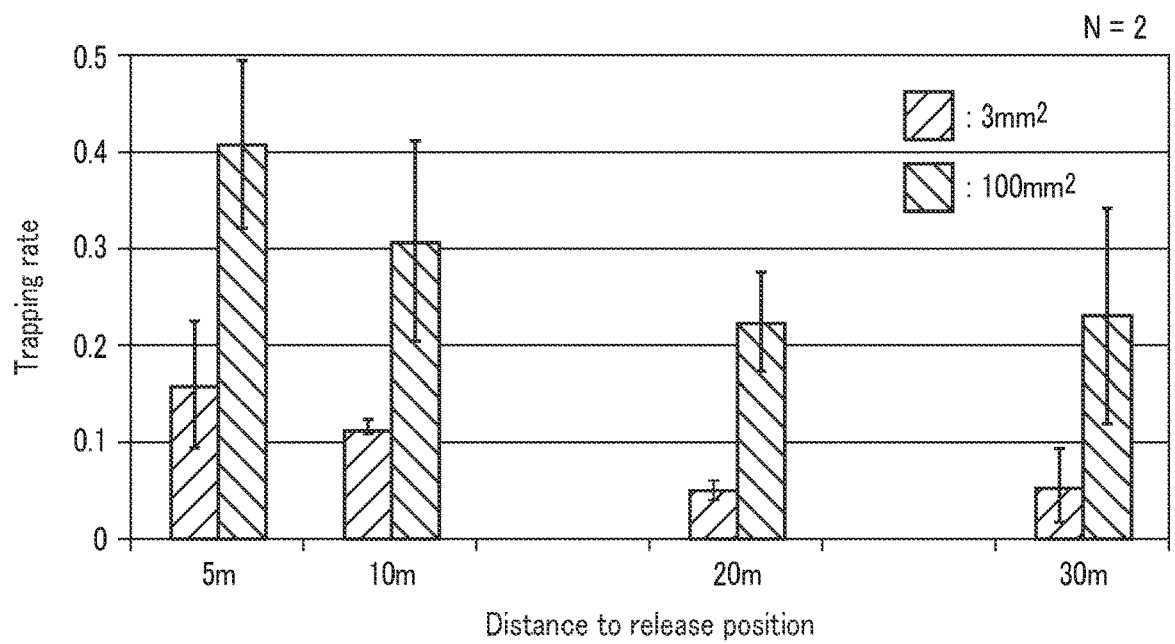
FIG. 33 is a graph showing a trapping rate of tobacco moths trapped by a trapping device according to Test Example 6.

FIG. 33 shows the results of this test. FIG. 33 shows the trapping rate of the twelfth test trapping device 1l having an opening area of 3 mm$^2$ and the trapping rate of the thirteenth test trapping device 1m having an opening area of 100 mm$^2$. In FIG. 33, the horizontal axis represents the distance from the emission end (trapping device 1) of the attracting light to the release position, and the vertical axis represents the trapping rate.

As shown in FIG. 33, it was shown that the Phycitinae can be trapped by using the trapping device 1 of either the twelfth test trapping device 1i or the thirteenth test trapping device 1m. In addition, the trapping rate is particularly high for the Phycitinae released at the first release point R1 close to the trapping device 1.

A comparison between the trapping rate of the twelfth test trapping device 1i and the trapping rate of the thirteenth test trapping device 1m showed that the trapping rate of the thirteenth test trapping device 1m having a larger area of the opening of the diaphragm portion 13 was higher. It can be assumed that this is caused by the size of the behavior suppression region (the light amount of the attracting light, the radiation intensity) based on the area of the opening.

Based on the above, similarly to the test results of the above-described test examples, the results of this test show the usefulness of the trapping device 1 that forms a guide path below the height of the light source (below the behavior suppression boundary), and further show the usefulness of the trapping device 1 that has a high attractiveness for the adult Phycitinae due to the large behavior suppression region.

Test Example 7

In this test, the attractiveness (trapping rate) in the horizontal direction (Y direction) of the attracting light of the narrow-angle light distribution is examined.

Figure 34:
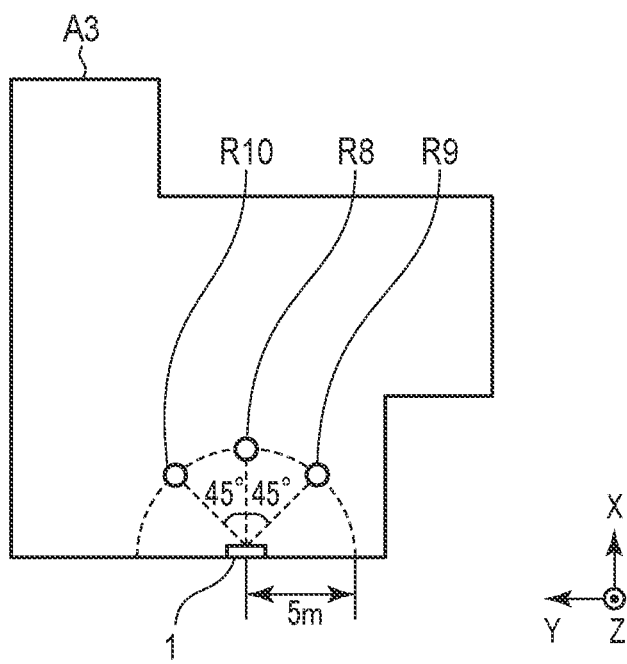
FIG. 34 is a plan view of a configuration of a test region (warehouse) according to Test Example 7 as viewed from above.

FIG. 34 is a plan view of the configuration of a third test region A3 (warehouse) as viewed from above. The space (warehouse) used as the third test region A3 is the same as the second test region A2. Specifically, the wall surface on the X− side of the third test region A3 on which the trapping device 1 is disposed corresponds to the wall surface on the Y− side of the second test region A2. An eighth release point R8, a ninth release point R9, and a tenth release point R10 are radially provided at positions 5 m away from the trapping device 1. The eighth release point R8 is disposed in the X+ direction of the trapping device 1 (the emission direction of the attracting light) so as to be directly opposite to the emission end of the attracting light. The ninth release point R9 is arranged at a position shifted by +45° in the clockwise direction from the position of the eighth release point R8 with respect to the trapping device 1. The tenth release point R10 is arranged at a position shifted by −45° in the clockwise direction from the position of the eighth release point with respect to the trapping device 1. On the wall surface on the X− side of the third test region A3, the trapping device 1 is disposed so as to be capable of emitting the attracting light in the X+ direction. The third test region A3 is an empty warehouse and is configured so that light does not enter from outside the test region.

In this test example, the trapping test was performed using the ninth trapping device for test 1i and the tenth trapping device for test 1j used in Test Example 5-1.

The experimental insects used in this test were 20 male and 20 female tobacco moths and 20 male and 20 female Indian meal moths. 20 males and 20 females of the tobacco moths and 20 males and 20 females of the Indian meal moths are released from each of the eighth release point R8, the ninth release point R9, and the tenth release point R10. The experimental insects were marked so that it is possible to distinguish from which release point they have been released.

The procedure of this test is described below. First, an adhesive paper sheet was attached to the trapping portion 20. Thereafter, the 240 experimental insects were simultaneously released from the respective releasing points. After the release, the light source portion 10 was caused to emit the attracting light at a predetermined radiation intensity. After the elapse of 10 hours from the start of emission of the attracting light, the adhesive paper sheet was retrieved, and the number of experimental insects trapped by the adhesive paper sheet was counted. These procedures were performed for each trapping device of the ninth test trapping device 1i and the tenth test trapping device 1j.

Figure 35:
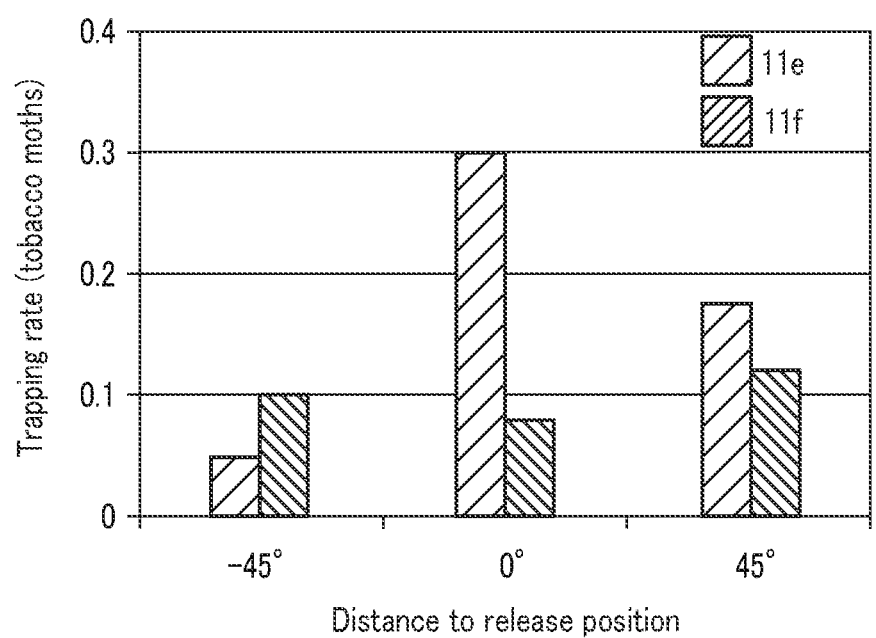
FIG. 35 is a graph showing the relationship between a trapping rate of tobacco moths trapped by a trapping device according to Test Example 7 and a release angle.
Figure 36:
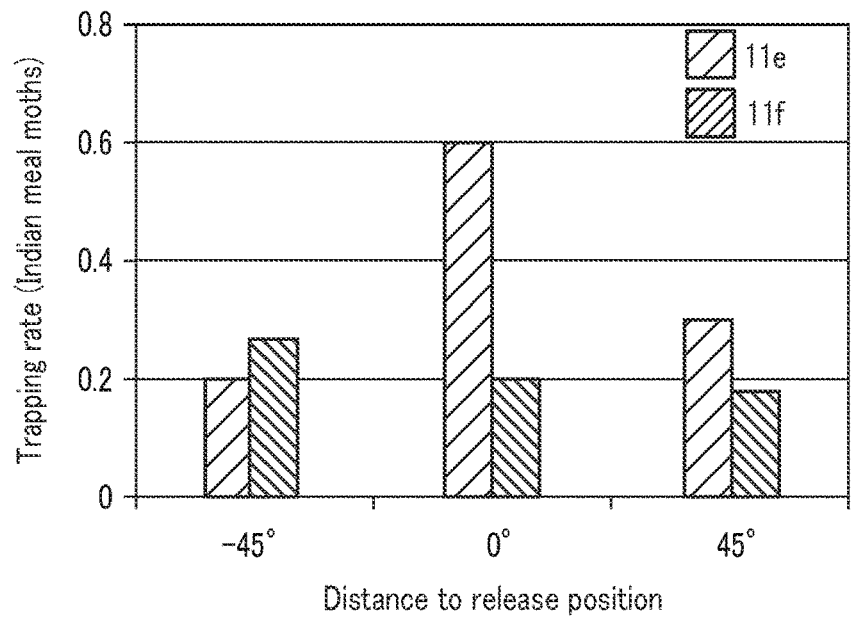
FIG. 36 is a graph showing the relationship between a trapping rate of Indian meal moths trapped by the trapping device according to Test Example 7 and a release angle.

FIG. 35 and FIG. 36 show the results of this test. FIG. 35 and FIG. 36 show the trapping rate of the tobacco moths by release point and the trapping rate of the Indian meal moths by release point, respectively. In FIG. 35 and FIG. 36, the horizontal axis represents the angle of the release position with respect to the optical axis of the attracting light with reference to the emission end of the attracting light, and the vertical axis represents the trapping rate.

As shown in FIG. 35 and FIG. 36, the trapping rate of the ninth test trapping device 1i is generally higher than that of the tenth test trapping device 1j. In particular, the trapping rate of the Phycitinae released from the eighth release point R8 located in the emission direction of the attracting light is prominent. On the other hand, for example, as seen in the trapping rate at the tenth release point R10, the trapping rate of the ninth test trapping device 1i that emits the attracting light of the narrow-angle light distribution is low with respect to the Phycitinae at the position deviated from the emission direction of the attracting light.

That is, the ninth test trapping device 1i has a high attractiveness for the Phycitinae located below (in the Z− direction) or in front of (in the X+ direction) the behavior suppression region SA formed by the ninth test trapping device 1i. On the other hand, the ninth test trapping device 1i has a low attractiveness for the Phycitinae located in a region horizontally (in the Y direction) deviated from the behavior suppression region SA formed by the ninth test trapping device 1i.

Based on the above, the results of the present test show the usefulness of the trapping device 1 that radially emits the attracting light of the narrow-angle light distribution in the horizontal direction. That is, the usefulness of the attracting light having the directivity of the wide-angle light distribution in the horizontal direction and the narrow-angle light distribution in the gravity direction (Z direction) was shown.

Test Example 8

In this test example, a trapping test performed by using a fourteenth test trapping device 1n will be described, in which the attracting light directed below the behavior suppression boundary among the attracting light emitted from the light source 11 is attenuated by a neutral-density (ND) filter, and the attenuated attracting light is emitted to form a non-behavior suppression region and a guide path.

The test region according to this test example is the first test region A1 described with reference to FIG. 13. The test according to the present test example was performed by arranging the fourteenth test trapping device 1n (trapping device 1) on the wall surface on the X− side of the above-described first test region A1 so as to be capable of emitting the attracting light in the X+ direction. The fourteenth test trapping device in is disposed so that a height of the light source is 70 cm.

The fourteenth test trapping device 1n has the configuration of the trapping device 1 according to the third embodiment described above with reference to FIG. 5. As shown in FIG. 1, the light source portion 10 of the fourteenth test trapping device in includes a light source 11 (fourth light source 1d) and a light attenuating member 14 (optical element 12).

The fourth light source 10d (light source 11) of the light source portion 10 is a fluorescent tube of 4 W capable of emitting ultraviolet light (attracting light) described with reference to FIG. 18. The value of the photon flux density [photons/m$^2$/s] at the measurement position MP measured by the fourth light source 11d was 42.3×10$^4$. Since the fourth light source 11d is a straight fluorescent tube, the directional characteristics of the light beam (attracting light) emitted from the fourth light source 11d are the same in the circumferential direction of the fourth light source 11d (non-directional in the Z direction).

Figure 37:
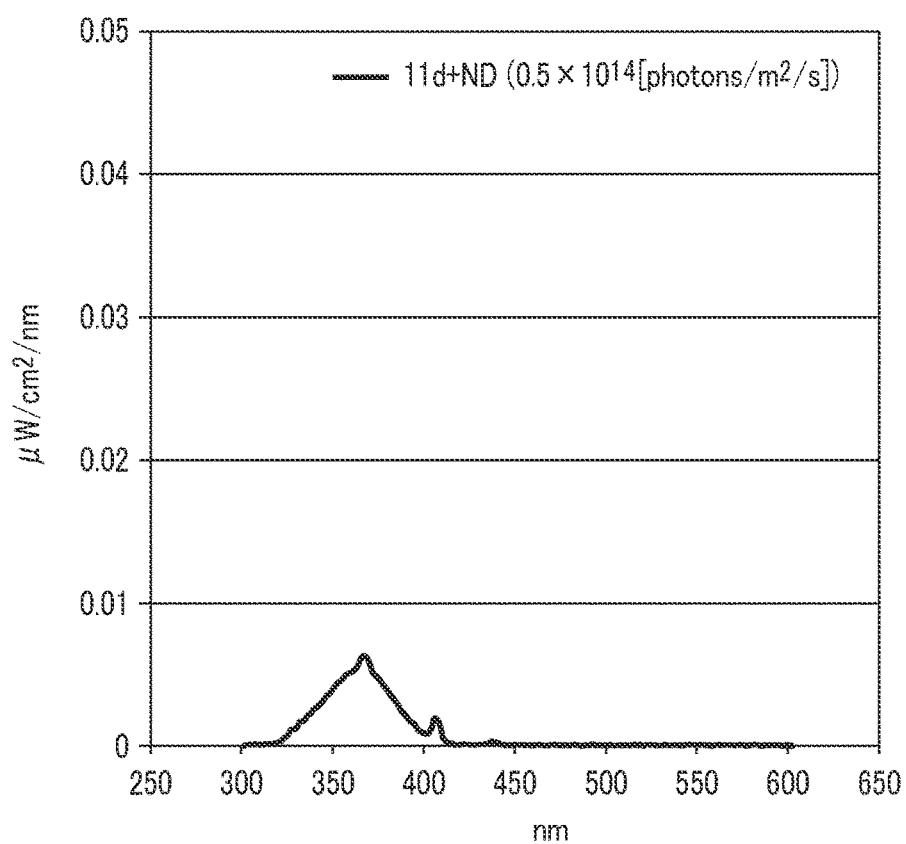
FIG. 37 is a graph showing the radiation intensity distribution with respect to the wavelength of the attracting light after being emitted from a trapping device and attenuated by a light attenuating member according to Test Example 8.

The light attenuation member 14 (optical element 12) of the light source portion 10 is a light attenuation filter (ND sheet, #2110.9 ND 610×610 mm, manufactured by LEE FILTER CORPORATION). FIG. 37 shows the spectral power distribution of the light beam of the fourth light source 11d after transmitting (passing) through the light attenuating filter. In the graph shown in FIG. 37, the vertical axis represents irradiance per wavelength [μW/cm$^2$/nm], and the horizontal axis represents wavelength [nm]. The irradiance shown in FIG. 37 is a value measured at the measurement position MP shown in FIG. 2. The central (peak) wavelength of the attracting light is the same as that in the case where the light attenuating filter described above with reference to FIG. 18 is not used. The value of the photon flux density [photons/m$^4$/s] at the measurement position MP by the attracting light of the fourth light source 11d after passing through the light attenuating filter was 0.5×10$^{14}$.

In this manner, the light attenuating member 14 reduces the light beam (attracting light) incident from the upper side (Z+ side) of the light attenuating member 14 by 98% or more. Therefore, in the test using the fourteenth test trapping device in, since the boundary between the behavior suppression region having the behavior suppression light amount or greater and the non-behavior suppression region having a light amount smaller than the behavior suppression light amount corresponds to the light-attenuating member 14, the position where the light-attenuating member 14 is disposed is the behavior suppression boundary.

Furthermore, a comparative test for this test example was performed using a fifteenth test trapping device 10 under the same conditions. The fifteenth test trapping device 10 is the same as the fourteenth test trapping device 1n except that it does not include the light attenuating member 14.

The experimental insects used in this test were 60 male and 60 female tobacco moths and 60 male and 60 female Indian meal moths. 20 males and 20 females of the experimental insects are released from each of the first release point R1, the second release point R2, and the third release point R3. The experimental insects were marked so that it is possible to distinguish from which release point they have been released.

The procedure of this test is described below. First, an adhesive paper sheet was attached to the trapping portion 20. Thereafter, the 240 experimental insects were simultaneously released from the respective releasing points. After the release, the light source portion 10 was caused to emit attracting light at a predetermined radiation intensity for 10 hours. After the elapse of 10 hours from the start of emission of the attracting light, the adhesive paper sheet was retrieved, and the number of experimental insects trapped by the adhesive paper sheet was counted.

Figure 38:
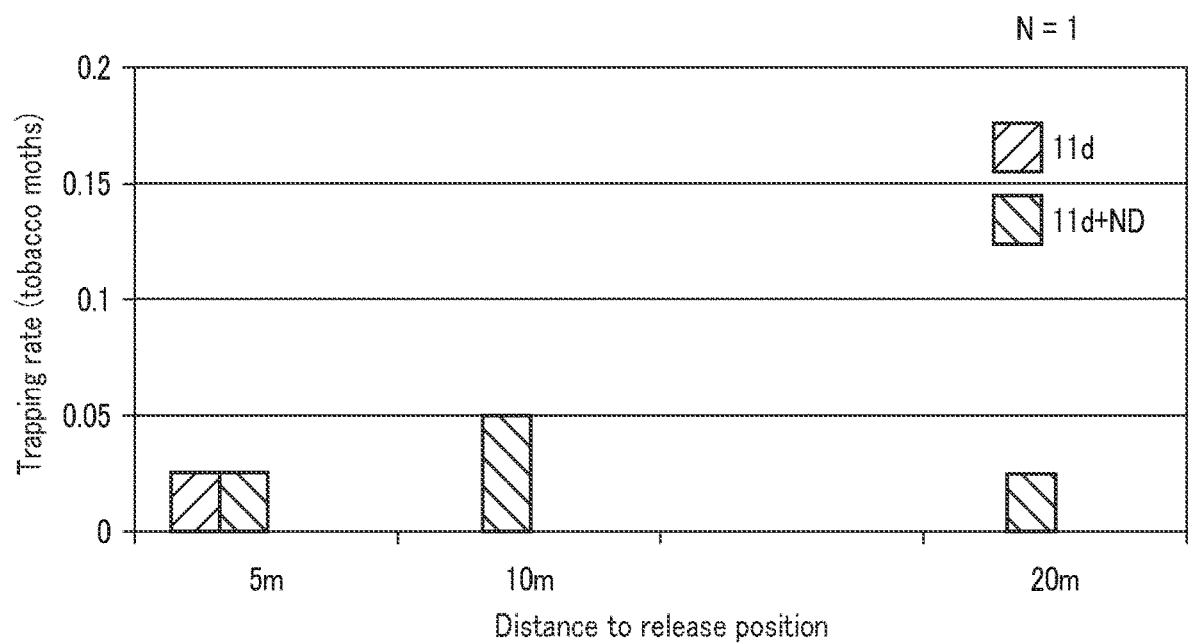
FIG. 38 is a graph showing a trapping rate of tobacco moths trapped by a trapping device according to Test Example 8.
Figure 39:
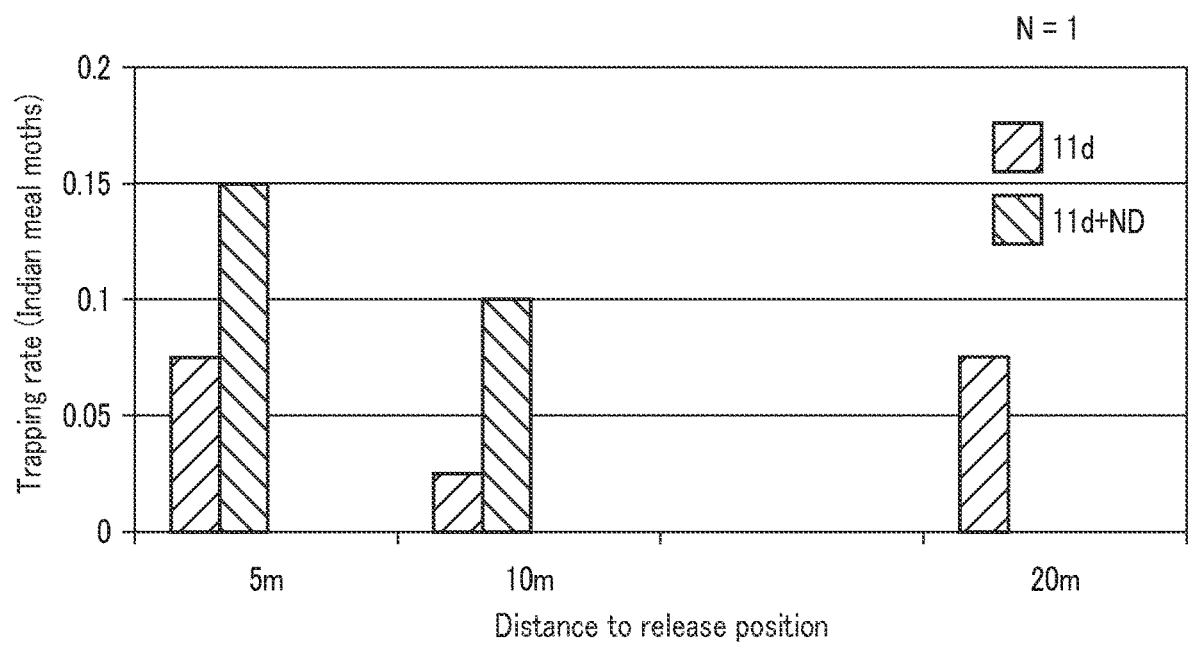
FIG. 39 is a graph showing a trapping rate of Indian meal moths trapped by the trapping device according to Test Example 8.

FIG. 38 and FIG. 39 show the results of this test. FIG. 38 and FIG. 39 show the trapping rate of the tobacco moths by release point and the trapping rate of the Indian meal moths by release point, respectively. In FIG. 38 and FIG. 39, the horizontal axis represents the distance from the emission end of the attracting light at the release position, and the vertical axis represents the trapping rate. As shown in FIG. 38 and FIG. 39, the trapping rate of the fourteenth test trapping device in that forms the guide path below the height of the light source 11 is higher than the trapping rate of the fifteenth test trapping device 10 that does not form the guide path.

Based on the above, it was shown that the required emission characteristics described above may be realized using the light attenuating member 14 (optical element 12). In addition, it was shown that the trapping device 1 configured to form the behavior suppression region above the behavior suppression boundary and to form the non-behavior suppression region (guide path) below the behavior suppression boundary is effective for trapping the adult Phycitinae.

The present invention is not limited to the above-described embodiments, and can be variously modified in practice, without departing from the gist of the invention. Moreover, the examples can be suitably combined; in that case, the combined advantages are obtained. Furthermore, the above-described embodiments include various inventions, and a variety of inventions can be derived by suitably combining structural elements disclosed in connection with the embodiment. For example, if the object of the invention is achieved and the advantages of the invention are attained even after some of the structural elements disclosed in connection with the embodiment are deleted, the structure made up of the resultant structural elements can be extracted as an invention.

For example, the technique according to the first modification may be applied to the trapping device 1 according to the third embodiment. In addition, the light source 11 configured for narrow-angle light distribution may be used for the configuration of each test trapping device, or various optical elements 12 such as the diaphragm portion 13 and the dimming member 14 may be used for the same. For example, the configuration of the test trapping device according to the third test example may be used in a form in which the longitudinal direction of the opening of the slit is substantially parallel to the Y direction. For example, a configuration is also conceivable in which the light source 11 is disposed on the surface on the Z+ side of the light attenuating member 14 disposed substantially horizontally on the X-Y plane and the trapping portion 20 is disposed on the surface on the Z− side.

In the test examples described above, at least one kind of the tobacco moth, the Indian meal moth, the dried currant moth, and the Mediterranean flour moth was used as experimental insects. However, the findings obtained in these tests are not limited to the Phycitinae used as the experimental insects, and can be regarded as findings for indoor adult Phycitinae including the tobacco moth, the Indian meal moth, the dried currant moth, and the Mediterranean flour moth. Of course, the appropriate amount of behavior suppression light and the appropriate shape and size of the movement region may vary depending on the species. On the other hand, as long as the adult Phycitinae move near the floor surface and then fly from the lower side of the emission end toward the emission end of the attracting light and the behavior suppression light amount for the adult Phycitinae can be defined, the techniques related to the attraction methods, the trapping methods, the light source devices, and the trapping devices described above can be applied.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for trapping indoor adult Phycitinae, which is an adult moth belonging to Phycitinae subfamily and which is a grain-storage insect pest, the method comprising:
emitting attracting light from a light source at a predetermined photon flux density; forming:
a guide path by the attracting light to guide the adult Phycitinae to a vicinity of an emission end of the attracting light in a region having a photon flux density lower than the predetermined photon flux density on a side lower than a height of the emission end;
a behavior suppression region configured to suppress the adult Phycitinae behavior with the emission end of the attracting light formed by the attracting light in which a value of the photon flux density of the attracting light is equal to or greater than the value of the photon flux density of the attracting light in the guide path; and
a behavior suppression boundary formed by the attracting light which is deviated from an optical axis of the light source by a predetermined angle or more, the behavior suppression region being on an upper side of the behavior suppression boundary, and the guide path being on a lower side of the behavior suppression boundary; and
trapping the adult Phycitinae attracted by the attracting light in the guide path,
wherein an angle formed by the light source is set as follows:
when an angle formed by the optical axis of the light source and the behavior suppression boundary is defined as a light distribution angle ($\theta/2$) of the light source, the light source is configured to emit the attracting light having a narrow-angle light distribution angle ($\theta n/2$),
wherein the narrow-angle light distribution angle ($\theta n/2$) of the attracting light is an angle in a range that satisfies a relationship of $L \times \tan(\theta n/2) < H$, and
wherein L is a distance at which the value of the photon flux density of the attracting light emitted at a predetermined photon flux density attenuates to a value less than a behavior suppression light amount in an atmosphere, and wherein H is a height of the emission end of the light source
and wherein the photon flux density d [photons/m2/s] of the attracting light in the guide path satisfies a relationship expressed by:

$$0 < d < 20 \times 10^{14}.$$

2. The method for trapping indoor adult Phycitinae according to claim 1, wherein, in a region between the height of the emission end and a floor surface, the guide path is located in a non-behavior suppression region in which a value of a photon flux density of the attracting light is less than a value of a photon flux density that causes behavior suppression in the adult Phycitinae, and in a movement region through which the adult Phycitinae attracted by the attracting light move to the vicinity of the emission end.

3. The method for trapping indoor adult Phycitinae according to claim 1, wherein the emitting the attracting light is performed with a light attenuating member configured to reduce the photon flux density of the attracting light being disposed below the emission end, and
the light attenuating member makes the predetermined photon flux density less than the value of the photon flux density that causes the behavior suppression in the adult Phycitinae in the guide path.

4. The method for trapping indoor adult Phycitinae according to claim 3, wherein the light attenuating member extends in a substantially horizontal direction.

5. The method for trapping indoor adult Phycitinae according to claim 1, wherein the emitting the attracting light includes emitting the attracting light having directivity.

6. The method for trapping indoor adult Phycitinae according to claim 5, wherein the emitting the attracting light having directivity is performed with a diaphragm including a hole or a slit located at a position facing the light source.

7. The method for trapping indoor adult Phycitinae according to claim 5, wherein the emitting the attracting light having directivity is performed radially with respect to a substantially horizontal direction.

8. The method for trapping indoor adult Phycitinae according to claim 1, wherein the guide path includes a region within 15 cm or less from a surface on which the emission end is disposed, along a line substantially parallel to a floor surface, and a region within 30 cm or less in height from the floor surface.

9. The method for trapping indoor adult Phycitinae according to claim 1, wherein the trapping is performed by a trapping member being disposed in the vicinity of the emission end of the attracting light in the guide path.

10. The method for trapping indoor adult Phycitinae according to claim 1, wherein the trapping is performed by a trapping member being disposed on a floor surface in the guide path.

11. The method for trapping indoor adult Phycitinae according to claim 1, further comprising attracting the adult Phycitinae to the vicinity of the emission end by using an attractant for the adult Phycitinae.

12. A method for trapping adult tobacco moths which is a grain-storage insect pest, the method comprising:
emitting attracting light from a light source at a predetermined photon flux density; forming:
a guide path to guide the adult tobacco moths to a vicinity of an emission end of the attracting light in a region having a photon flux density lower than the predetermined photon flux density on a side lower than a height of the emission end;
a behavior suppression region configured to suppress the adult tobacco moths behavior with the emission end of the attracting light formed by the attracting light in which value of the photon flux density of the attracting light is equal to or greater than the value of the photon flux density of the attracting light in the guide path; and
a behavior suppression boundary formed by the attracting light which is deviated from an optical axis of the light source by a predetermined angle or more, the behavior suppression region being on an upper side of the behavior suppression boundary, the guide path being on a lower side of the behavior suppression boundary; and
trapping the adult tobacco moths attracted by the attracting light in the guide path, wherein an angle formed by the light source is set as follows:
when an angle formed by the optical axis of the light source and the behavior suppression boundary is defined as a light distribution angle ($\theta/2$) of the light source, the light source is configured to emit the attracting light having a narrow-angle light distribution angle ($\theta n/2$), and
wherein the narrow-angle light distribution angle ($\theta n/2$) of the attracting light is an angle in a range that satisfies a relationship of $L \times \tan(\theta n/2) < H$, and
wherein L is a distance at which the value of the photon flux density of the attracting light emitted at a predetermined photon flux density attenuates to a value less than a behavior suppression light amount in the atmosphere, and wherein H is a height of the emission end of the light source
wherein the photon flux density d [photons/m2/s] of the attracting light in the guide path satisfies a relationship expressed by:

$$0 < d < 20 \times 10^{14}.$$

13. The method for trapping indoor adult Phycitinae according to claim 1, wherein the adult Phycitinae is an adult of Mediterranean flour moths, and
the guide path includes a region within 15 cm or less from a surface on which the emission end is disposed, along a line substantially parallel to a floor surface, a region within 30 cm or less in height from the floor surface, and a region within 50 cm or more and 80 cm or less in height from the floor surface, and
the trapping is performed by a trapping member being disposed at a height of 30 cm or less from the floor surface or a height of 50 cm or more and 80 cm or less from the floor surface in the guide path.

14. A method for trapping adult tobacco moths which is a grain-storage insect pest, the method comprising:
emitting attracting light from a light source at a predetermined photon flux density;
forming:
a guide path to guide the adult tobacco moths to a vicinity of an emission end of the attracting light in a region having a photon flux density lower than the predetermined photon flux density on a side lower than a height of the emission end;
a behavior suppression region configured to suppress the adult tobacco moths behavior with the emission end of the attracting light formed by the attracting light in which value of the photon flux density of the attracting light is equal to or greater than the value of the photon flux density of the attracting light in the guide path; and
a behavior suppression boundary formed by the attracting light which is deviated from an optical axis of the light source by a predetermined angle or more, the behavior suppression region being on an upper side of the behavior suppression boundary, the guide path being on a lower side of the behavior suppression boundary; and
trapping the adult tobacco moths attracted by the attracting light in the guide path,
wherein an angle formed by the light source is set as follows:
when an angle formed by the optical axis of the light source and the behavior suppression boundary is defined as a light distribution angle ($\theta/2$) of the light source, the light source is configured to emit the attracting light having a narrow-angle light distribution angle ($\theta n/2$), and
wherein the photon flux density d [photons/m2/s] of the attracting light in the guide path satisfies a relationship expressed by:

$$0 < d < 20 \times 10^{14}.$$

15. The method for trapping indoor adult Phycitinae according to claim 1, wherein the guide path includes a region within 25 cm or less from a surface on which the emission end is disposed, along a line substantially parallel to a floor surface (3), and a region within 30 cm or less in height from the floor surface.

16. The method for trapping indoor adult Phycitinae according to claim 1, wherein the attracting light is emitted in a conical shape from the light source, and
wherein the behavior suppression region is formed between the light source and the behavior suppression boundary.

17. The method for trapping indoor adult Phycitinae according to claim 1, wherein the attracting light is emitted in a conical shape from the light source,
wherein the behavior suppression boundary is a part of an outer periphery of a cone of the conical shape of attracting light, and wherein the behavior suppression region is formed between the light source and the behavior suppression boundary.

* * * * *